United States Patent
Yoshida et al.

[11] Patent Number: 5,832,901
[45] Date of Patent: Nov. 10, 1998

[54] FUEL INJECTION CONTROL APPARATUS AND METHOD FOR AN INTERNAL COMBUSTION ENGINE

[75] Inventors: Masato Yoshida; Kazumasa Iida; Katsunori Ueda; Katsuhiko Miyamoto, all of Tokyo, Japan

[73] Assignee: Mitsubishi Jidosha Kogyo Kabushiki Kaisha, Tokyo, Japan

[21] Appl. No.: 676,251
[22] PCT Filed: Nov. 16, 1995
[86] PCT No.: PCT/JP95/02345
§ 371 Date: Oct. 4, 1996
§ 102(e) Date: Oct. 4, 1996
[87] PCT Pub. No.: WO96/16262
PCT Pub. Date: May 30, 1996

[30] Foreign Application Priority Data

Nov. 17, 1994 [JP] Japan .................................. 6-283825
May 15, 1995 [JP] Japan .................................. 7-115777

[51] Int. Cl.⁶ .................................................. F02M 51/00
[52] U.S. Cl. ............................................ 123/478; 123/480
[58] Field of Search .................................... 123/478, 472, 123/480, 486, 491, 492; 364/431.01, 424.05, 431.06

[56] References Cited

U.S. PATENT DOCUMENTS

| | | | |
|---|---|---|---|
| 5,432,701 | 7/1995 | Mayer et al. | 364/431.01 |
| 5,441,030 | 8/1995 | Satsukawa | 123/491 |
| 5,444,627 | 8/1995 | Sandborg et al. | 364/431.05 |
| 5,448,978 | 9/1995 | Hasegawa et al. | 123/480 |
| 5,495,840 | 3/1996 | Ohtsuka et al. | 123/478 |
| 5,499,608 | 3/1996 | Meister et al. | 123/467 |
| 5,524,591 | 6/1996 | Hirota et al. | 123/478 |
| 5,546,907 | 8/1996 | Komoriya et al. | 123/478 |
| 5,549,092 | 8/1996 | Hasegawa et al. | 123/478 |

*Primary Examiner*—Raymond A. Nelli
*Attorney, Agent, or Firm*—Birch, Stewart, Kolasch & Birch, LLP.

[57] ABSTRACT

A fuel injection control apparatus for an internal combustion engine includes an electronic control unit (23) which has a fuel injection information calculating section for periodically calculating fuel injection information according to the operation state of the engine, a temporary setting section for temporarily setting fuel injection information derived at specific timing prior to the actuation of the fuel injection valve in a desired operation cycle as fuel injection information in the desired operation cycle, and a correcting section for correcting the temporally set fuel injection information based on fuel injection information derived at a correction timing set later than the specific timing; and a fuel injection valve driving section (34) for driving the fuel injection valves (8) provided for the respective cylinders of the engine for each operation cycle of the engine based on the fuel injection information, to thereby effect more adequate fuel injection control based on the newest fuel injection information.

43 Claims, 35 Drawing Sheets

FIG.11

LATTER-STAGE INJECTION

FORMER-STAGE INJECTION

ADVANCE

T

RETARD

ADVANCE $\Delta P_W$

RETARD

N_E

FUEL INJECTION CONTROL APPARATUS AND METHOD FOR AN INTERNAL COMBUSTION ENGINE

TECHNICAL FIELD

This invention relates to fuel injection control apparatus and method which are suitable for use with an internal combustion engine, particularly suited for an in-cylinder injection type automotive internal combustion engine which is adapted to directly inject fuel into cylinders.

BACKGROUND ART

A multi-point type injection system (hereinafter referred to an MPI) having fuel injection valves (injectors) which are provided for respective cylinders is known as a fuel supply system for internal combustion engines. Generally, an MPI type internal combustion engine is provided with injectors which are arranged to be open to the intake manifold, and operates to inject fuel into the intake manifold through the injectors in the exhaust stroke before the intake stroke.

Ordinarily, as the injector, an electromagnetically-driven injector which is easily electronically controllable is employed. In this case, the intake air amount, supplied during a time period between preset crank phases and indicative of the engine driving state, is repeatedly detected, and a fuel injection amount corresponding to the air amount supplied into each cylinder in one intake stroke is repeatedly derived based on the thus detected intake air amount information. Further, in accordance with the result of this derivation, the injector is driven to supply the fuel.

To drive the injector, it is necessary to set the fuel injection amount and fuel injection time period. Setting of these fuel injection parameters is carried out based on the driving state (for example, detected intake air amount) of the engine. For injectors of a type where the fuel injection amount is determinable according to the valve opening time period (fuel injection time period), the fuel injection amount and fuel injection termination timing are set according to the detected intake air amount. Then, the fuel injection starting timing is set at a time point which is earlier than the fuel injection termination timing by the fuel injection time period corresponding to the fuel injection amount.

In order to drive the injector in the exhaust stroke as described above, ordinarily, based on the intake air amount detected in a desired stroke (e.g., explosion stroke) before the preceding exhaust stroke, an amount of air which will be supplied into the associated cylinder in the intake stroke subsequent to the desired stroke is estimated. Then, the fuel injection amount and fuel injection timing are set such that they correspond to the estimated value.

In an MPI engine of an ordinary type adapted to inject fuel into the intake manifold, the fuel (gasoline) is hard to be atomized and vaporized if a period of time from the fuel injection timing to the intake valve opening timing is short. Therefore, the fuel injection is effected at a certain timing in the exhaust stroke, as described above.

Recently, instead of conventional manifold-injection engines, fuel injection spark-ignition internal combustion engines of an in-cylinder injection type (hereinafter referred to as in-cylinder injection engines or cylinder-injection engines) adapted to directly inject fuel into combustion chambers and mounted on automobiles or the like have been proposed from the view points of reducing noxious exhaust gas and improving the fuel efficiency or the like. In these cylinder-injection engines, fuel is more easily atomized as compared with the case of intake-manifold injection and is generally injected at a high injection pressure towards a portion near the ignition plug or a top portion of the piston.

Specifically, at the time of light load, for example, a relatively small amount of fuel is injected into the portion near the ignition plug in a latter stage of the explosion stroke in which air flow is weak, so that only that portion which is in the vicinity of the ignition plug is set into a state having an air-fuel ratio approximately equal to the stoichiometric air-fuel ratio and the remaining portion is set into an extremely lean air-fuel ratio state, to thereby attain preferable combustion with a small amount of fuel.

Further, at the time of heavy load, fuel of an amount which realizes the stoichiometric air-fuel ratio is injected in an initial stage of the intake stroke in which air flow is strong, whereby efficient combustion and high power can be attained while the fuel is sufficiently atomized and vaporized. In this case, the fuel injection termination timing cannot be sometimes delayed to an extent long enough to sufficiently atomize and vaporize the fuel. Therefore, the fuel injection is started at a late-stage of the exhaust stroke if a required amount of fuel is large.

In cylinder-injection engines, like the case of MPI engines, the fuel injection amount and fuel injection timing must be set based on the engine driving state (for example, intake air amount) in order to operate the injectors.

Setting of the fuel injection amount and fuel injection timing in cylinder-injection engines may be effected based on the intake air amount detected in the explosion stroke in the same manner as in the case of MPI engines. When the fuel injection is effected in the compression stroke in cylinder-injection engines, however, the fuel injection amount and fuel injection time can be set based on an intake air amount actually supplied into the cylinder in the intake stroke. Further, in a case where fuel injection is effected in the intake stroke, setting of the fuel injection amount and fuel injection timing can be made based on the intake air amount detected in the exhaust stroke, for example. In these cases, an intake air amount actually supplied into the cylinder can be estimated based on the value of the intake air amount detected at a time point which is closer to the fuel injection timing, whereby the precision of setting the fuel injection amount and fuel injection timing can be improved.

In cylinder-injection engines which effect fuel injection at various timings according to the rotation speed and load condition of the engine as mentioned above, the fuel injection amount and fuel injection timing must be set based on the result of detection of the intake air amount at a timing which is as close to the fuel injection timing as possible, while taking the fuel injection timing into consideration.

Various proposals on the fuel injection control of cylinder-injection engines have been made. For example, the technique relating to a cylinder-injection engine adapted to inject fuel separately in the intake stroke (first-term injection or former-stage injection) and in the compression stroke (second term injection or latter-stage injection) is disclosed in Japanese Provisional Patent Publications Nos. 3-294640 and 5-7138.

More specifically, Japanese Provisional Patent Publication No. 3-294640 discloses a technique in which injection control values in the intake and compression strokes and ignition control value which are calculated on the basis of the engine driving state observed at the same point of time are utilized through one combustion cycle of the engine, so as to attain the matching between the fuel injection amounts in the intake and compression strokes and the ignition timing, thereby attaining preferable combustion. Japanese Provisional Patent Publication No. 5-71383 discloses a technique for changing the ratio between the former-stage injection and the latter-stage injection according to a target air-fuel ratio in an attempt to attain preferable combustion. However, with these techniques, setting of the fuel injection amount and fuel injection time is not necessarily based on data obtained at a time point which is as close to the fuel injection timing as possible.

In relation to an MPI engine which is not a cylinder-injection engine but injects fuel into the intake manifold, Japanese Provisional Patent Publication No. 4-292543 discloses a technique for effecting the former-stage injection at a timing (for example, in the explosion stroke) before the ordinary fuel injection timing in MPI engines so as to sufficiently atomize and vaporize the fuel, and effecting the latter-stage injection subsequently (for example, in the exhaust stroke). According to this technique, the total fuel injection amount can be controlled to an adequate value by effecting the latter-stage injection based on the newest data (intake air amount) while sufficiently atomizing and vaporizing the fuel supplied in the former-stage injection. However, this technique is strictly based on the precondition that the two-way split injection is carried out to inject fuel separately in the former- and latter-stage modes, and hence cannot be applied to a system adapted to inject fuel only in either one of the former and latter stages.

Cylinder-injection engines are advantageous in that the ignition can be effected even with a lean air-fuel ratio as a whole by supplying a mixture with an air-fuel ratio close to the stoichiometric air-fuel ratio locally into a cavity formed in the piston or a portion around the ignition plug, the discharge amount of CO and HC can be reduced, and the fuel consumption efficiency at the time of idling operation and ordinary running operation can be greatly enhanced. Further, cylinder-injection engines are advantageous in that they have an excellent acceleration/deceleration response since the fuel injection amount can be increased or reduced without fuel transportation delay in the intake manifold.

However, in cylinder-injection engines, the air-fuel ratio in a portion near the ignition plug sometimes becomes excessively high, at the time of heavy load, with an increase in the fuel injection amount so that an ignition failure may occur. For the reason for example that there is a difficulty in designing fuel injection valves to have a changeable injection direction and changeable injection amount per unit time, it is difficult to maintain the air-fuel ratio in the vicinity of the ignition plug at an adequate value over the entire engine operation region. Hence, cylinder-injection engines have a drawback that a stable operation region is narrow.

To eliminate such a drawback, Japanese Provisional Patent Publication No. 5-79370, etc., proposed an engine which is adapted to inject fuel at an adequate timing determined according to the load and which has combustion chambers formed into a shape to meet the manner of fuel injection just mentioned. More specifically, this engine is designed to make, depending on the load, a changeover between a latter-stage injection mode in which fuel is injected in the compression stroke and a former-stage injection mode in which fuel is injected in the intake stroke.

In this engine, at the time of light- or intermediate-load driving, fuel injection into a cavity formed in the piston is carried out at a late-stage of the compression stroke or an initial-stage of the intake stroke, to thereby create a mixture with an air-fuel ratio (the ratio of air to fuel by weight) nearly equal to the stoichiometric air-fuel ratio in the cavity or in the vicinity of the ignition plug. As a result, the ignition can be attained even with a lean air-fuel ratio (for example, 20 to 30) as a whole, the discharge amount of CO and HC is reduced, and the fuel consumption efficiency at the time of idling operation and ordinary running operation can be significantly enhanced. Further, at the time of heavy load, fuel is injected towards the outside of the cavity in the intake stroke to create a mixture with an air-fuel ratio uniformly in the combustion chamber. This makes it possible to burn fuel which is equal in quantity to that for manifold-injection type engines, so that an output power required at the time of starting or acceleration of a vehicle can be reliably generated.

Ordinarily, in setting the fuel injection timing of the cylinder-injection engine, the valve opening time period of the fuel injection valve is set based on the fuel pressure and fuel injection amount, and the fuel injection termination timing is so determined as to terminate the fuel injection in the intake stroke or compression stroke, for example. Further, the injection start timing is determined by subtracting the valve opening time from the termination time. A high fuel pressure required for in-cylinder injection is created by a mechanical fuel pump driven by the engine, while a low fuel pressure created by an electrical fuel pump is utilized at the start of the engine at which the engine rotation speed is extremely low.

The above-described cylinder-injection engines have an inherent problem such that at the time of starting and accelerating the engine the fuel injection is effected at an inappropriate timing although they provide a good acceleration/deceleration response.

For example, at the start of the engine, since the engine rotation speed rapidly increases after the first explosion, the termination timing of fuel injection is sometimes shifted into the compression stroke even if the fuel injection is started at an injection start timing determined so as to terminate the fuel injection in the intake stroke. In this case, there occurs such a problem that the internal pressure in the cylinders becomes higher than the fuel pressure created by the electrical fuel pump so that air-fuel mixture gas flows in a reverse direction into fuel injection valves to stain the interior of the valves.

Further, even if the termination timing of fuel injection is set to lie in the compression stroke when the engine runs at idle, the termination timing is sometimes shifted thereafter into the combustion stroke when the engine rotation speed is increased by a subsequent vehicle starting and accelerating operation. Since no fuel transportation delay in the intake manifold occurs in cylinder-injection engines, smoke (dark smoke) may be caused due to insufficient vaporization of fuel liquid drops.

The start timing of fuel injection which is determined based on the termination timing and valve opening time period as described above is set in a timer in a fuel injection controller. However, a value representing the start timing sometimes exceeds the maximum value which can be set in the timer in a case where the engine rotation speed is extremely low at the start of the engine. In this case, the injection start timing cannot be set in the timer so that the fuel injection cannot be started.

DISCLOSURE OF THE INVENTION

An object of this invention is to provide a fuel injection control apparatus and fuel injection control method for an internal combustion engine which are capable of always setting a fuel injection amount and fuel injection timing with maximum possible precision in an internal combustion engine adapted to inject fuel at various timings such as a cylinder-injection type internal combustion engine.

Another object of this invention is to provide a fuel injection control apparatus and fuel injection control method for an internal combustion engine which are capable of adequately setting the start and termination timings of fuel injection, to thereby prevent occurrences of ignition failure, discharge of dark smoke, and stains of the interior of fuel injection valves.

In order to attain the objects, according to one aspect of this invention, a fuel injection control apparatus for an internal combustion engine is provided which includes fuel injection information calculating means for periodically calculating fuel injection information in accordance with the operation state of the internal combustion engine, the fuel injection information being used to operate fuel injection valves provided for respective cylinders of the internal combustion engine; and fuel injection valve driving means for driving the fuel injection valves based on the fuel injection information derived by the fuel injection information calculating means in association with operation cycles of the internal combustion engine.

The control apparatus comprises setting means for setting fuel injection information derived by the fuel injection information calculating means at a specific timing before the actuation of the fuel injection valve in a desired operation cycle, as fuel injection information in the desired operation cycle; driving information outputting means for outputting driving information based on which the internal combustion engine is driven; and correction means for correcting at least part of the fuel injection information set by the setting means, the correction being made at a correction timing later than the specific timing in accordance with driving information which is output from the driving information outputting means.

An advantage of the control apparatus of this invention is for example that fuel injection can be effected based on fuel injection information set by the setting means in a case where the fuel injection amount is large and the fuel injection start timing is early. If the driving information varies in a period between the specific timing and the correction timing, such a variation can be reflected on the actual fuel injection. Therefore, fuel injection which quickly follows a variation in a required fuel injection state and which permits stable combustion can be realized. As a result, for example, acceleration driving of the engine can be rapidly carried out and an engine braking action can be rapidly attained.

Preferably, the driving information outputting means outputs fuel injection information derived at the correction timing by the fuel injection means, as the driving information. In this case, if fuel injection information varies in a period between the specific timing and the correction timing, the variation can be reflected on the actual fuel injection.

More preferably, the fuel injection information calculated by the fuel injection information calculating means contains fuel injection amount information and fuel injection timing information. In this case, fuel injection can be effected at adequate timing by an adequate amount, and hence the fuel injection control can be so effected as to attain stable combustion.

In the preferable control apparatus using the fuel injection information which includes the fuel injection amount information and the fuel injection time information, preferably, the correction means corrects the fuel injection amount information set by the setting means. This correction is made based on the fuel injection amount information derived at the correction timing by the fuel injection information calculating means. The correction means also corrects the fuel injection timing information set by the setting means, the correction being made based on a relation between the correction timing and the fuel injection timing information which is derived at the correction timing by the fuel injection information calculating means.

According to this preferable control apparatus, the fuel injection amount information can be adequately set based on the newest data, and the fuel injection can be effected at the optimum timing. Therefore, fuel injection which quickly follows a variation in the required fuel injection state and which permits stable combustion can be realized.

In the just-mentioned preferable control apparatus, preferably, the correction means corrects the fuel injection timing information so that a later one of the correction timing and a fuel injection start timing which is determined based on the fuel injection timing information derived at the correction timing by the fuel injection information calculating means is set as the fuel injection start timing if the correction timing precedes the fuel injection start timing which is determined based on the fuel injection timing information set by the setting means. In this case, fuel injection can be effected at adequate timing based on the newest data and fuel injection which quickly follows a variation in the required fuel injection state and permits stable combustion can be realized.

The correction means leaves the fuel injection start timing, determined based on the fuel injection timing information set by the setting means, as it is set as a fuel injection start timing if the fuel injection start timing determined based on the fuel injection timing information set by the setting means precedes the correction timing. In this case, fuel injection can be effected at the best possible appropriate timing in the correction timing, and fuel injection which quickly follows a variation in the required fuel injection state and permits stable combustion can be realized.

The correction means leaves a fuel injection start timing, determined based on the fuel injection timing information set by the setting means, as it is set as the fuel injection start timing if the fuel injection start timing determined based on the fuel injection timing information set by the setting means precedes the correction timing. The correction means corrects the fuel injection timing information set by the setting means such that the correction timing is set as a fuel injection termination timing if a fuel injection time period from the fuel injection start timing to the correction timing is longer than a fuel injection time period determined based on the fuel injection information which is derived at the correction timing by the fuel injection information calculating means. In this case, even when an amount of fuel required at the correction timing decreases, the fuel injection can follow this reduction and rapidly follow the requirement of deceleration or of interruption of acceleration, while enjoying improved accelerating performance of the engine.

In the above preferable control apparatus which uses the fuel injection information containing the fuel injection amount information and the fuel injection time information, preferably, the fuel injection valve driving means further includes re-correction means for driving the fuel injection valves based on a result of correction by the correction means and for setting additional fuel injection amount information based on a difference between the fuel injection amount information derived at the correction timing and the fuel injection amount information derived at re-correction timing which lags behind the correction timing in a specific cycle by the fuel injection information calculating means. The fuel injection valve driving means drives the associated fuel injection valve twice in the same operation cycle so as to effect additional fuel injection based on the additional fuel injection amount information set by the re-correction means.

In this case, if the detected fuel injection information varies in a period between the set timing and the correction timing, the variation can be reflected on the actual fuel injection, and fuel injection can be realized to follow an increase in the fuel injection amount required in a period from the correction timing to the re-correction timing by effecting the additional injection based on the setting by the re-correction means after the correction timing. Therefore, fuel injection which quickly follows a variation in the required fuel injection state and permits stable combustion can be realized.

More preferably, the internal combustion engine is constructed as an in-cylinder injection type internal combustion engine having the fuel injection valves disposed to directly inject fuel into combustion chambers and is operable in a former-stage injection mode in which fuel injection is effected mainly in an intake stroke and in a latter-stage injection mode in which fuel injection is effected mainly in a compression stroke. The fuel injection valve driving means drives the fuel injection valves based on resultant fuel injection information set by the setting means and then corrected by the correction means if the internal combustion engine is operated in the former-stage injection mode, and drives each fuel injection valve based on the additional fuel injection amount information while that stroke is being carried out which corresponds to the latter-stage injection mode and which is one of strokes belonging to the same cycle as a cycle in which the fuel injection valve is driven. In this case, such an increase in the fuel injection amount as to quickly follow a request of increasing the fuel injection amount can be attained. Therefore, fuel injection which quickly follows a variation in the required fuel injection state and permits stable combustion can be realized.

In the preferable apparatus which uses the fuel injection information containing the fuel injection amount information and fuel injection timing information, preferably, the fuel injection information calculating means sets a fuel injection termination timing which meets the operation state of the internal combustion engine and a fuel injection start timing which is based on the fuel injection termination timing and the fuel injection amount information, as the fuel injection timing information. In this case, the fuel injection can be effected at an adequate timing by an adequate amount, so that the fuel injection control operation can be effected to attain stable combustion.

In the preferable apparatus having the driving information outputting means for outputting the fuel injection information derived at the correction timing by the fuel injection means as the driving information, preferably, the internal combustion engine is a multi-cylinder internal combustion engine and effects sequential injection for sequentially injecting fuel from the fuel injection valves provided for the respective cylinders according to stoke states of the respective cylinders. The correction timing for a desired cylinder is set to coincide with the specific timing for another cylinder. In this case, fuel injection of each cylinder can be efficiently and stably controlled while the same data is used for the setting and correction of pieces of fuel injection valve control information for plural cylinders.

Alternatively, the internal combustion engine is constructed as an in-cylinder injection type internal combustion engine which has the fuel injection valves disposed to directly inject fuel into the cylinders. In this case, for example, fuel injection can be realized also in the intake stroke and compression stroke in addition to the exhaust stroke. Thus, by adding the above-described various constituents to the in-cylinder injection type internal combustion engine capable of injecting fuel in such a wide time range, fuel injection can be realized with an optimum fuel injection amount and fuel injection timing based on the newest data. This significantly contributes to enhancement of the performance of the in-cylinder injection type internal combustion engine.

In the preferable apparatus for use with the in-cylinder injection type internal combustion engine, preferably, the internal combustion engine is a four-cylinder internal combustion engine which is operable in a former-stage injection mode in which fuel injection is effected mainly in the intake stroke of the internal combustion engine and in a latter-stage injection mode in which fuel injection is effected mainly in the compression stroke of the internal combustion engine. The specific timing for each cylinder of the internal combustion engine is set near the bottom dead center in the exhaust stroke in the cylinder. The fuel injection valve driving means drives the fuel injection valves of the respective cylinders based on resultant fuel injection information set by the setting means and then corrected by the correction means, if the internal combustion engine is operated in the former-stage injection mode. In this case, for example, while setting fuel injection control information by effecting the setting, correcting and re-correcting operations as described above in the former-stage injection mode, fuel injection with an optimum fuel injection amount and fuel injection timing determined based on the newest data can be realized by effecting the fuel injection based on the set control information. This significantly contributes to enhancement of the performance of the in-cylinder injection type internal combustion engine.

More preferably, the fuel injection valve driving means drives the fuel injection valve of each cylinder based on the fuel injection information derived at the correction timing for the cylinder by the fuel injection information calculating means, if the internal combustion engine is operated in the latter-stage injection mode. In this case, fuel injection can be realized with an optimum fuel injection amount and fuel injection timing based on the newest data.

In the fuel injection control apparatus for an internal combustion engine according to this invention, preferably, the driving information outputting means determines whether or not fuel injection based on the fuel injection information derived by the fuel injection information calculating means at the specific timing is effected at the correction timing. If the driving information outputting means determines that the fuel injection is effected at the correction timing, the correction means sets a fuel injection termination timing as the correction timing by correcting the fuel injection information set by the setting means. In this case, unwanted fuel injection in that stroke which corresponds to neither the former-stage injection mode nor the latter-stage injection mode among the strokes belonging to a cycle of the internal combustion engine can be prevented. As a result, the discharge amount of noxious exhaust gas components can be suppressed and the fuel efficiency can be enhanced.

In this preferable apparatus, preferably, the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into the combustion chambers. The fuel injection control apparatus further includes fuel pressure switching means for switching the pressure of fuel injected from the fuel injection valves between at least two stages of high pressure side and low pressure side. In this case, the fuel pressure can be switched according to the engine driving state, whereby necessary fuel can be supplied irrespective of the engine driving state. For example, fuel supply can be effected by use of a low-pressure fuel supply source which is driven by a driving source other than the engine in a case where a high-pressure fuel supply source which is driven by the engine is not normally operated at the start of the engine.

More preferably, the driving information outputting means determines whether or not fuel injection is effected in the former-stage injection mode and determines whether or not the fuel pressure is switched to the low-pressure side by the fuel pressure switching means, and if it determines that fuel injection is effected in the former-stage injection mode and the fuel pressure is switched to the low-pressure side, it sets the correction timing to a timing at which the intake stroke is almost terminated. In this case, the valve opening time of the fuel injection valve can be prevented from being shifted into the compression stroke and staining of the interior of the fuel injection valves by the reverse flow of gas can be prevented.

The driving information outputting means determines whether or not fuel injection is effected in the latter-stage injection mode and determines whether or not the fuel pressure is switched to the high-pressure side by the fuel pressure switching means, and if it determines that fuel injection is effected in the latter-stage injection mode and the fuel pressure is switched to the high-pressure side, it sets the correction timing to a timing at which the compression stroke is almost terminated. In this case, fuel injection in the combustion stroke can be prevented and generation of smoke or the like is prevented.

In the preferable apparatus which sets the fuel injection termination timing as the correction timing if fuel injection based on fuel injection information derived at the specific timing is effected at the correction timing, preferably, the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into the combustion chambers. If the driving information outputting means determines that the fuel injection is effected at the correction timing, the correction means outputs an earlier one of a predetermined timing which lags behind the correction timing and the fuel injection termination timing which is based on the fuel injection information set by the setting means, as fuel injection termination timing, to the fuel injection valve driving means. In this case, for example, shifting of the fuel injection operation into the combustion stroke which would be otherwise caused by a rapid increase in the engine rotation speed, e.g., at the time of starting a vehicle from the idling operation can be prevented, thereby preventing generation of smoke or the like.

In the fuel injection control apparatus for an internal combustion engine according to this invention, preferably, the driving information outputting means determines whether or not fuel injection based on fuel injection information derived by the fuel injection information calculating means at the specific timing is effected at the correction timing. If the driving information outputting means determines that the fuel injection is not yet effected at the correction timing, the correction means sets the correction timing as a fuel injection start timing by correcting the fuel injection information set by the setting means. In this case, fuel injection can be forcedly started if necessary.

In this preferable apparatus, preferably, the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into the combustion chambers. In this case, fuel injection can be effected with an optimum fuel injection amount and fuel injection timing based on the newest data and the performance of the in-cylinder injection type internal combustion engine can be enhanced.

More preferably, the driving information outputting means further determines whether or not the fuel injection is effected in the former-stage injection mode. If the driving information outputting means determines that the fuel injection is effected in the former-stage injection mode, the correction means effects the correction of the fuel injection information. In this case, fuel injection can be effected with an optimum fuel injection amount and fuel injection timing based on the newest data by effecting the fuel injection based on the corrected control information while correcting the fuel injection control information in the former-stage injection mode.

In the preferable apparatus which sets the correction timing as the fuel injection start timing if fuel injection is not yet effected at the correction timing, preferably, the correction timing is a timing at which the maximum countable time of a timer elapses from the specific timing. The timer is adapted to count an elapsed time period from the specific timing, and the elapsed time period is used to detect the fuel injection start timing which is derived from fuel injection information derived by the fuel injection information calculating means at the specific timing. In this case, fuel injection can be started even when a measurement time required to detect the set fuel injection start timing has exceeded the measurable capacity of the time counting means, e.g., at the start of the engine at which the engine rotation speed is low.

According to another aspect of this invention, there is provided a fuel injection control method for an internal combustion engine for periodically calculating fuel injection information in accordance with the operation state of the internal combustion engine, and driving fuel injection valves provided for respective cylinders of the internal combustion engine based on the fuel injection information in association with operation cycles of the internal combustion engine.

The control method comprises a first step of setting fuel injection information derived at specific timing in a desired operation cycle of the internal combustion engine as fuel injection information in the desired operation cycle; a second step of correcting at least part of the fuel injection information set in the first step, at a correction timing which lags behind the specific timing in the desired operation cycle in accordance with driving information of the internal combustion engine; and a third step of driving the fuel injection valves in the desired operation cycle based on the fuel injection information corrected in the second step.

According to the control method, the same advantages as those obtained by the control apparatus of this invention can be attained. That is, fuel injection which rapidly follows a variation in the required fuel injection state and permits stable combustion can be realized.

The control method of the present invention may include a variety of preferable aspects which correspond to the above-mentioned preferable aspects of the control apparatus of this invention and which produce equivalent effects, respectively.

BRIEF DESCRIPTION OF THE DRAWINGS

FIG. 11 is a diagram showing a fuel injection termination timing setting map used by fuel injection termination timing setting means shown in FIG. 3;

FIG. 12 is a diagram showing a latter-stage supplement injection termination timing setting map used by re-correction means shown in FIG. 3;

Best Mode of Carrying Out the Invention

Figure 4:
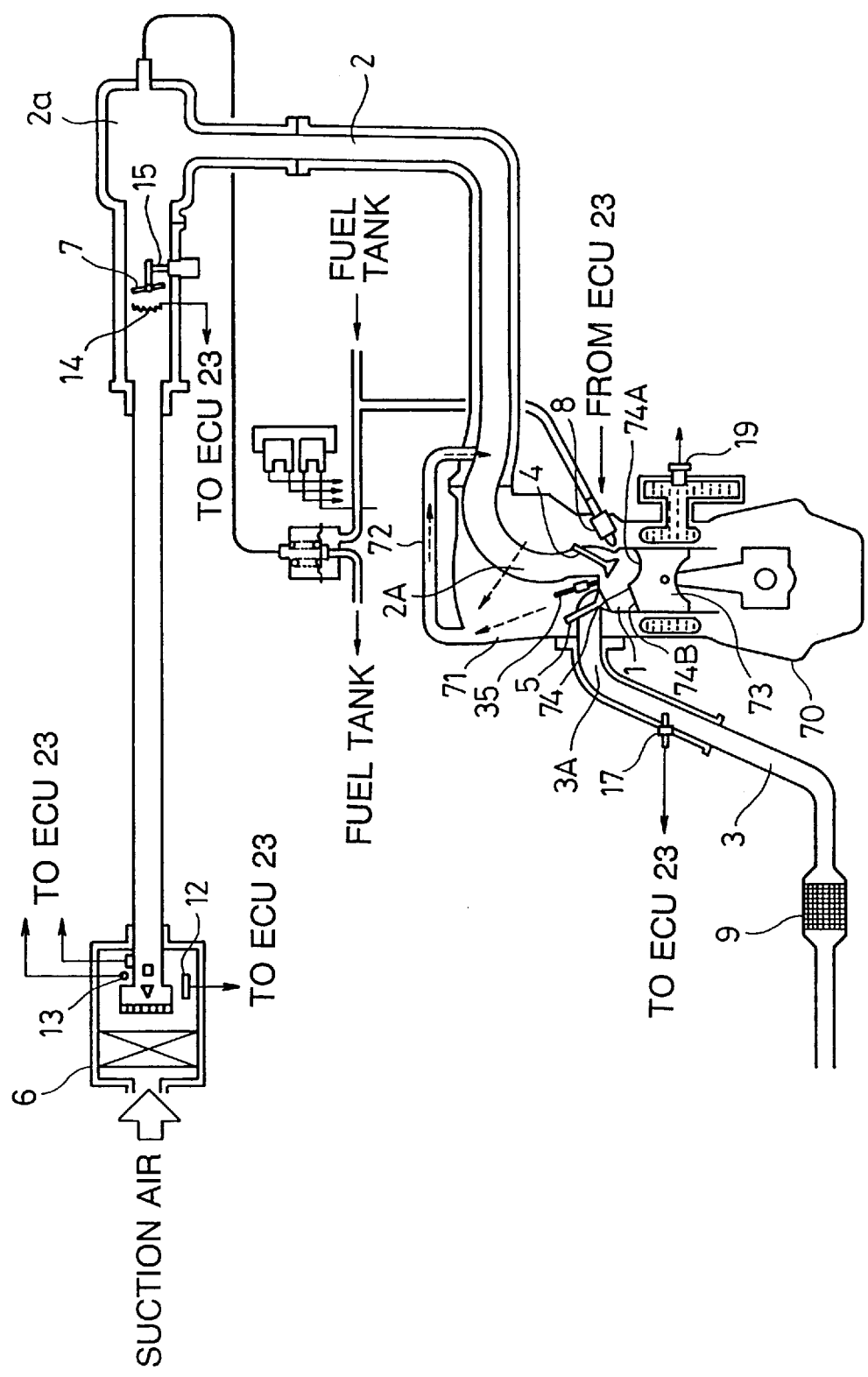
FIG. 4 is a schematic view showing an engine system having the fuel control apparatus of FIG. 1 mounted thereon.

An internal combustion engine having a fuel injection control apparatus according to a first embodiment of this invention mounted thereon is constructed as shown in FIG. 4. Referring to FIG. 4, an internal combustion engine 70 is constructed as an in-cylinder injection engine which is of spark-ignition type and which directly injects fuel into the cylinders. This engine has an intake passage or intake manifolds 2 and exhaust passage or exhaust manifolds 3 which are communicated with combustion chambers thereof, respectively. Communication between the intake passage 2 and the combustion chambers 1 is controlled by intake valves 4 and communication between the exhaust passage 3 and the combustion chambers 1 is controlled by exhaust valves 5.

An air cleaner 6 and throttle valve 7 are disposed in the intake passage 2 in this order from the upstream side, and a catalytic converter for exhaust gas purification (three-way catalytic converter) 9 and muffler which is not shown in the drawing are disposed in the exhaust passage 3 in this order from the upstream side. Further, a surge tank 2a is disposed in the intake passage 2. In addition, a blowby gas passage 72 is provided to deliver blowby gas from a cylinder head 71 to the intake passage 2.

The throttle valve 7 is connected to an accelerator pedal (not shown) via a wire cable (not shown) and the opening degree of the throttle valve is changed according to the amount of depression of the accelerator pedal. Further, the throttle valve 7 is also driven to be opened and closed by an idling speed control motor (ISC motor) which is not shown, so that the opening degree of the throttle valve 7 can be changed without depressing the accelerator pedal at the time of idling of the engine.

The openings (fuel injection ports) of injectors (fuel injection valves) 8 are disposed to face the combustion chambers 1 so as to directly inject fuel into the combustion chambers 1 of the cylinders. Specifically, each injector 8 is disposed to inject fuel towards the top portion 74 of a corresponding one of pistons 73 having a geometrical feature as described later. The injectors 8 are provided for respective cylinders. For example, four injectors 8 are provided if the engine 70 of this embodiment is a straight type four-cylinder engine.

With the above structure, air sucked via the air cleaner 6 according to the opening of the throttle valve 7 is supplied into a respective combustion chamber 1 by opening the associated intake valve 4. The introduced air and fuel directly injected from the injector 8 are mixed in the combustion chamber 1. The mixture is burnt by causing a spark plug 35 to ignite the mixture at an adequate timing in the combustion chamber to thereby generate engine torque and is then discharged as exhaust gas to the exhaust passage 2. Three noxious components of CO, HC and NOx in the exhaust gas are cleaned by the catalytic converter 9. Then, the exhaust gas is emitted into the atmosphere while muffling the sound by the muffler.

The above engine is so constructed that intake air flow introduced into the combustion chamber 1 from the intake passage 2 creates a vertical vortex (reverse tumble flow).

Specifically, that portion (hereinafter referred to as an intake port) 2A of the intake passage 2 which is close to the combustion chamber 2 is directed substantially parallel to the axial center of the cylinder. If the intake valve 4 is opened, intake air from the intake passage 2 flows in the combustion chamber 1 along one side of the chamber in a direction substantially parallel to the axial center of the cylinder towards the piston top portion 74 located below. A concave portion (curved portion) 74A which is curved in a concave-curved shape is formed on a portion of the piston top portion 74 on the intake valve 4 side. Further, a projecting portion 74B protruding above the concave portion 74A is formed near the concave portion 74A on a portion of the piston top portion 74 on the exhaust valve 5 side.

With this structure, at the time of termination of the compression stroke of the piston 73, the combustion chamber 1 is made compact by the concave portion 74A, the inner wall of the cylinder 70 and the cylinder head 71. Further, a squish area is formed between the projecting portion 74B of the piston top portion 74 and the upper portion of the combustion chamber 1 on the exhaust port 3A side.

With the above structure, after intake air introduced from the intake port 2A flows towards the piston top portion 74 lying below, the intake air is guided along the concave portion 74A of the piston top portion 74 and turns to the upper direction to create a vertical vortex (reverse tumble flow).

Since the intake air creates the vertical vortex in the combustion chamber 1, it becomes possible to collect the fuel only in a portion near the spark plug 35 disposed, e.g., at the center of the top portion of the combustion chamber 1 by use of the vertical vortex, while setting up an extremely lean air-fuel ratio state in a portion apart from the spark plug 35. That is, the fuel consumption can be suppressed while realizing the stable combustion by setting up a stoichiometric air-fuel ratio only in a portion near the spark plug 35.

Particularly, since the engine is a cylinder-injection engine, the fuel injection timing is not limited and the fuel injection can be effected at a timing most suitable for setup of the above-described unevenly distributed state of fuel. It is known in the art that the optimum fuel injection timing of this case is set in the latter stage of the compression stroke in which the air flow is weak.

Further, when a high output power is to be derived from the engine, the combustion may be effected in a state where the air-fuel mixture having the stoichiometric air-fuel ratio is distributed within the entire of the combustion chamber 1. In this case, the high output power can be derived with high efficiency by injecting the fuel at such a timing that permits the fuel to be sufficiently atomized and vaporized. It is known that the optimum fuel injection timing of this case is set to terminate the fuel injection in the initial stage or former stage of the intake stroke so as to accelerate the fuel atomization and vaporization.

Various sensors are provided in order to control the engine 70. An air-flow sensor 11 for detecting the intake air amount from Karman vortex information, an intake air temperature sensor 12 for detecting the intake air temperature, and an atmospheric pressure sensor 13 for detecting the atmospheric pressure are provided on that side of the intake passage 2 at which the air cleaner is disposed. Further, a potentiometer type throttle valve sensor 14 for detecting the opening degree of the throttle valve 7, an idling switch 15 for detecting the idling state and the like are provided on the side at which the throttle valve is disposed. In addition, an oxygen concentration sensor (hereinafter referred to as an $O_2$ sensor) 17 for detecting the concentration of oxygen in the exhaust gas is provided on the exhaust passage 3 at a location on the upstream side of the catalytic converter 9.

Figure 1:
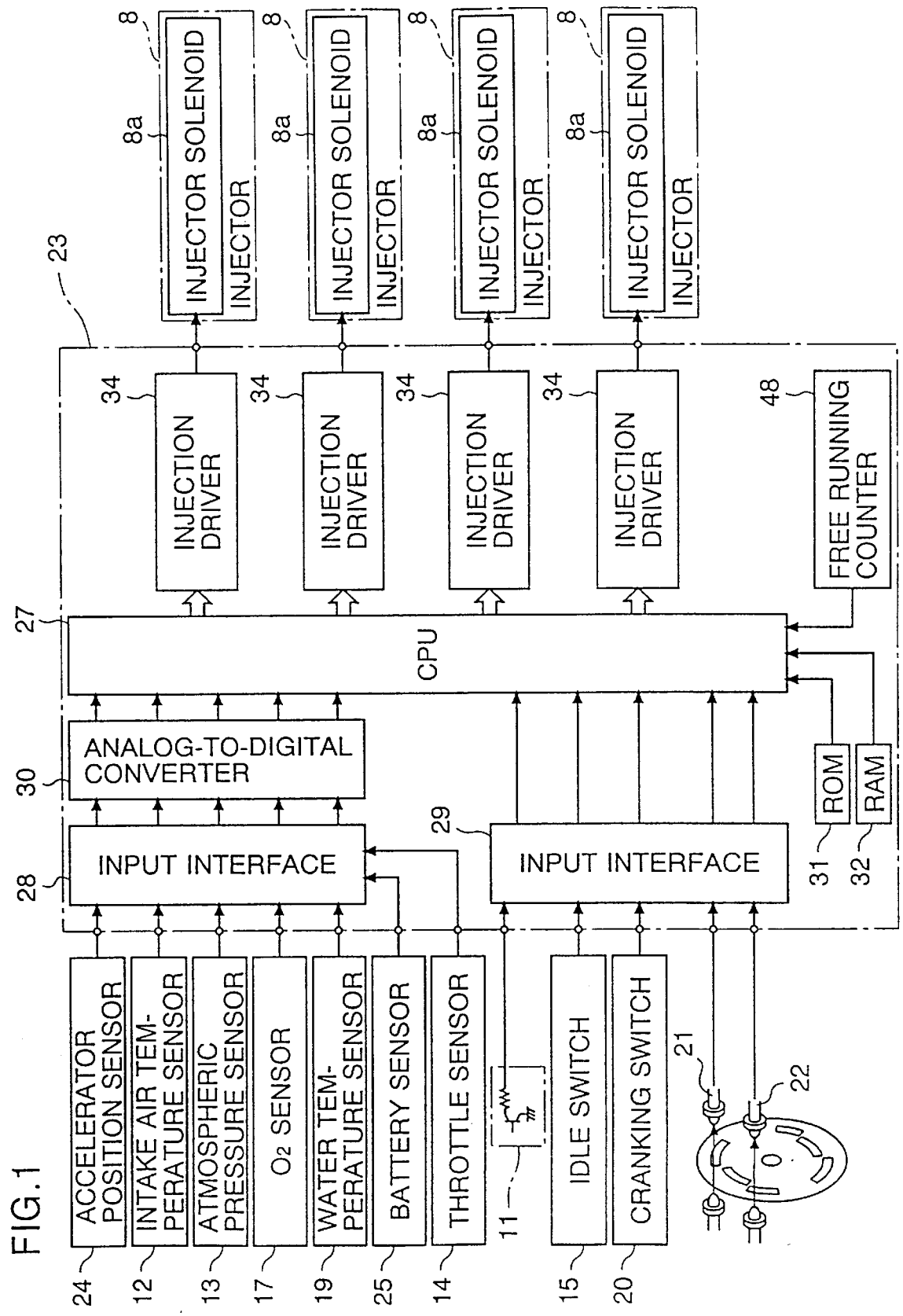
FIG. 1 is a schematic block diagram showing a fuel control apparatus for an internal combustion engine according to a first embodiment of this invention.

Further, a water temperature sensor 19 for detecting the engine cooling water temperature is provided, and as shown in FIG. 1, a crank angle sensor 21 (which also acts as a rotation speed sensor for detecting the rotation speed of the engine) and a TDC sensor (cylinder discriminating sensor) 22 for detecting the top dead center of a first cylinder (reference cylinder) are provided in the distributor.

Figure 6:
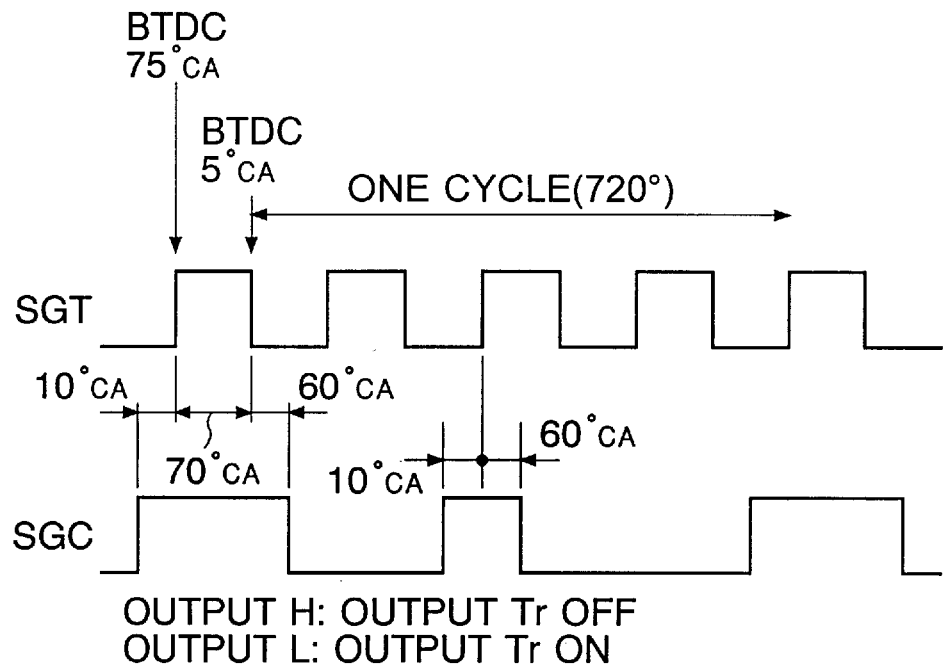
FIG. 6 is a diagram showing output signals from a crank angle sensor and cylinder discriminating sensor shown in FIG. 1 in the case of a DOHC engine.

In this embodiment, the crank angle sensor 21 is designed to output one ON signal for each 180° of crank angle for each stroke (intake, compression, explosion, exhaust) of one cycle (crank angle 720°) of the cylinder. The output signal of the crank angle sensor is comprised of an ON signal having a width corresponding to the crank angle 70° and an OFF signal having a width corresponding to the crank angle 110° as shown by way of example in FIG. 6 as a signal SGT. The timing of switching from the ON signal to the OFF signal substantially corresponds to each stroke changeover timing. In this embodiment, the timing of switching from the ON signal to the OFF signal is forwardly shifted by 5° from the stroke changeover timing.

Figure 7:
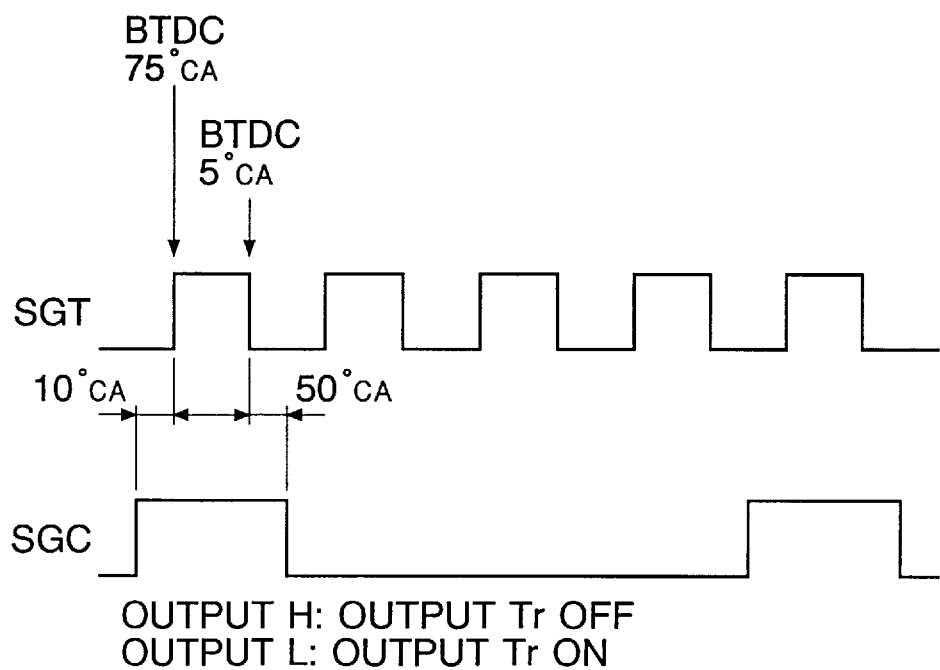
FIG. 7 is a diagram showing a crank angle sensor output signal and a cylinder discriminating sensor output signal in the case of an SOHC engine.

The cylinder discriminating sensor 22 is designed to output two different ON signals for each cycle of the cylinder in the case of a DOHC engine. The cylinder discriminating sensor output signal of this case is shown by way of example as a signal SGC in FIG. 6. In the case of an SOHC engine, the cylinder discriminating sensor 22 is designed to output one ON signal for each cycle of the cylinder. The cylinder discriminating sensor output signal of this case is shown as a signal SGC in FIG. 7 as an example. In either case, the respective cylinders can be discriminated based on these signals.

Then, the detection signals from the sensors are input to an electronic control unit (ECU) 23.

The ECU 23 is also supplied with voltage signals from an accelerator position sensor 24 for detecting the depression amount of the accelerator pedal and a battery sensor 25 for detecting the voltage of a battery and a signal from a cranking switch 20 for detecting the start of the engine or an ignition switch (key switch).

Figure 2:
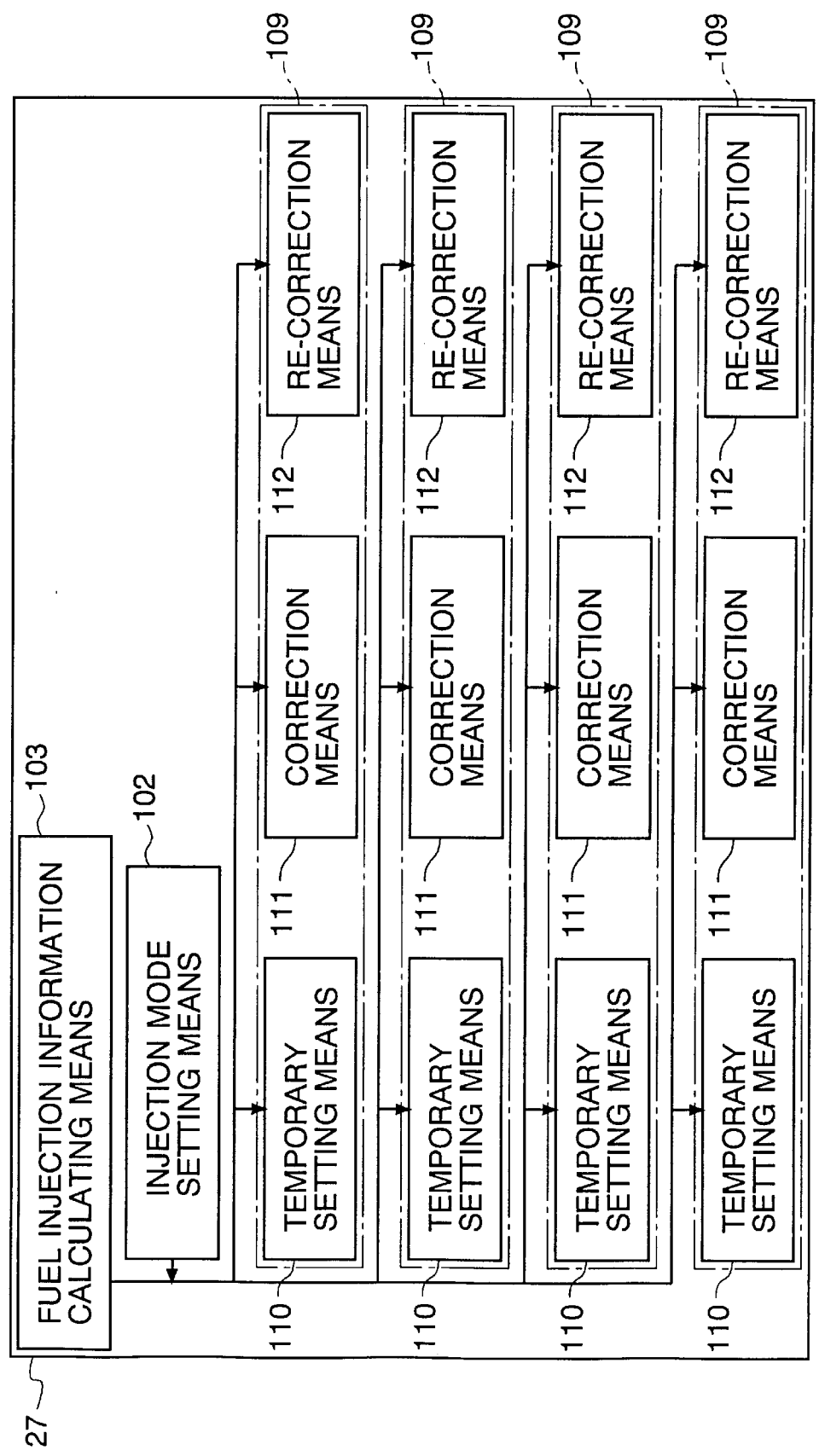
FIG. 2 is a block diagram showing in detail fuel injection information calculating means shown in FIG. 1.

The hardware construction of the ECU 23 is shown in FIGS. 1 and 2. The ECU 23 has a CPU 27 as a main portion thereof. The CPU 27 is supplied with detection signals from the intake air temperature sensor 12, atmospheric pressure sensor 13, throttle sensor 14, $O_2$ sensor 17, water temperature sensor 19, accelerator position sensor 24, and battery sensor 25 via an input interface 28 and A/D converter 30, and is supplied with detection signals from the air-flow sensor 11, crank angle sensor 21, TDC sensor 22, idle switch 15, cranking switch 20, ignition switch and the like via an input interface 29.

Further, the CPU 27 is adapted to effect data transfer via bus lines between itself and a ROM 31 for storing program data and fixed value data, a RAM 32 for storing data in a rewritable manner, free running counter 48 and a battery backup RAM (not shown) which is backed up to hold the storage content when it is connected to a battery.

Data in the RAM 32 is cleared and reset when the ignition switch is turned off.

Further, fuel injection control signals based on the result of operation in the CPU 27 are output from the CPU 27 to solenoids 8a of the injectors 8 (precisely, transistors 8b (FIG. 5) for the injector solenoids 8a) via four injection drivers (fuel injection valve control means) 34.

Figure 5:
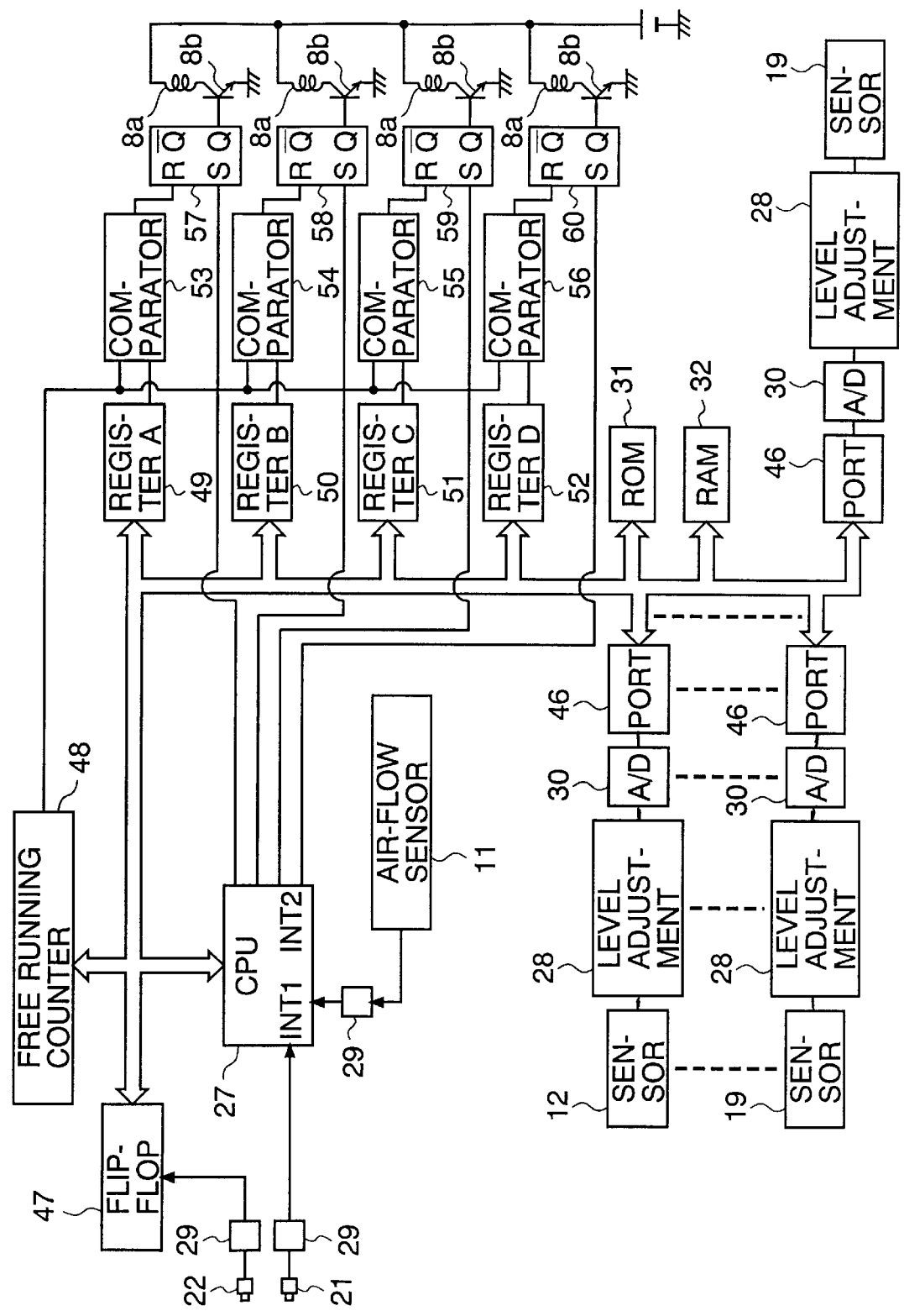
FIG. 5 is a schematic block diagram showing a fuel control system of the engine system shown in FIG. 4.

Specifically, as shown in FIG. 5, the ECU 23 includes a microcomputer having ports 46, CPU 27, ROM 31 and RAM 32, and includes an external register (flip-flop) 47 for cylinder discrimination, free running counter 48, registers 49 to 52, comparators 53 to 56, RS flip-flops 57 to 60, etc.

An output signal of the air-flow sensor 11 is input to an interruption terminal INT2 of the CPU 27. A crank phase signal from the crank angle sensor 21 is shaped into a rectangular waveform in a waveform shaping circuit 29 serving as an input interface and is then input to an interruption terminal INT1 of the CPU 27. Further, a cylinder discriminating signal from the cylinder discriminating sensor 22 is shaped into a rectangular waveform in a waveform shaping circuit 29 serving as an input interface and then input to the register 47. Signals from the intake air temperature sensor 12, atmospheric pressure sensor 13, $O_2$ sensor 17, water temperature sensor 19 and the like are adjusted to adequate levels in a level adjusting circuit 28 acting as an input interface, then subjected to the analog/digital conversion by analog/digital converters 30, and input to the ports 46.

Further, power supply from a DC power supply (battery) to the injector valve opening/closing injector solenoids 8a is ON/OFF-controlled by the switching transistors 8b, to thereby turn the injectors 8 on and off.

With regard to the fuel injection control (air-fuel ratio control), fuel injection control signals calculated in a manner described later are output from the CPU 27 via the drivers 34 (FIG. 1) to sequentially drive the four injectors 8, for example.

Particularly, as viewed from the above-mentioned features of the cylinder-injection engine, a latter-stage injection mode in which fuel injection is effected in the latter stage of the compression stroke to realize the driving in the lean-burn state (lean-burn driving) and a former-stage injection mode in which the fuel injection is terminated in the initial stage or former stage of the intake stroke to realize the driving in the combustion state with the stoichiometric air-fuel ratio (stoichiometric air-fuel ratio driving) are provided as the fuel injection modes.

Figure 3:
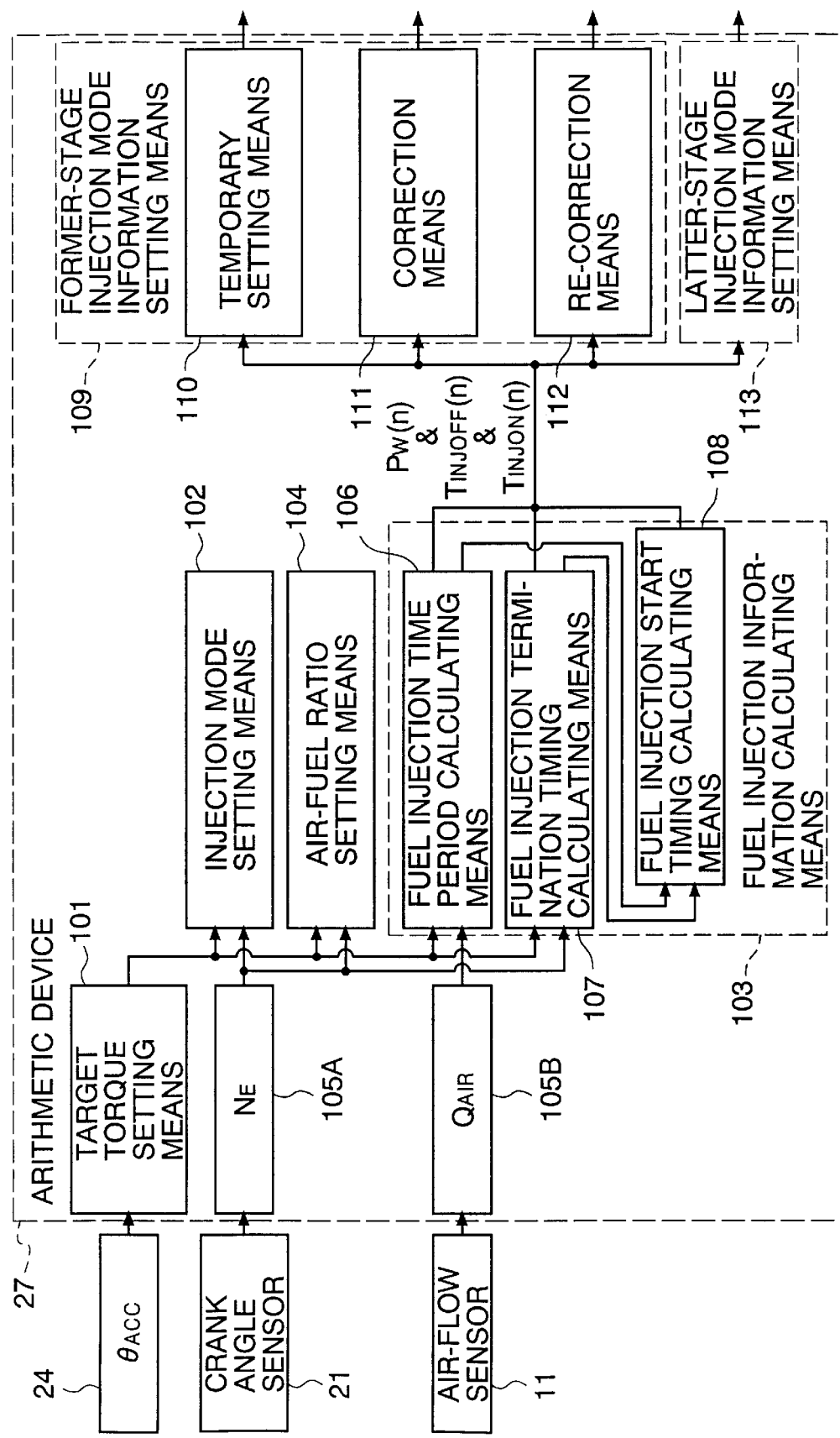
FIG. 3 is a schematic block diagram showing the function of a central processing device of an electronic control unit shown in FIG. 1.

For the fuel injection control (injector driving control) of this kind, as shown in FIGS. 1 to 3, the CPU 27 includes target torque setting means 101 for setting target engine output torque, control mode setting means (injection mode setting means) 102 for selectively setting the former-stage injection mode or the latter-stage injection mode, and fuel injection information calculating means 103 for detecting fuel injection information.

Figure 8:
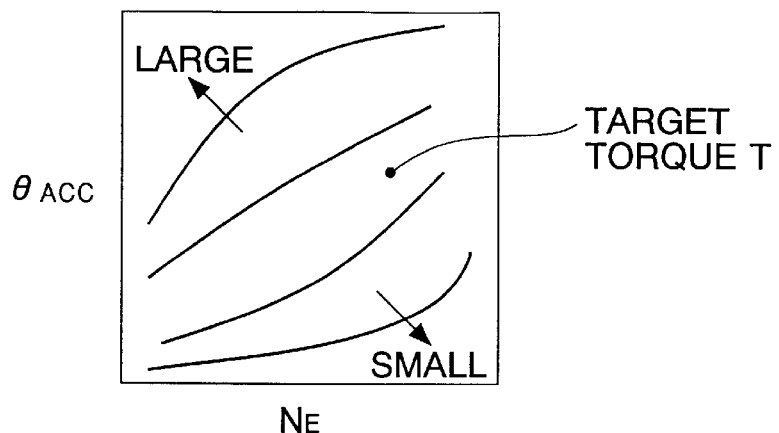
FIG. 8 is a diagram showing a target torque setting map used by target torque setting means shown in FIG. 3.

In the target torque setting means 101, target torque T is set based on an engine rotation speed $N_E$ indicating the present operating state of the engine and accelerator depression amount $\theta_{ACC}$ indicating a required engine load by use of a map shown by way of example in FIG. 8. As described before, the engine rotation speed $N_E$ is calculated in a calculating section 105A based on a signal from the crank angle sensor 21. As shown in FIG. 8, the target torque T is set to a larger value as the engine rotation speed $N_E$ is lower and the accelerator depression amount $\theta_{ACC}$ is larger, and the target torque T is set to a smaller value as the engine rotation speed $N_E$ is higher and the accelerator depression amount $\theta_{ACC}$ is smaller.

Figure 9:
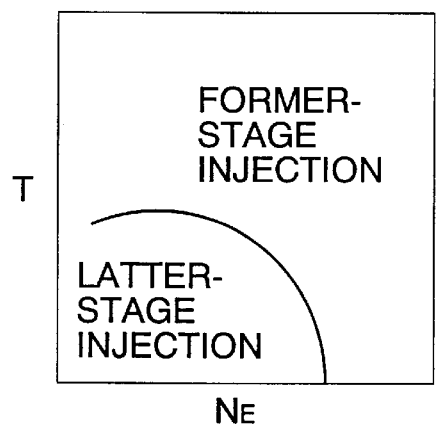
FIG. 9 is a diagram showing a control mode setting map used by control mode setting means shown in FIG. 3.

In the control mode setting means 102, one of the former-stage injection mode and the latter-stage injection mode is selected according to the engine rotation speed $N_E$ and the target torque T by use of a map shown by way of example in FIG. 9. As shown in FIG. 9, the latter-stage injection mode is selected in a region in which the engine rotation speed $N_E$ is low and the target torque T is low. On the contrary, the former-stage injection mode is selected if one of the engine rotation speed $N_E$ and the target torque T is not low.

The fuel injection information calculating means 103 includes fuel injection time period calculating means 106 for calculating a fuel injection amount or fuel injection time period (injector driving time period) $P_W(n)$, fuel injection termination timing calculating means 107 for calculating fuel injection termination timing (injector operation termination timing) $T_{INJOFF}(n)$, and fuel injection start timing calculating means 108 for calculating fuel injection start timing (injector operation start timing) $T_{INJON}(n)$ based on the above calculated values. The calculating means 103 calculates the fuel injection information items $P_W(n)$, $T_{INJOFF}(n)$ and $T_{INJON}(n)$ according to whether the control mode is the former-stage injection mode or the latter-stage injection mode.

The fuel injection time period (the width of an injector driving pulse corresponding to the injector driving time period in the actual control operation) $P_W(n)$ [msec] is calculated based on the intake air amount (intake air amount per one stroke) $Q_{AIR}$ and target air-fuel ratio (hereinafter referred to as AF) by use of the following equation, for example.

$$P_W(n) = \{Q_{AIR} \times \alpha_{AIR}/(\alpha_{FUEL} \times AF)\} \times (1/G_{INJ}) \times K \times 1000 + T_D \qquad (1)$$

In the equation (1), $Q_{AIR}$ indicates the intake air amount [litter/stroke] per one stroke and is calculated based on a detection signal from the air-flow sensor 11 in the calculating section 105B. Symbol $\alpha_{AIR}$ indicates the air density and its concrete value can be set to 1.18 [g/litter], and $\alpha_{FUEL}$ indicates the fuel density and its concrete value can be set to 0.74 [g/cc]. Symbol $G_{INJ}$ indicates an injector gain [cc/sec], K is a set of fuel correction coefficients, and $T_D$ is injector dead time [msec].

The first term in the equation (1) is a term relating to the basic driving time period Tb, and the correction coefficient K is set according to the engine cooling water temperature detected by the water temperature detecting sensor 19, the intake air temperature detected by the intake air temperature sensor 12, the atmospheric pressure detected by the atmospheric pressure sensor 13 and the like.

Figure 10:
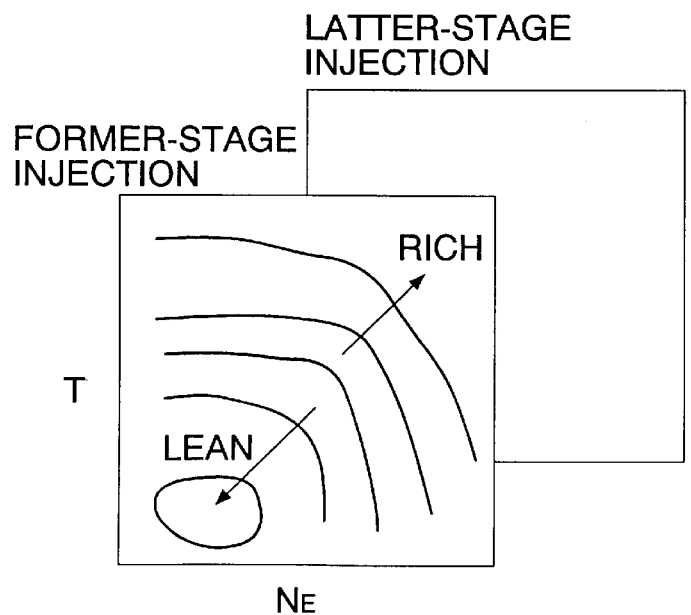
FIG. 10 is a diagram showing a target air-fuel ratio setting map used by air-fuel ratio setting means shown in FIG. 3.

The setting of air-fuel ratio is effected by air-fuel ratio setting means 104. The air-fuel ratio setting means 104 sets the air-fuel ratio AF according to the engine rotation speed $N_E$ and target torque T by use of a map shown by way of example in FIG. 10. As the air-fuel ratio setting map, a map for the former-stage injection mode and a map for the latter-stage injection mode are prepared and a corresponding one of the maps is used according to the control mode set by the control mode setting means 102. In either case, as shown in FIG. 10, AF is set to a larger value on the lean side as the engine rotation speed $N_E$ and target torque T are lower and AF is set to a larger value on the rich side as the engine rotation speed $N_E$ and target torque T are higher.

For calculation of the injector operation termination timing (fuel injection termination timing) $T_{INJOFF}(n)$ in the case of former-stage injection mode, first, the fuel injection termination timing $\theta_{INJ}$ is derived in units of crank angle. The fuel injection termination timing $\theta_{INJ}$ can be set according to the engine rotation speed $N_E$ and target torque T by use of a map shown by way of example in FIG. 11. Also, in this case, a map for the former-stage injection mode and a map for the latter-stage injection mode are prepared and a corresponding one of the maps is used according to the control mode set by the control mode setting means 102. In either case, the fuel injection termination timing $\theta_{INJ}$ is set mainly depending on the target torque T, and the fuel injection termination timing $\theta_{INJ}$ is set to a larger value on the retard side as the target torque T is lower. On the contrary, the fuel injection termination timing $\theta_{INJ}$ is set to a larger value on the advance side as the target torque T is higher.

Then, the injector operation termination timing (fuel injection termination timing) $T_{INJOFF}(n)$ is calculated based on the fuel injection termination timing $\theta_{INJ}$ according to the following equation (2), for example.

$$T_{INJOFF}(n) = (365 - \theta_{INJ}) \times [60/(N_E \times 360)] \times 1000 \qquad (2)$$

On the other hand, the injector operation termination timing $T_{INJOFF}(n)$ in the case of latter-stage injection mode is calculated based on the fuel injection termination timing $\theta_{INJ}$ indicated in units of crank angle, in accordance with the following equation (3), for example.

$$T_{INJOFF}(n) = (185 - \theta_{INJ}) \times [60/(N_E \times 360)] \times 1000 \qquad (3)$$

In both of the former-stage injection mode and latter-stage injection mode, next, the operation start timing (fuel injection start timing) $T_{INJON}(n)$ is calculated based on the fuel injection time period $P_W(n)$ and operation termination timing $T_{INJOFF}(n)$ according to the following equation (4), for example.

$$T_{INJON}(n) = T_{INJOFF}(n) - P_W(n) \qquad (4)$$

Figure 15:
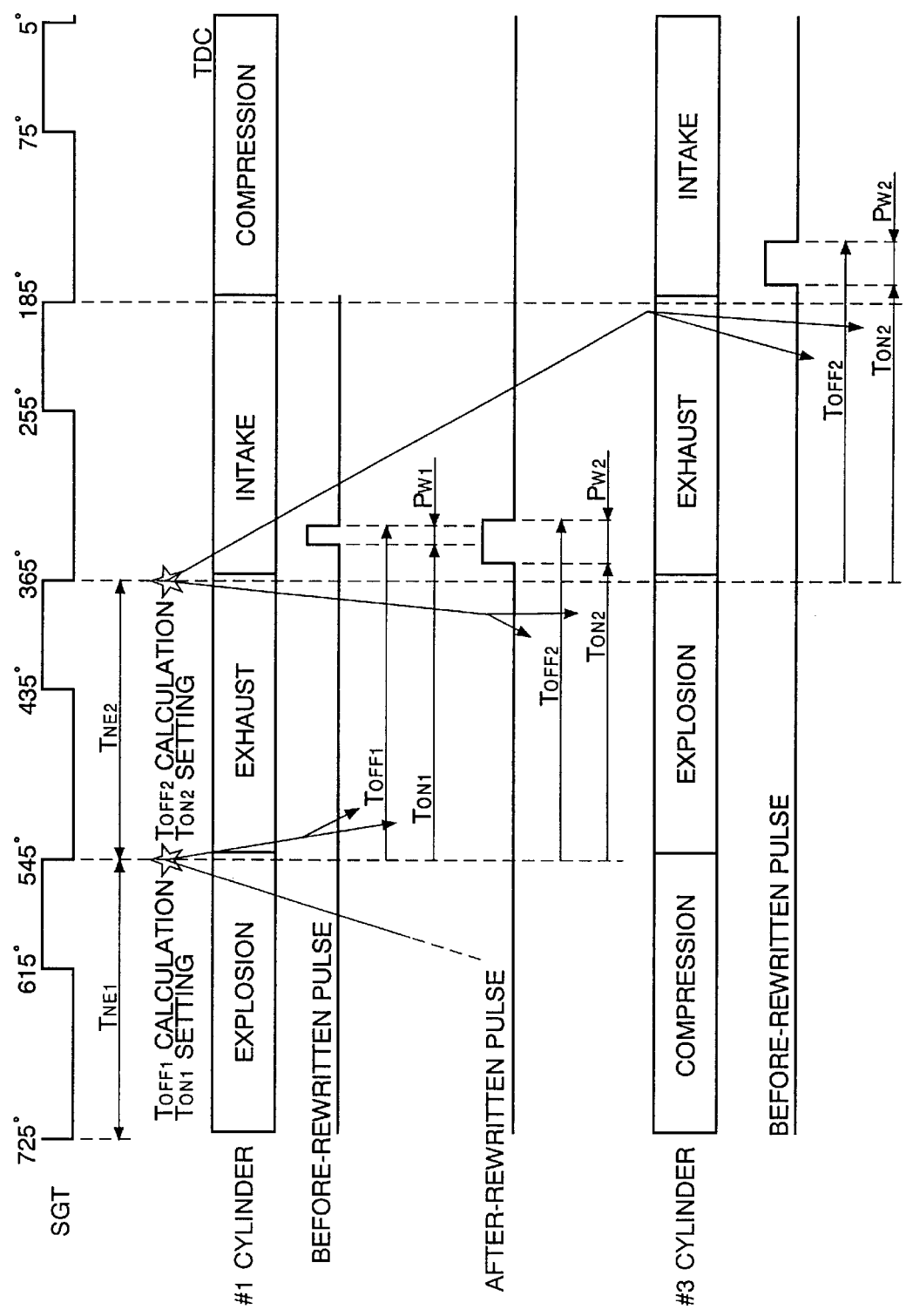
FIG. 15 is a time chart showing the operation of the fuel injection control apparatus shown in FIG. 1 in a case where the required fuel amount increases in the former-stage injection mode from a relatively small required amount.

The calculations for the fuel injection start timing $T_{INJON}(n)$, fuel injection termination timing $T_{INJOFF}(n)$ and fuel injection time period $P_W(n)$ are repeatedly effected for each 180° in response to the crank angle pulse SGT output for each stroke of the engine as shown by way of example in FIG. 15. Specifically, the calculations for $T_{INJON}(n)$, $T_{INJOFF}(n)$ and $P_W(n)$ are periodically effected in synchronism with timing at which the crank angle pulse is switched from the ON level to the OFF level. When one cylinder is considered as a reference, for example, these calculations are effected at 545° BTDC (near the bottom dead center in the exhaust stroke), 365° BTDC (near the top dead center in the exhaust stroke), 185° BTDC (near the bottom dead center in the intake stroke), and 5° TDC towards the top dead center (top dead center at the time of explosion) TDC.

The subscript n in the symbols $T_{INJON}(n)$, $T_{INJOFF}(n)$ and $P_W(n)$ indicates that information is fuel injection information calculated in the n-th calculation cycle.

In the case of former-stage injection mode, 545° BTDC of a given cylinder corresponds to the specific timing which precedes fuel injection, 365° BTDC corresponds to the correction timing, and 185° BTDC corresponds to the re-correction timing.

Control for the injector 8 provided for each cylinder is effected based on the fuel injection information thus periodically calculated by the fuel injection information calculating means 103, that is, fuel injection start timing $T_{INJON}(n)$, fuel injection termination timing $T_{INJOFF}(n)$ and fuel injection time period $P_W(n)$.

If the former-stage injection mode is selected, control information for each injector 8 is set by former-stage injection mode information setting means 109. That is, when the fuel injection start timing $T_{INJON}(n)$, fuel injection termination timing $T_{INJOFF}(n)$ and fuel injection time period $P_W(n)$ are calculated, temporary setting means (more generally, setting means) 110 temporarily sets, in respect of a cylinder which is next set into the exhaust stroke as viewed from the present time point, the fuel injection start timing $T_{INJON}(n)$ and fuel injection termination timing $T_{INJOFF}(n)$, calculated by the fuel injection information calculating means 103, as former-stage injection control information, that is, fuel injection start timing $T_{INJON1}(n)$ for former-stage injection and fuel injection termination timing $T_{INJOFF1}(n)$ for former-stage injection for the injector 8 corresponding to the just mentioned cylinder. The subscript "1" in the symbols $T_{INJON1}(n)$ and $T_{INJOFF1}(n)$ indicates that information with the symbol is former-stage injection control information. Meanwhile, latter-stage injection control information is represented by the symbols including a subscript "2".

In correction means 111, in respect of a cylinder which is next set into the intake stroke as viewed from the present time point, the fuel injection start timing $T_{INJON1}(n-1)$ and fuel injection termination timing $T_{INJOFF1}(n-1)$ which are control information for the injector 8 temporarily set in the preceding cycle are corrected by use of the fuel injection start timing $T_{INJON}(n)$ and fuel injection termination timing $T_{INJOFF}(n)$ which are calculated in the present cycle by the fuel injection information calculating means 103.

That is, when the fuel injection is now effected in a cylinder which is next set into the intake stroke, the correction means 111 sets the fuel injection termination timing $T_{INJOFF}(n)$ according to the following equation (5) so as to effect the fuel injection for the fuel injection time period $P_W(n)$ calculated in the present cycle and interrupts the driving of the injector 8 at the fuel injection termination timing $T_{INJOFF}(n)$.

$$T_{INJOFF1}(n) = T_{INJON1}(n-1) + P_W(n) \tag{5}$$

However, if the fuel injection for the fuel injection time period $P_W(n)$ calculated in the present cycle is already carried out at this time point, the driving of the injector 8 is immediately (at the present time point) interrupted, so that the fuel injection time period (more generally, the fuel injection state) can be corrected to be set as close to a present calculated value as possible.

If the fuel injection is not now effected in a cylinder which is next set into the intake stroke, the fuel injection start timing $T_{INJON1}(n-1)$ and fuel injection termination timing $T_{INJOFF1}(n-1)$ which are temporarily set are rewritten to the fuel injection start timing $T_{INJON}(n)$ and fuel injection termination timing $T_{INJOFF}(n)$ which are calculated in the present cycle. That is, in this case, the information items calculated at the 365° BTDC time (the time point of 365° BTDC) are used.

Further, the temporary setting at the 545° BTDC time is not effected in the latter-stage injection mode described later. Therefore, for example, the temporary setting at the 545° BTDC time is not effected immediately after the mode is changed from the latter-stage injection mode to the former-stage injection mode. In this case, fuel injection information is set based on information items calculated at the 365° BTDC time.

However, in this case, if the fuel injection start timing $T_{INJON}(n)$ calculated in the present cycle is the same as or precedes the present time point, the injector 8 is immediately (at this time point) driven and the fuel injection termination timing $T_{INJOFF1}(n)$ is set according to the following equation (6), so that the driving of the injector 8 can be interrupted at the set termination timing and the fuel injection time period can be set as close to the present calculated value as possible.

$$T_{INJOFF1}(n) = 180 \times [60/(N_E \times 360)] \times 1000 + P_W(n) \tag{6}$$

Further, in the re-correction means 112, latter-stage supplemental injection control information is set, if necessary, based on a deviation $\Delta P_W [= P_W(n) - P_W(n-1)]$ between the fuel injection time period $P_W(n-1)$ in the preceding cycle and the fuel injection time period $P_W(n)$ in the present cycle for a cylinder which is next set into the compression stroke as viewed from the present time point.

Specifically, the deviation $\Delta P_W$ is compared with the latter-stage supplemental injection determining pulse width (hereinafter referred to as a latter-stage supplemental injection determining reference value) $P_{W1}$. If there is an increment of the present fuel injection time period $P_W(n)$ with respect to the former-stage fuel injection time period $P_W(n-1)$, that is, if the $\Delta P_W$ is larger than the reference value $P_{W1}$, latter-stage supplemental injection control information is set, so that the latter-stage supplemental injection is effected.

The latter-stage supplemental injection control information items, that is, operation start timing (fuel injection start timing) $T_{INJON}'(n)$ and operation termination timing (fuel injection termination timing) $T_{INJOFF}'(n)$ at the time of latter-stage supplemental injection are set according to the following equations (7) and (8) based on fuel injection termination timing $\theta_{INJ}'$ which is represented in units of crank angle and which is used for latter-stage supplemental injection control.

$$T_{INJOFF}'(n) = (185 - \theta_{INJ}') \times [60/(N_E \times 360)] \times 1000 \tag{7}$$

$$T_{INJON}'(n) = T_{INJOFF}'(n) - \Delta P_W \tag{8}$$

The fuel injection termination timing $\theta_{INJ}'$ can be set according to the engine rotation speed $N_E$ and deviation $\Delta P_W$ by use of a map shown by way of example in FIG. 12. As the map of this case, a map for former-stage injection mode and a map for latter-stage injection mode are prepared and a corresponding one of the maps is used according to a control mode set by the control mode setting means 102. In either case, the fuel injection termination timing $\theta_{INJ}'$ is set depending mainly on the deviation $\Delta P_W$, the fuel injection termination timing $\theta_{INJ}'$ is set to a larger value on the retard side as the deviation $\Delta P_W$ is smaller, and the fuel injection termination timing $\theta_{INJ}'$ is set to a larger value on the advancing side as the deviation $\Delta P_W$ is larger.

If the latter-stage injection mode is selected at present, control information for each injector 8 is set by latter-stage injection mode information setting means 113. That is, in respect of a cylinder which is next set into the compression stroke, fuel injection start timing $T_{INJON2}(n)$ and fuel injection termination timing $T_{INJOFF2}(n)$ for latter-stage injection calculated by the fuel injection information calculating means 103 are set as control information for the injector 8.

Immediately after the mode setting is changed from the former-stage injection mode to the latter-stage injection mode, in respect of a cylinder which is next set to the compression stroke as viewed from the present time point, the change to the latter-stage injection for the fuel injection timing is effected from the next cycle since the fuel injection is already effected in the exhaust stroke or intake stroke before the just-mentioned compression stroke.

Immediately after the mode setting is changed from the latter-stage injection mode to the former-stage injection mode, in respect of a cylinder which is next set to the compression stroke as viewed from the present time point, the latter-stage injection is effected based on the fuel injection information set by the latter-stage injection mode information setting means 113. For the next cylinder, that is, a cylinder which is next set into the intake stroke, the correction means 111 of former-stage injection mode information setting means 109 sets fuel injection information items $T_{INJON}(n)$ and $T_{INJOFF}(n)$, calculated by the fuel injection information calculating means 103 at this time point, as former-stage injection control information for the injector 8.

However, in this case, if the fuel injection start timing $T_{INJON}(n)$ calculated in the present cycle is the same as or precedes the present time point, the injector 8 is immediately (at the present time) driven and the fuel injection termination timing $T_{INJOFF1}(n)$ is set according to the equation (6), and the driving of the injector 8 is interrupted at the set timing, so that the fuel injection time period can be set as close to the present calculated value as possible.

Further, immediately after the mode setting is changed from the latter-stage injection mode to the former-stage injection mode, in respect of a cylinder which is next set to the exhaust stroke, fuel injection information items $T_{INJON}$(n) and $T_{INJOFF}$(n) calculated by the fuel injection information calculating means 103 at the present time are temporarily set in the temporary setting means 110 as former-stage injection control information for the injector 8.

Next, the operation of the fuel injection control apparatus for the internal combustion engine with the above construction, that is, a fuel injection control method for the internal combustion engine according to one embodiment of this invention is explained with reference to the flowchart (injector control routine) shown in FIGS. 13 and 14.

Figure 13:
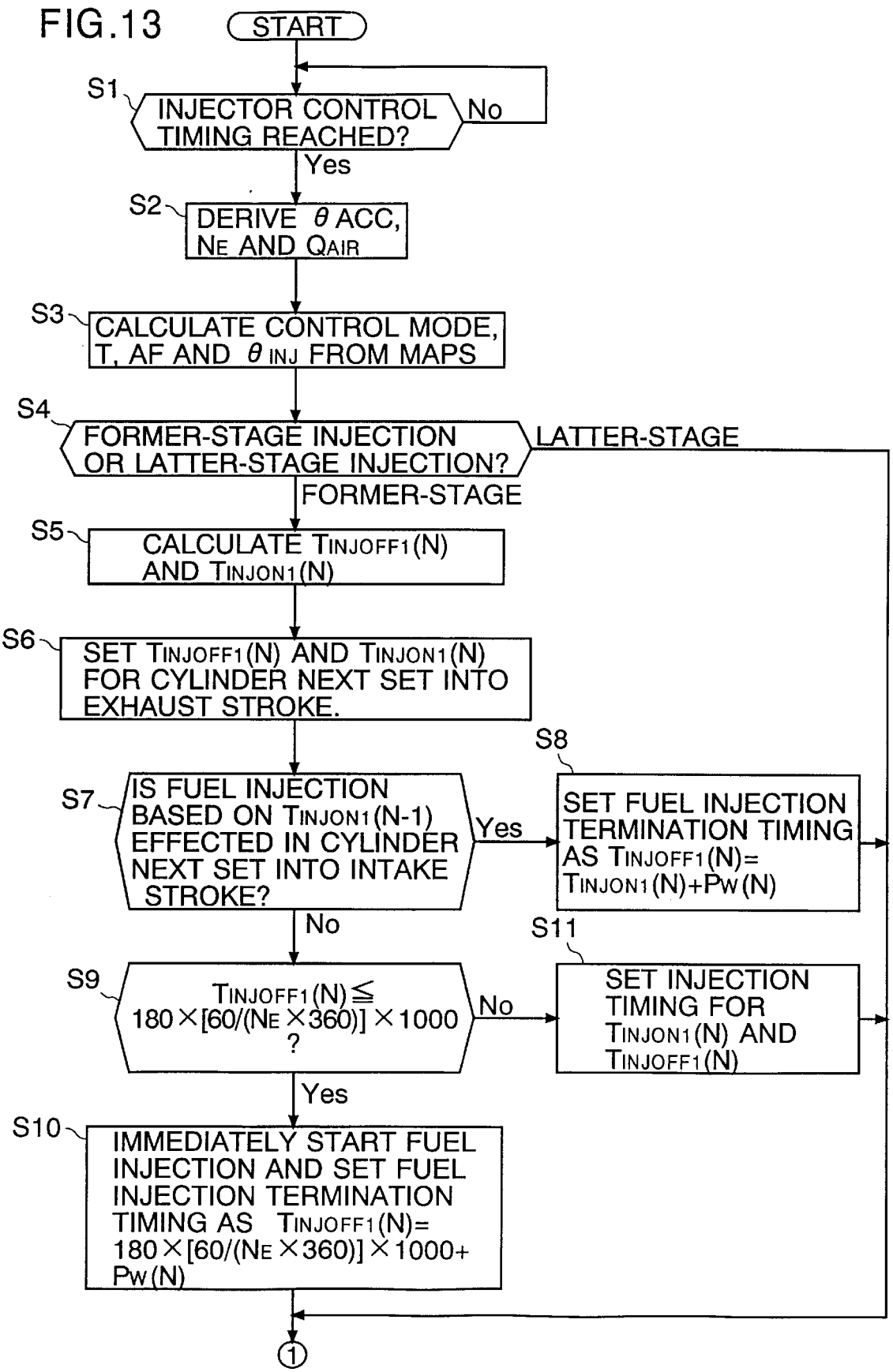
FIG. 13 is a flowchart showing part of an injector control routine executed by the central processing device shown in FIG. 3.

In the step S1 of FIG. 13, whether the present time point is the injector control timing or not is determined. If the present time is the injector control timing, fuel injection information is detected (calculated). The injector control routine of FIGS. 13 and 14 is triggered by an interruption pulse sequentially supplied for each crank angle of 180°, that is, at timings of 545° BTDC, 365° BTDC, 185° BTDC, 5° BTDC.

In setting fuel injection information, at step S2, an accelerator pedal depression amount $\theta_{ACC}$ representing a required engine load is derived, and an engine rotation speed $N_E$ and an intake air amount $Q_{AIR}$ for one stroke which represent the present engine operating state are derived. The accelerator pedal depression amount $\theta_{ACC}$ can be obtained by processing detection information of the accelerator position sensor 24. The engine rotation speed $N_E$ can be obtained by processing detection information of the crank angle sensor 21, and the intake air amount $Q_{AIR}$ for one stroke can be obtained by processing detection information from the airflow sensor 11.

Next, the control flow proceeds to the step S3 in which target torque T, control mode, air-fuel ratio AF and fuel injection termination timing $\theta_{INJ}$ are calculated based on maps (refer to FIGS. 8 to 11).

That is, the target torque T is set based on the engine rotation speed $N_E$ and accelerator pedal depression amount $\theta_{ACC}$ by use of the map shown in FIG. 8. Further, the fuel injection mode is set to the former-stage injection mode or latter-stage injection mode based on the engine rotation speed $N_E$ and target torque T by use of the map shown in FIG. 9. Further, the air-fuel ratio AF is set based on the engine rotation speed $N_E$ and target torque T according to the fuel injection mode by use of the map shown in FIG. 10, and the fuel injection termination timing $Q_{INJ}$ (in units of crank angle) is derived based on the engine rotation speed $N_E$ and target torque T according to the fuel injection mode by use of the map shown in FIG. 11.

Then, the control flow proceeds to the step S4 and whether the mode is the former-stage injection mode or latter-stage injection mode is determined. If the former-stage injection mode is set, the control flow proceeds to the step S5 and fuel injection termination timing (injector operation termination timing) $T_{INJOFF}$(n) is calculated by the fuel injection termination timing calculating means 107. Further, fuel injection start timing (injector operation start timing) $T_{INJON}$(n) is calculated by the fuel injection start timing calculating means 108 based on the thus calculated fuel injection termination timing $T_{INJOFF}$(n) and a fuel injection amount or fuel injection time period (injector driving time period) $P_W$(n) calculated in the fuel injection time period calculating means 106.

Further, the control flow proceeds to the step S6 and the calculated fuel injection termination timing $T_{INJOFF}$(n) and fuel injection start timing $T_{INJON}$(n) are temporarily set by the temporary setting means 110 as fuel injection information for controlling the injector for a cylinder which is next set into the exhaust stroke.

Then, the control flow proceeds to the step S7 and a determination is made as to whether or not fuel injection based on the control information $T_{INJON}$(n-1) set in the preceding cycle is being effected in a cylinder which is next set into the intake stroke. If the fuel injection is being effected, the control flow proceeds to the step S8, the fuel injection termination timing $T_{INJOFF1}$(n) is set by the correction means 111 according to the equation (5) so that the fuel injection can be effected for the present calculated fuel injection time period $P_W$(n) while continuously effecting the fuel injection, and the driving of the injector 8 will be interrupted at the set termination timing.

However, if the fuel injection has already been effected for the present calculated fuel injection time period $P_W$(n) at this point of time, the fuel injection termination timing is set by the correction means 111 so as to immediately (at the present time) interrupt the driving of the injector 8, whereby the fuel injection time period can be corrected to a value which is as close to the present calculated value as possible.

If the fuel injection is not effected, the control flow proceeds from the step S7 to the step S9, and a determination is made as to whether or not the present calculated fuel injection start timing $T_{INJON}$(n) is the same as or precedes the present time point. For example, if the following equation (9) is satisfied, it can be determined that the fuel injection start timing $T_{INJON}$(n) is the same as or precedes the present time point.

$$T_{INJON}(n) \leq 180 \times [60/(N_E \times 360)] \times 1000 \tag{9}$$

If the fuel injection start timing $T_{INJON}$(n) is the same as or precedes the present time point, the control flow proceeds to the step S10, the injector 8 is immediately driven at this point of time by the correction means 111, and the fuel injection termination timing $T_{INJOFF1}$(n) is set according to the equation (6) so as to interrupt the driving of the injector 8 at the set termination timing. As a result, the fuel injection time period is corrected to be as close to the present calculated value as possible.

If the fuel injection start timing $T_{INJON}$(n) is not the same as or does not precede the present time point, the control flow proceeds to the step S11 and the fuel injection start timing $T_{INJON1}$(n-1) and fuel injection termination timing $T_{INJOFF1}$(n-1) temporarily set in the preceding cycle are rewritten to the present calculated fuel injection start timing $T_{INJON}$(n) and fuel injection termination timing $T_{INJOFF}$(n) by the correction means 111.

Figure 14:
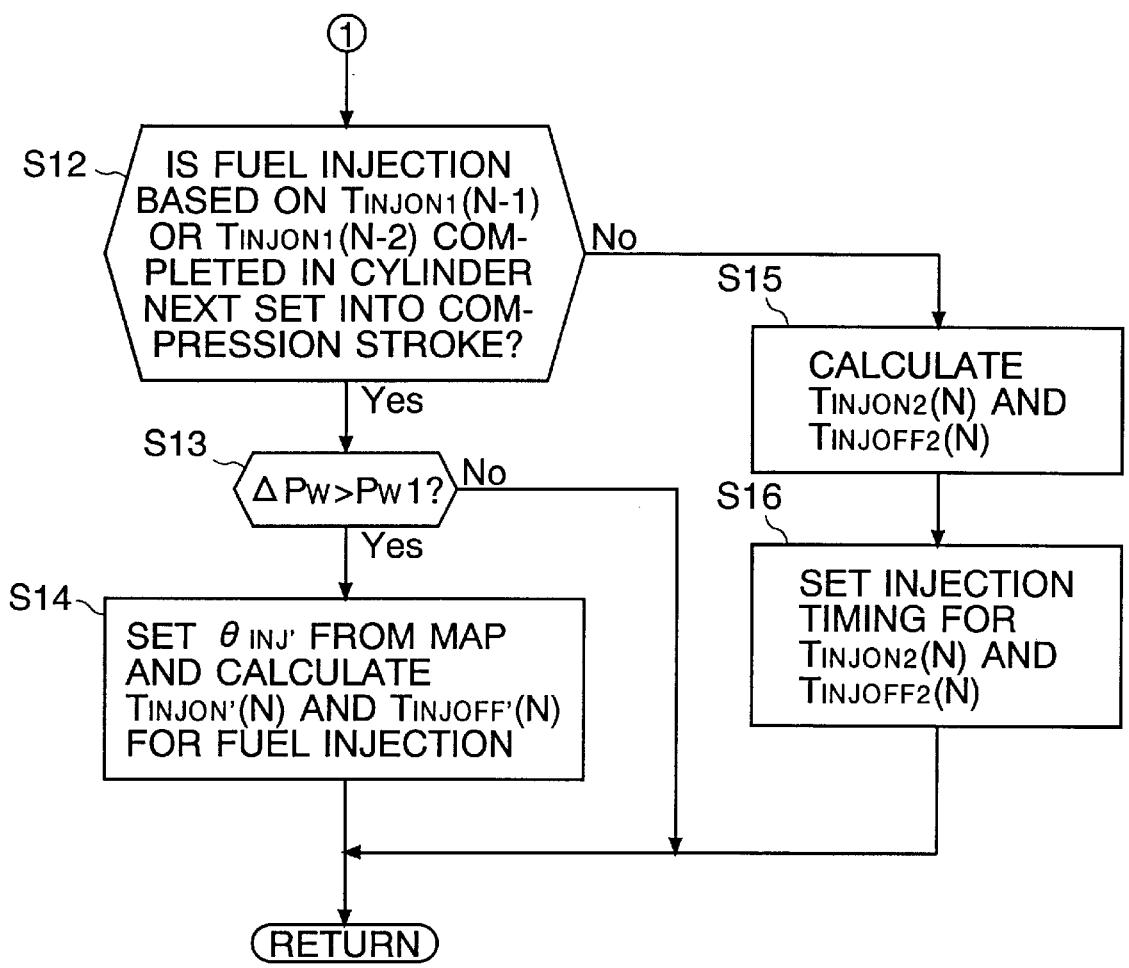
FIG. 14 is a flowchart showing the remaining part of the injector control routine.

After the step S4, S8, S10 or S11 is completed, the control flow proceeds to the step S12 of FIG. 14, and a determination is made as to whether the operation of fuel injection based on $T_{INJOFF1}$(n-1) set in the preceding cycle or $T_{INJOFF1}$(n-1) set in a cycle two cycles before the present cycle is already completed in a cylinder which is next set into the compression stroke. If the operation of fuel injection is already completed, the control flow proceeds to the step S13 without effecting the latter-stage injection mode even if the mode is changed to the latter-stage injection mode.

In the step S13, a determination is made as to whether or not a deviation $\Delta P_W[=P_W(n)-P_W(n-1)]$ between the fuel injection time period $P_W$(n-1) in the preceding cycle and the fuel injection time period $P_W$(n) in the present cycle is larger than the former-stage supplemental injection determining reference value $P_{W1}$. If the deviation $\Delta P_W$ is larger than the reference value $P_{W1}$, the control flow proceeds to the step S14 and latter-stage supplemental injection control information is set by the re-correction means 112 to permit the latter-stage supplemental injection to be effected.

In the step S14, by use of the map shown by way of example in FIG. 12, the fuel injection termination timing $\theta_{INJ}'$ is set according to the engine rotation speed $N_E$ and deviation $\Delta P_W$. Then, the operation start timing (fuel injection start timing) $T_{INJON}'(n)$ and operation termination timing (fuel injection termination timing) $T_{INJOFF}'(n)$ for the injector at the time of latter-stage supplemental injection are set according to the equations (7) and (8) based on the fuel injection $\theta_{INJ}'$.

If it is determined in the step S12 that the operation of fuel injection is not completed (this corresponds to a case where the latter-stage injection mode is now selected and where the present time point is not immediately after the time of changeover to the latter-stage injection mode), the control flow proceeds to the step S15 and fuel injection start timing $T_{INJON}(n)$ and fuel injection termination timing $T_{INJOFF}(n)$ are calculated. In the next step S16, the two calculated values are set as fuel injection start timing $T_{INJON1}(n)$ and fuel injection termination timing $T_{INJOFF1}(n)$ for controlling the injector for the cylinder which is next set into the compression stroke.

Next, an example of the operation of controlling the fuel injection in a four-cylinder engine used as a model is explained with reference to the time charts shown in FIGS. 15 to 23. The time charts mainly show settings of fuel injection information in the four strokes (explosion stroke, exhaust stroke, intake stroke, compression stroke) up to the top dead center of compression of the first cylinder (#1 cylinder).

First, the time chart shown in FIG. 15 shows fuel injection control in a case where a required fuel amount increases in the former-stage injection mode from a state requiring a relatively small amount of fuel.

In FIG. 15, fuel injection termination timing $T_{INJOFF}(1)$ and fuel injection start timing $T_{INJON}(1)$ [which are shown by $T_{OFF1}$ and $T_{ON1}$ in FIG. 15] are calculated at the 545° BTDC time. Further, at the 545° BTDC time, the two calculated values $T_{INJOFF}(1)$ and $T_{INJON}(1)$ are temporarily set as fuel injection termination and start timings $T_{INJOFF1}(1)$ and $T_{INJON1}(1)$ of the fuel injection information for former-stage injection for the injector of the first cylinder. The fuel injection start timing $T_{INJON1}(1)$ temporarily set at the 545° BTDC time lags behind the time point of 365° BTDC as shown in FIG. 15.

Then, fuel injection start timing $T_{INJON}(1)$ and fuel injection termination timing $T_{INJOFF}(2)$ [which are shown by $T_{OFF2}$ and $T_{ON2}$ in FIG. 15] are calculated at the 365° BTDC time.

Since fuel injection into the cylinder can be started at or after the 365° BTDC time, fuel injection information for former-stage injection for the injector of the first cylinder is rewritten at the 365° BTDC time into the fuel injection start timing $T_{INJON}(2)$ and fuel injection termination timing $T_{INJOFF}(2)$ calculated at the 365° BTDC time. In the example of FIG. 15, a required fuel amount varies in a short period from the 545° BTDC time to the 365° BTDC time. According to the above setting procedure, however, fuel injection suitable for a required fuel amount after the variation can be carried out, and as a result, high-speed acceleration can be stably effected.

Further, fuel injection start timing $T_{INJON}(2)$ and fuel injection termination timing $T_{INJOFF}(2)$ calculated at the 365° BTDC time are temporarily set as fuel injection information for former-stage injection for the injector of the third cylinder which is next set into the combustion stroke after the first cylinder.

Figure 16:
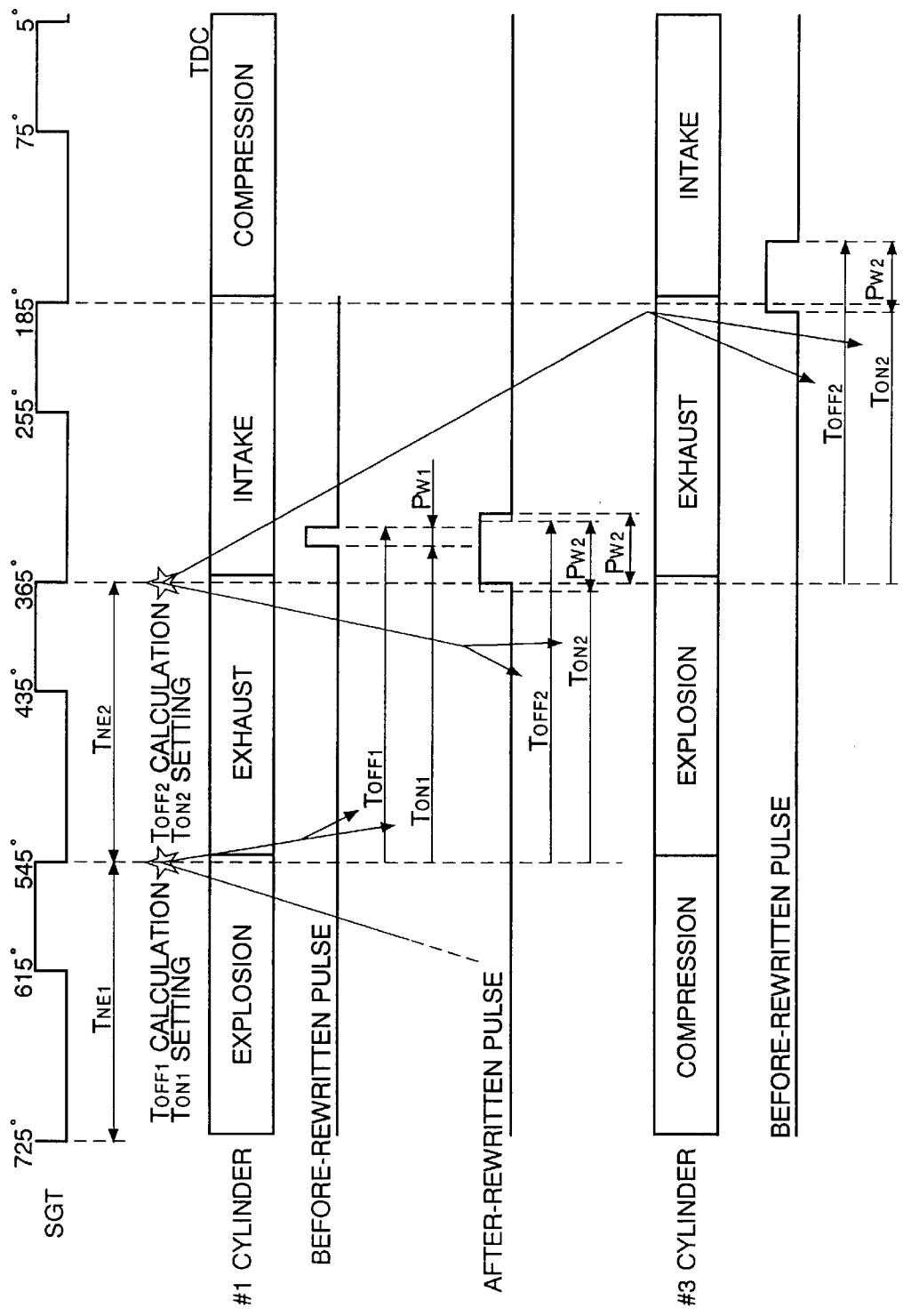
FIG. 16 is a time chart showing the operation of the fuel injection control apparatus in a case where the required fuel amount rapidly increases in the former-stage injection mode from a relatively small required amount.

The time chart shown in FIG. 16 shows the fuel injection control in a case where a required fuel amount rapidly increases in the former-stage injection mode from a state in which the required fuel amount is relatively small.

Fuel injection termination timing $T_{INJOFF1}(1)$ and fuel injection start timing $T_{INJON1}(1)$ for former-stage injection in respect of the first cylinder which are temporarily set at the 545° BTDC time are almost the same as those shown in FIG. 15. Therefore, the temporarily set fuel injection start timing $T_{INJON1}(1)$ comes after the 365° BTDC time.

On the other hand, the fuel injection start timing $T_{INJON1}(2)$ calculated at the 365° BTDC time for the first cylinder comes before the 365° BTDC time as shown by broken lines in relation to an "after-rewritten pulse" in FIG. 16. Thus, if the fuel injection start timing $T_{INJON1}(2)$ has already elapsed at the 365° BTDC time, fuel injection into the first cylinder cannot be effected at the fuel injection start timing $T_{INJON1}(2)$. In this case, fuel injection into the first cylinder is instantly started at the 365° BTDC time as indicated by the solid line in relation to the "after-rewritten pulse" in FIG. 16 without rewriting $T_{INJON1}(1)$ to $T_{INJON1}(2)$, at the 365° BTDC time. Further, the fuel injection termination timing $T_{INJOFF1}(2)$ is shifted backwardly by a delay amount of the fuel injection start timing $T_{INJON1}(2)$ so as to attain the fuel injection time period $P_W(2)$ [which is indicated by $P_{W2}$ in FIG. 16] (refer to the trailing edge of the "after-rewritten pulse" shown in FIG. 16). As a result, it becomes impossible to start the fuel injection at the required time point, but the fuel injection can be started at timing close to the required time. Further, fuel injection corresponding to the required fuel amount which rapidly varies in a short period from the 545° BTDC time to the 365° BTDC time can be effected, whereby higher-speed acceleration can be stably effected.

Like the case of FIG. 15, fuel injection start timing $T_{INJON}(2)$ and fuel injection termination timing $T_{INJOFF}(2)$ are temporarily set as fuel injection information for former-stage injection for the injector of the third cylinder which is next set into the combustion stroke after the first cylinder.

Figure 17:
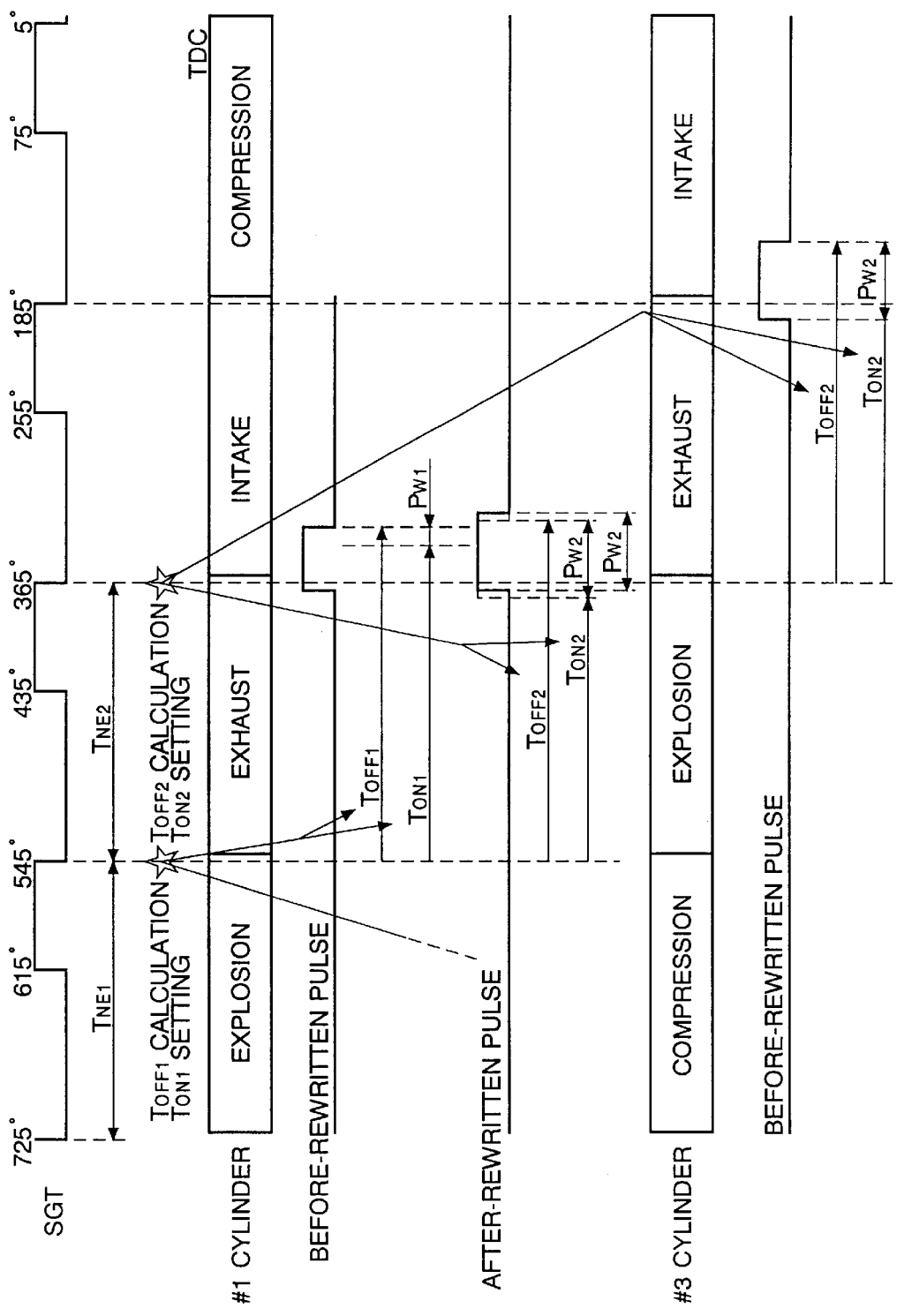
FIG. 17 is a time chart showing the operation of the fuel injection control apparatus in a case where the required fuel amount further increases in the former-stage injection mode from a large required amount.

The time chart shown in FIG. 17 shows the fuel injection control in a case where the required fuel amount is further increased in the former-stage injection mode from a state in which the required fuel amount is large.

Like the cases of FIGS. 15 and 16, in the case of FIG. 17, fuel injection start timing $T_{INJON1}(1)$ and fuel injection termination timing $T_{INJOFF1}(1)$ for former-stage injection of the injector of the first cylinder are temporarily set at the 545° BTDC time. The temporarily set time $T_{INJON1}(1)$ comes before the 365° BTDC time as shown by the solid line in relation to a "before-rewritten pulse" in FIG. 17. In this case, fuel injection into the first cylinder is started at the temporarily set fuel injection start timing $T_{INJON1}(1)$. In other words, the fuel injection is already started at the 365° BTDC time.

Further, fuel injection start timing $T_{INJON1}(2)$ and fuel injection termination timing $T_{INJOFF1}(2)$ are calculated at the 365° BTDC time. The thus calculated fuel injection start timing $T_{INJON1}(2)$ comes before the temporarily set fuel injection start timing $T_{INJON1}(1)$ as indicated by broken lines in relation to an "after-rewritten pulse" in FIG. 17, and therefore, it comes before the 365° BTDC time. Of course, it is impossible to start the fuel injection at the fuel injection start timing $T_{INJON1}(2)$ which has already passed. In this case, the fuel injection started at the $T_{INJON1}(1)$ time is maintained. Further, fuel injection termination timing $T_{INJOFF1}(2)$ is set to obtain fuel injection time period $P_W(2)$ [indicated by $P_{W2}$ in FIG. 17] set at the 365° BTDC time. Therefore, the actual fuel injection is effected at timing slightly shifted backwardly with respect to the most desirable fuel injection timing (refer to the "after-rewritten pulse" shown in FIG. 17).

As a result, the required fuel injection timing cannot be completely realized, but the fuel injection can be effected according to the required fuel amount which rapidly varies in a short period while injecting fuel at timing close to the required fuel injection timing, and hence higher-speed acceleration can be stably effected.

Also, in the case of FIG. 17, fuel injection start timing $T_{INJON1}(2)$ and fuel injection termination timing $T_{INJOFF1}(2)$ are temporarily set as fuel injection information for former-stage injection for the injector of the third cylinder which is next set into the combustion stroke after the first cylinder.

Figure 18:
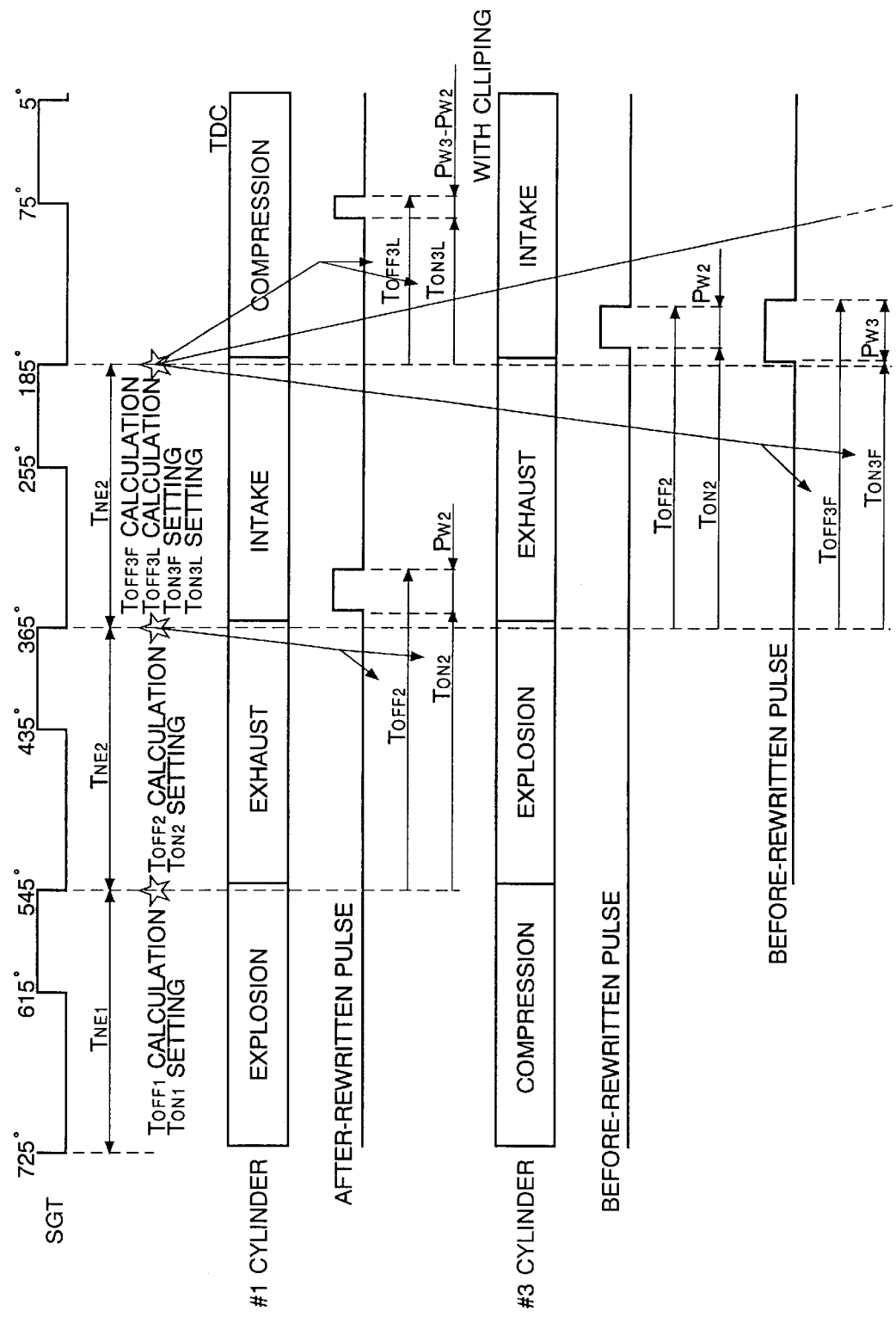
FIG. 18 is a time chart showing the operation of the fuel injection control apparatus in a case where the required fuel amount increases in the intake stroke in the former-stage injection mode.

The time chart shown in FIG. 18 shows the fuel injection control in a case where the required fuel amount increases in the intake stroke in the former-stage injection mode.

Like the case of FIG. 15, in the case of FIG. 18, with regard to the first cylinder, fuel injection is effected in the initial stage of the intake stroke according to fuel injection information set at the 545° BTDC time and corrected at the 365° BTDC time. Then, fuel injection time period $P_W(3)$ is calculated at the 185° BTDC time. In the case of FIG. 18, since the required fuel amount increases with elapse of time, the fuel injection time period $P_W(3)$ is larger than fuel injection time period $P_W(2)$ relating to the fuel injection already effected in the first cylinder and calculated at the 365° BTDC time. If an increment (deviation) $\Delta P_W [=P_W(3) -P_W(2)]$ in the fuel injection time period is larger than a preset amount $P_{W1}$ additional fuel injection into the first cylinder is effected at the start timing and termination timing corresponding to the deviation $\Delta P_W$ and engine operating state (engine rotation speed $N_E$ ). As a result, the additional fuel injection can be effected according to the increasing required fuel amount, so that higher-speed acceleration can be stably effected.

Figure 19:
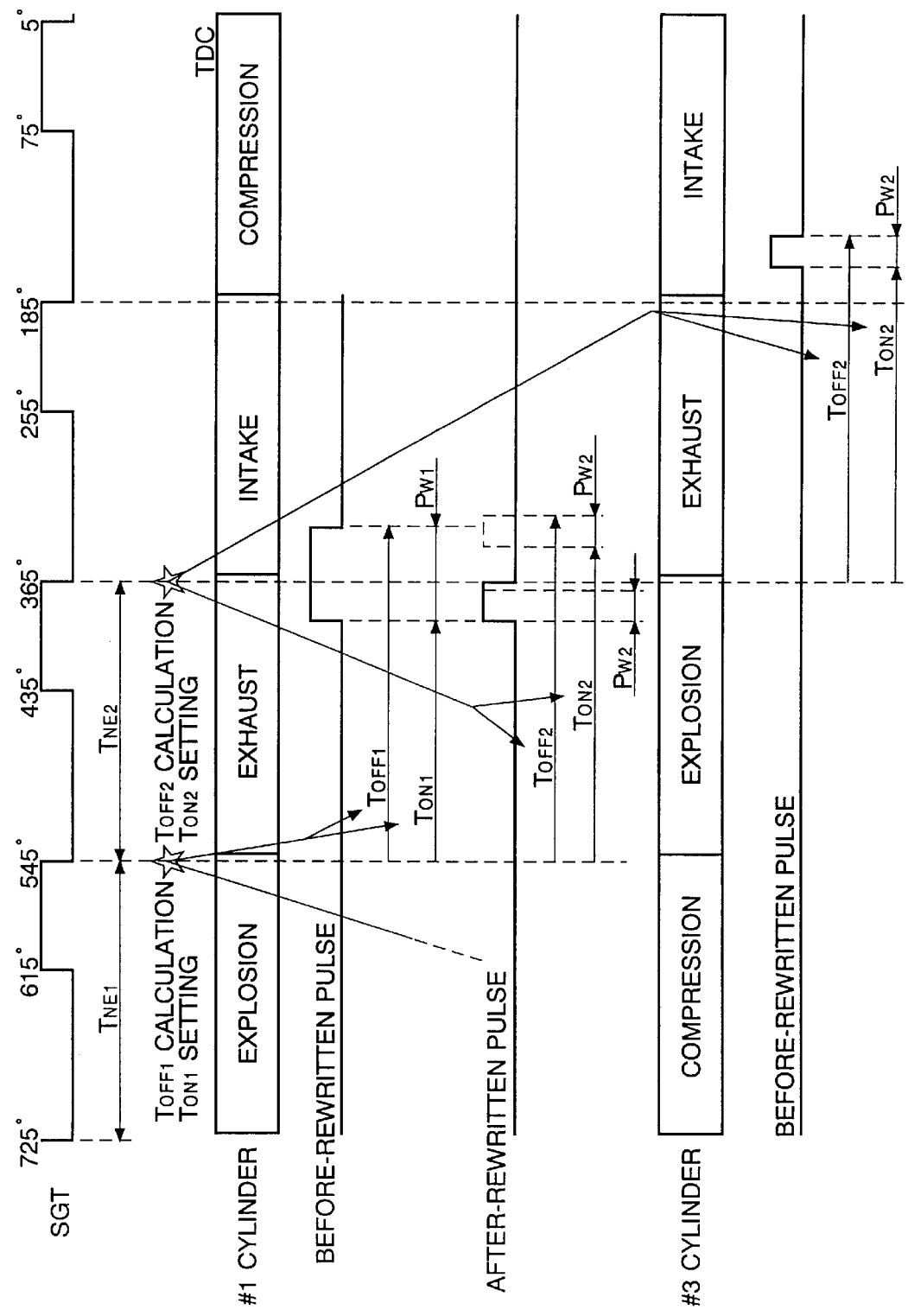
FIG. 19 is a time chart showing the operation of the fuel injection control apparatus in a case where the required fuel amount decreases from a large required amount in the former-stage injection mode.

The time chart shown in FIG. 19 shows the fuel injection control in a case where the required fuel amount decreases in the former-stage injection mode from a state requiring a large amount of fuel.

The fuel injection start timing $T_{INJON1}(1)$ for former-stage injection for the injector of the first cylinder temporarily set at the 545° BTDC time comes before the 365° BTDC time. Therefore, fuel injection into the first cylinder is already started at the 365° BTDC time. Further, at the 545° BTDC time, fuel injection time period $P_W(1)$ is temporarily set. On the other hand, in the case of FIG. 19, the required fuel amount decreases with elapse of time. Thus, fuel injection time period $P_W(2)$ is calculated at the 365° BTDC time, and if fuel injection into the first cylinder for the fuel injection time period $P_W(2)$ is already effected, the fuel injection is immediately interrupted (refer to an "after-rewritten pulse" indicated by the solid line in FIG. 19).

Hence, the fuel injection time period $P_W$ can be reduced to a value close to the fuel injection time period $P_W(2)$. As a result, although the fuel injection timing and fuel injection amount cannot be attained as required, the fuel injection amount can be corrected so as to be set close to the required fuel injection amount and suppression of acceleration or the operation of so-called engine brake can be effected immediately.

Figure 20:
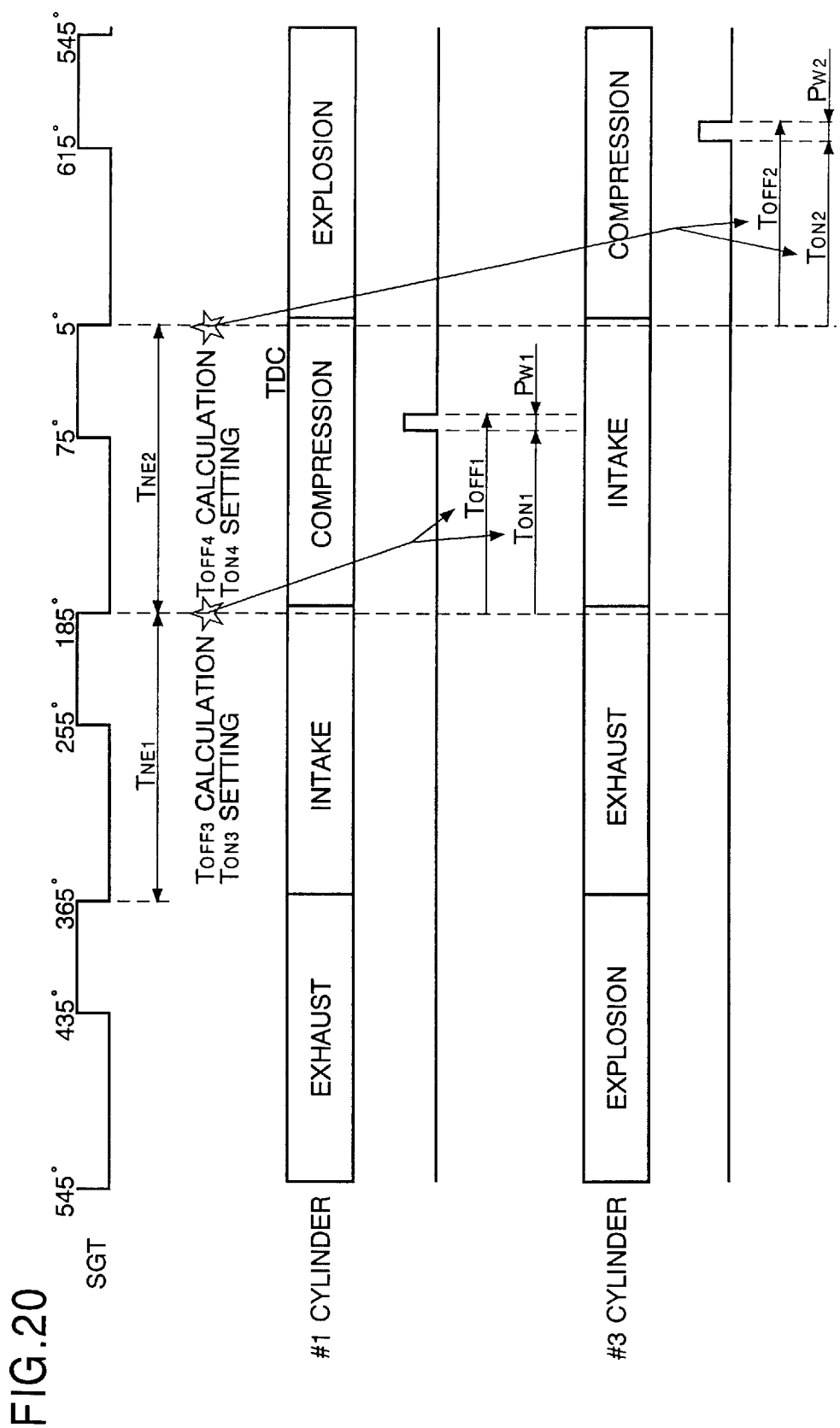
FIG. 20 is a time chart showing the operation of the fuel injection control apparatus in the latter-stage injection mode.

The time chart shown in FIG. 20 shows the fuel injection control in the latter-stage injection mode.

At the time of latter-stage injection, fuel injection start timing $T_{INJON2}(3)$ and fuel injection termination timing $T_{INJOFF2}(3)$ for latter-stage injection calculated at the 185° BTDC time are set as fuel injection information for latter-stage injection. In the latter-stage injection, a relatively small amount of fuel can be injected to a portion near the spark plug in a period of the latter stage of the compression stroke in which air flow is weak. That state of air-fuel ratio which is close to the stoichiometric air-fuel ratio is set up only in a portion near the spark plug and an extremely lean air-fuel ratio state is set up in the other portion so that favorable combustion can be attained with a small amount of fuel. In the meantime, setting at the 185° BTDC time is always effected for one cylinder.

Figure 21:
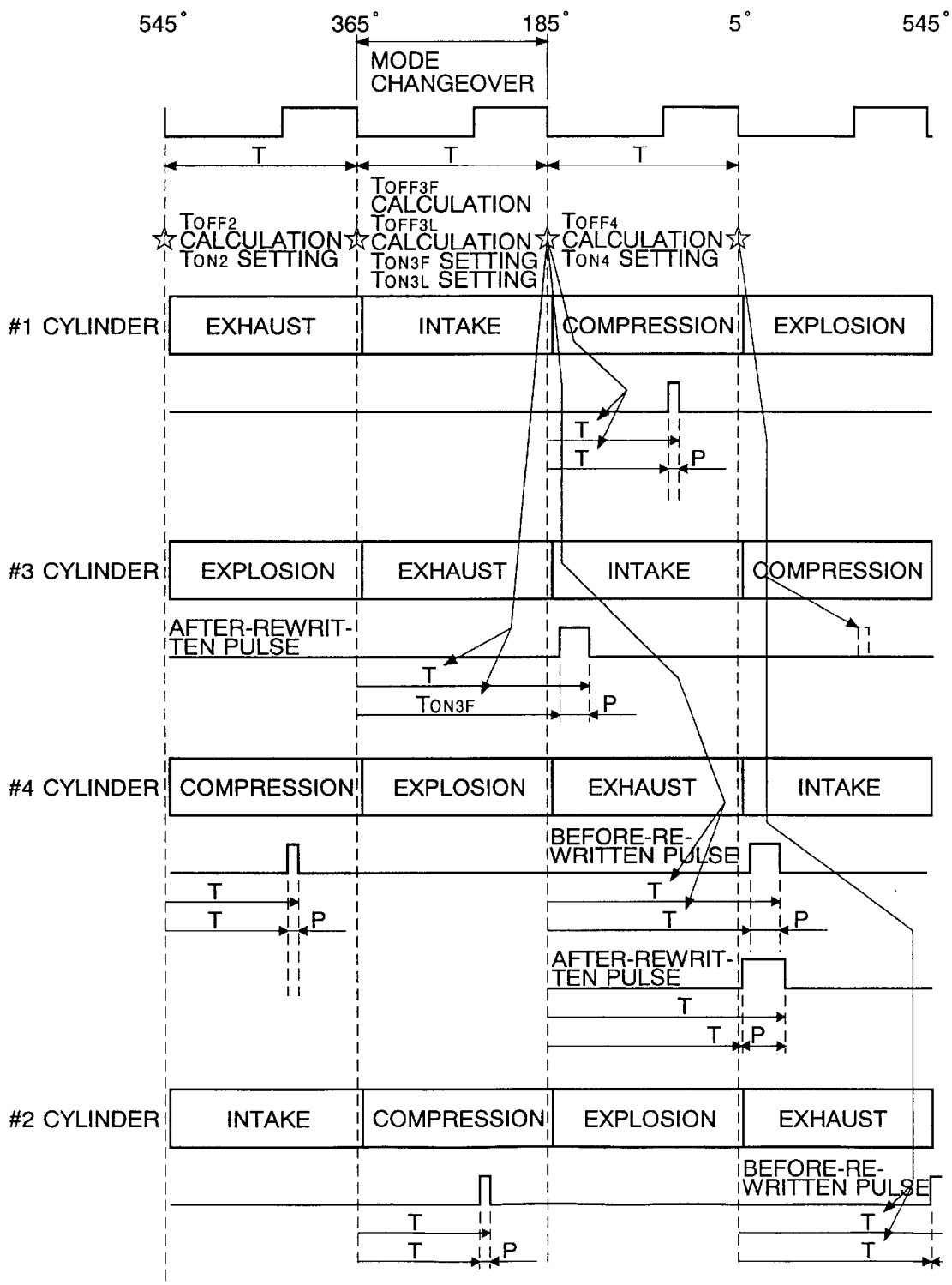
FIG. 21 is a time chart showing the operation of the fuel injection control apparatus in a case where a change is made from the latter-stage injection mode to the former-stage injection mode in a period from a time point of 365° BTDC to a time point of 185° BTDC.

The time chart shown in FIG. 21 shows the fuel injection control in a case where the mode is changed from the latter-stage injection mode to the former-stage injection mode in a period from the 365° BTDC time to the 185° BTDC time.

In the case of FIG. 21, there occurs a possibility that the intake stroke in the first cylinder is already started at the time of injection mode changeover, and the intake stroke will be soon terminated in some cases. The former-stage injection is required to be effected in the initial stage or former stage of the intake stroke. Therefore, it is inadequate or impossible to effect the present fuel injection for the first cylinder in the former-stage injection mode. However, the former-stage injection can be effected for cylinders following the third cylinder. Therefore, the latter-stage injection is effected for the first cylinder in the present cycle and the former-stage injection is effected for cylinders following the third cylinder.

Therefore, at the 185° BTDC time, fuel injection start timing $T_{INJON2}(3)$ for latter-stage injection and fuel injection termination timing $T_{INJOFF2}(3)$ for latter-stage injection, and fuel injection start timing $T_{INJON1}(3)$ for former-stage injection and fuel injection termination timing $T_{INJOFF1}(3)$ for former-stage injection are set. The fuel injection start timing $T_{INJON2}(3)$ and fuel injection termination timing $T_{INJOFF2}(^3)$ for latter-stage injection are used for the first cylinder. The fuel injection start timing $T_{INJON1}(3)$ and fuel injection termination timing $T_{INJOFF1}(3)$ for former-stage injection are used as information for correction (real setting) for the third cylinder and used as information for temporary setting for the fourth cylinder.

At this time, if the fuel injection start timing $T_{INJON1}(3)$ for former-stage injection occurs before the 185° BTDC time, fuel injection is immediately started at the 185° BTDC time as previously explained with reference to FIG. 16. Further, the fuel injection termination timing $T_{INJOFF1}(3)$ is backwardly shifted by a delay amount of fuel injection start timing $T_{INJON1}(2)$ so as to obtain set fuel injection time period $P_W(3)$. Further, an "after-rewritten pulse" indicated by broken lines in FIG. 21 for the third cylinder indicates that latter-stage supplemental injection is effected if necessary.

Thus, the changeover from the latter-stage injection mode to the former-stage injection mode is smoothly and rapidly effected.

Figure 22:
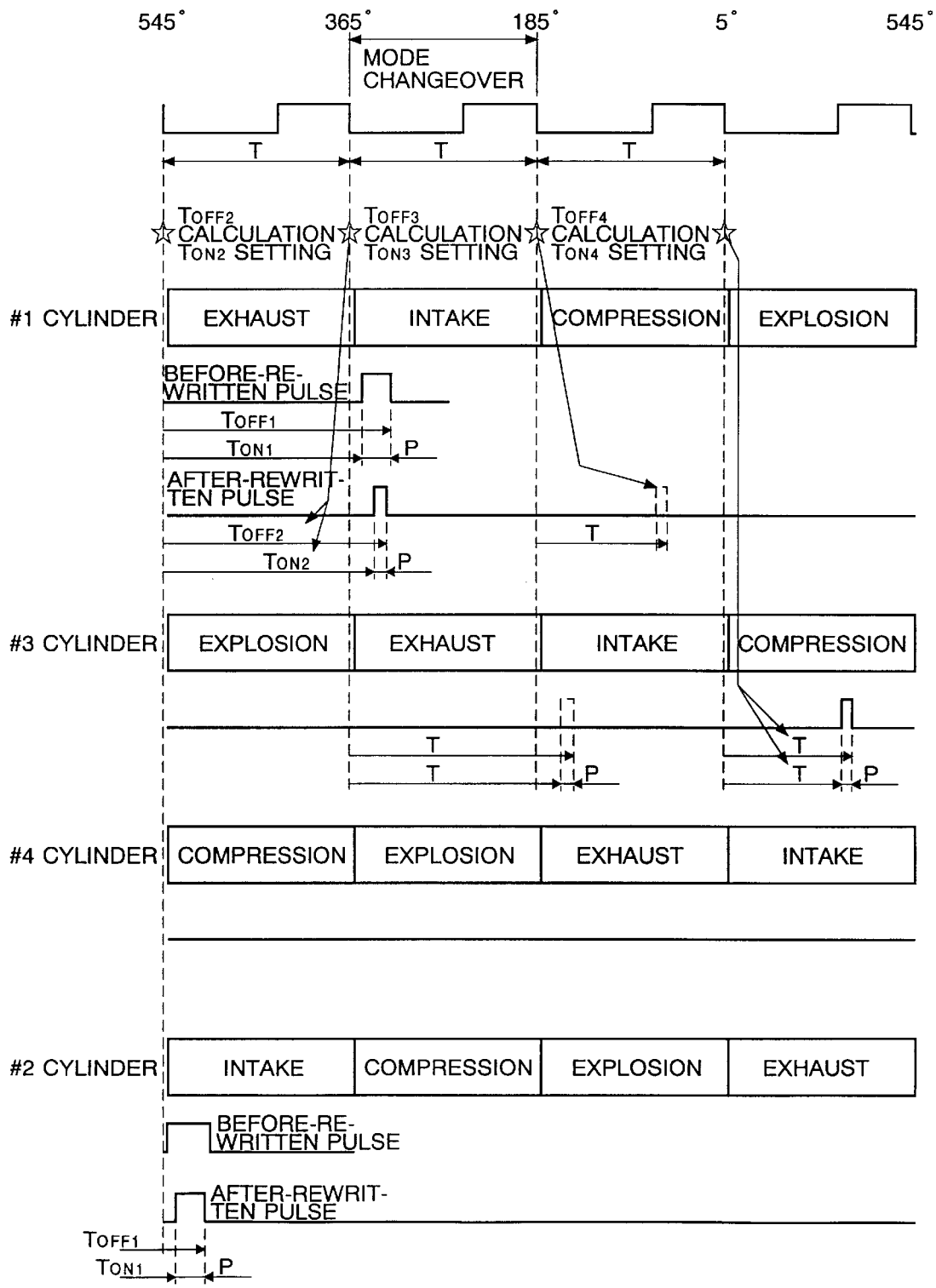
FIG. 22 is a time chart showing the operation of the fuel injection control apparatus in a case where a change is made from the former-stage injection mode to the latter-stage injection mode in a period from a time point of 365° BTDC to a time point of 185° BTDC.

FIG. 22 shows the fuel injection control in a case where the mode is changed from the former-stage fuel injection mode to the latter-stage injection mode in a period from the 365° BTDC time to the 185° BTDC time.

In the example of FIG. 22, there is a possibility that the intake stroke is executed in the first cylinder at the injection mode changeover time and the intake stroke will be soon terminated. Therefore, with regard to the first cylinder, the former-stage injection, based on the fuel injection start timing $T_{INJON1}(2)$ and fuel injection termination timing $T_{INJOFF1}(2)$ for former-stage injection set at the 365° BTDC time before the changeover of injection mode, is already started and may already be terminated in some cases. For this reason, the latter-stage injection is not effected in the present cycle for the first cylinder and the latter-stage injection is effected in the next and subsequent cycles. An "after-rewritten pulse" indicated by broken lines in FIG. 22 for the first cylinder indicates that latter-stage supplemental injection is effected when required.

As in this example, if the injection amount in the former-stage injection becomes larger, the changeover from the former-stage injection mode to the latter-stage injection mode for the third cylinder can be effected in time since fuel injection is not yet started in the third cylinder at the 185° BTDC time. Therefore, in respect of the third cylinder, the mode is changed to the latter-stage injection mode in the present cycle. That is, the latter-stage injection is effected in the latter stage of the compression stroke based on the fuel injection start timing $T_{INJON2}(2)$ and fuel injection termination timing $T_{INJOFF2}(2)$ for latter-stage injection set at the 185° BTDC time (refer to a pulse indicated by the solid line in FIG. 22 for the third cylinder (a pulse indicated by the broken lines in FIG. 22 for the third cylinder is canceled)). Of course, after this, the latter-stage injection mode is applied to each cylinder until the mode is changed to the former-stage injection mode again.

Thus, the changeover from the former-stage injection mode to the latter-stage injection mode can be smoothly and rapidly effected without causing double injection in which fuel injection in the former-stage injection mode and fuel injection in the latter-stage injection mode overlap each other.

Figure 23:
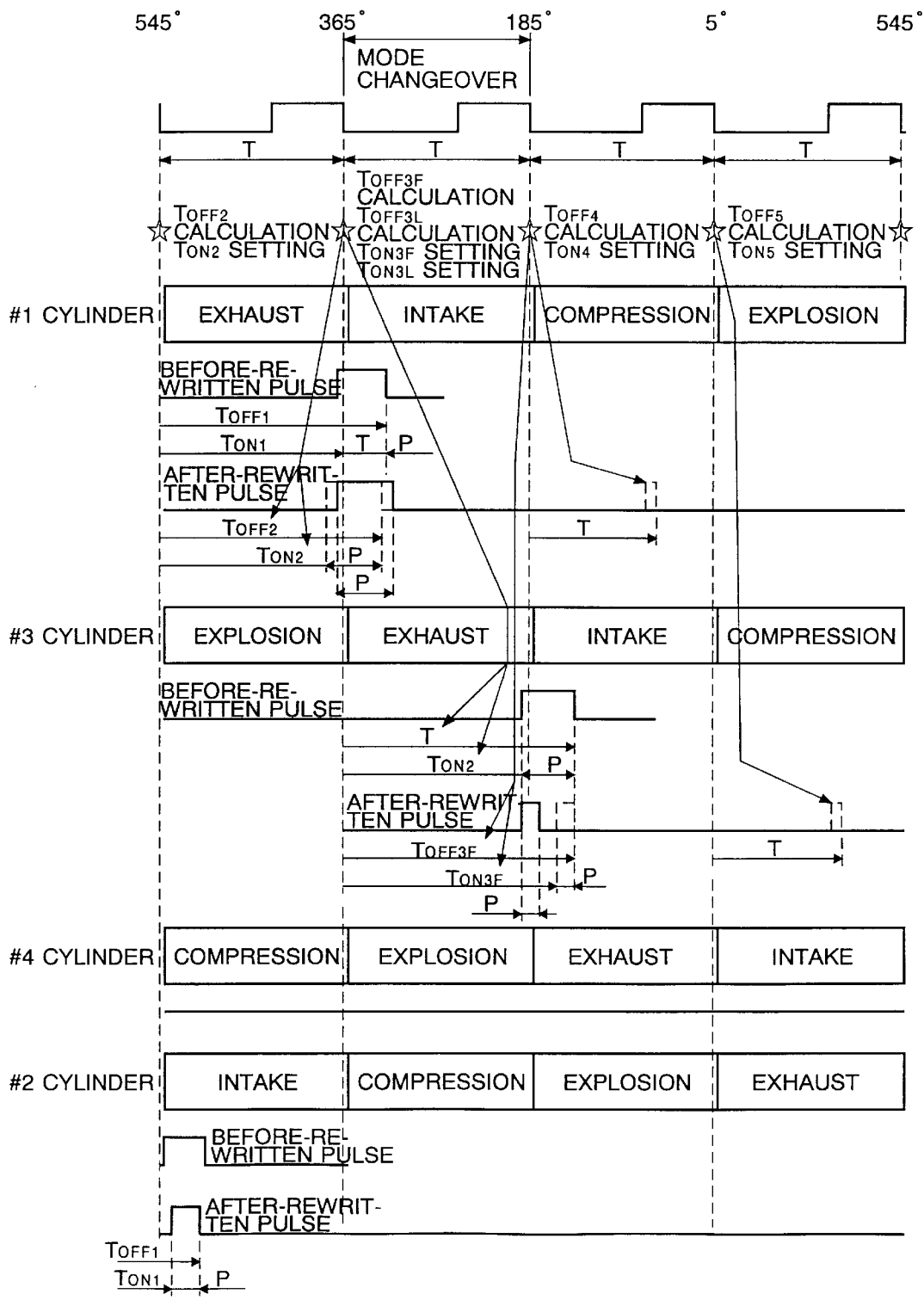
FIG. 23 is a time chart showing the operation of the fuel injection control apparatus in a case where a change is made from the former-stage injection mode to the latter-stage injection mode in a period from a time point of 365° BTDC to a time point of 185° BTDC.

Like the case of FIG. 22, the time chart shown in FIG. 23 shows the fuel injection control in a case where the mode is changed from the former-stage injection mode to the latter-stage injection mode in a period from the 365° BTDC time to the 185° BTDC time.

As in the former case, in the first cylinder, since the former-stage injection is already terminated, the latter-stage injection is not effected in the present cycle and the latter-stage injection is effected in the next and subsequent cycles.

If the injection amount in the former-stage injection is large and the former-stage injection based on the fuel injection start timing $T_{INJON1}(2)$ for former-stage injection temporarily set at the 365° BTDC time is already started in the third cylinder at the 185° BTDC time as in this example, the fuel injection in the former-stage injection mode is continuously effected for the third cylinder. The fuel injection termination timing of this case is set based on $T_{INJON1}(2)$ and the fuel injection time period $P_W(3)$ set at the 185° BTDC time. In the next and subsequent cycles, the latter-stage injection is effected also for the third cylinder. Of course, after this, the fuel injection in the latter-stage injection mode is effected in each cylinder until the mode is changed to the former-stage injection mode again. Further, as indicated by an "after-rewritten pulse" indicated by broken lines in FIG. 23, latter-stage supplemental injection is effected for the first and third cylinders when required.

Thus, the changeover from the former-stage injection mode to the latter-stage injection mode can be smoothly and rapidly effected without causing double injection in which fuel injection in the former-stage injection mode and fuel injection in the latter-stage injection mode overlap each other. In the following, a fuel injection control apparatus for an internal combustion engine according to a second embodiment of this invention is explained in detail.

Figure 24:
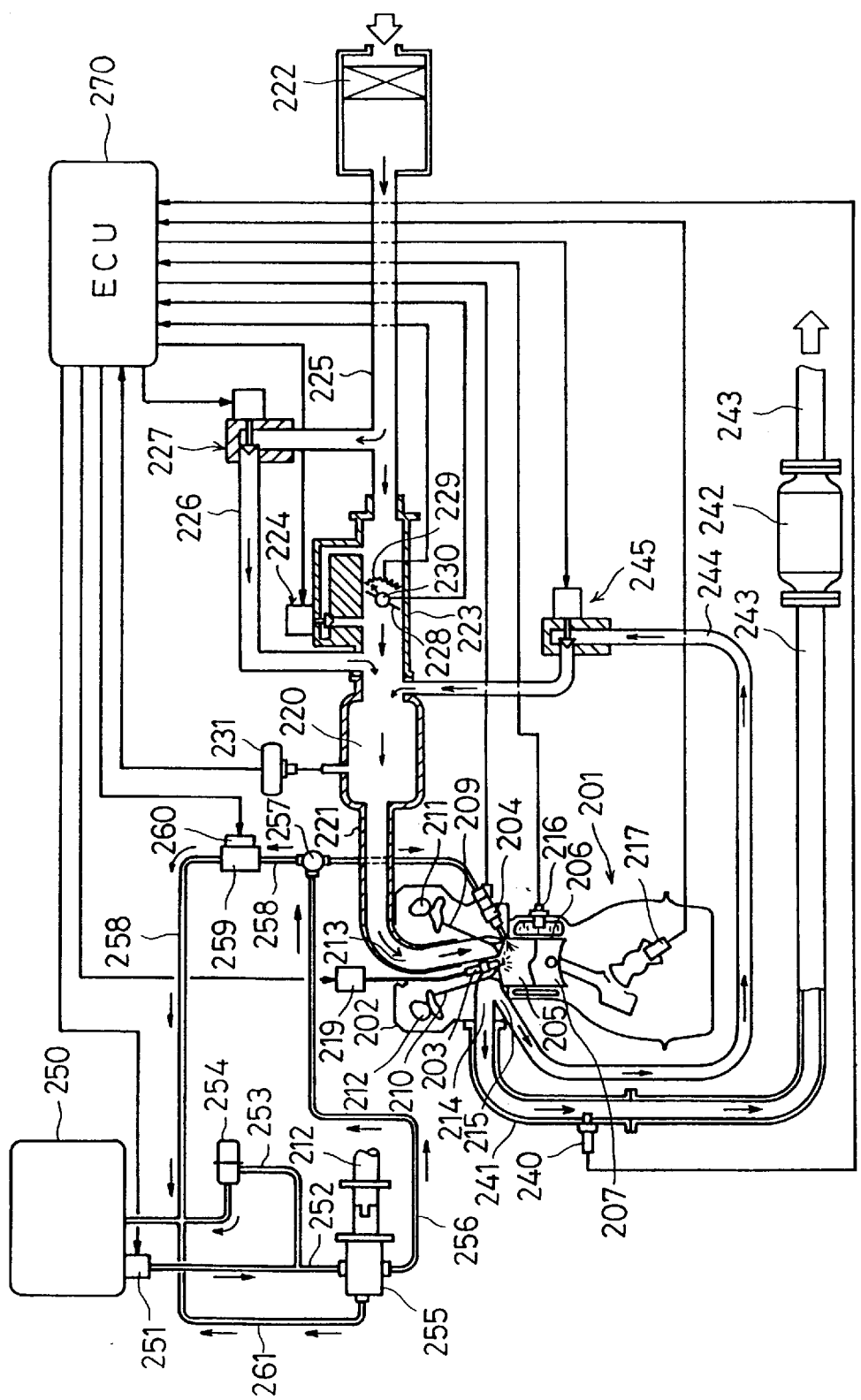
FIG. 24 is a schematic block diagram showing an engine control system on which a fuel injection control apparatus for an internal combustion engine according to a second embodiment of this invention is mounted.
Figure 25:
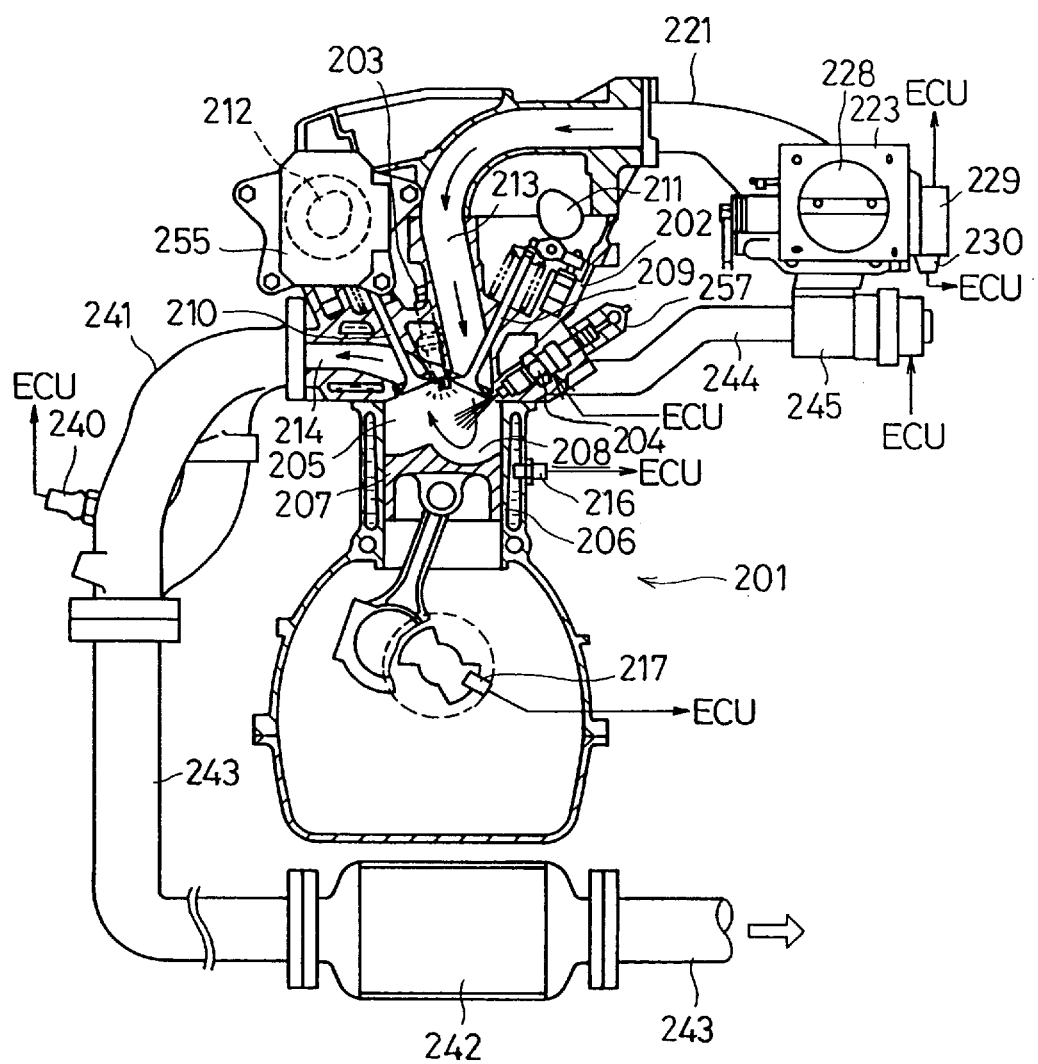
FIG. 25 is a longitudinal cross sectional view of an in-cylinder injection engine shown in FIG. 24.

In FIGS. 24 and 25, reference numeral 201 indicates an in-cylinder injection type straight four-cylinder automotive gasoline engine (hereinafter simply referred to as an engine). The engine 201 has combustion chambers, intake device, EGR device and the like designed exclusively for in-cylinder injection.

For each cylinder, an electromagnetic fuel injection valve 204 is mounted together with a spark plug 203 on a cylinder head 202 of the engine 201, so that fuel is directly injected into the combustion chamber 205 from the fuel injection valve 204. Further, a semi-spherical cavity 208 is formed on the top surface of a piston 207 which is vertically slidably disposed in a cylinder 206. The cavity 208 is arranged in position which atomized fuel from the fuel injection valve 204 can reach when the piston 207 lies in portion near the top dead center. The theoretical compression ratio of the engine 201 is set to a value (approx. 12 in this embodiment) larger than that in manifold-injection systems. The valve driving mechanism of the engine 201 is of DOHC 4-valve type. An intake-side camshaft 211 and exhaust-side camshaft 212 for respectively driving intake and exhaust valves 209 and 210 are rotatably supported on the upper portion of the cylinder 202.

Intake ports 213 are formed to pass through between the camshafts 211 and 212 in substantially a vertical direction in the cylinder head 202, and air flow which has passed through each intake port 213 causes reverse tumble flow in the combustion chamber 205 associated therewith as will be described later.

Exhaust ports 214 are formed in substantially the horizontal direction like that of ordinary engines and a large-diameter EGR port 215 (FIG. 24) is branched from the exhaust ports 214 in an oblique direction. In FIGS. 24 and 25, reference numeral 216 denotes a water temperature sensor for detecting the cooling water temperature $T_W$, 217 denotes a vane type crank angle sensor for outputting a crank angle signal SGT in a preset crank position (in this embodiment, 5° BTDC and 75° BTDC) of each cylinder, and 219 denotes an ignition coil for outputting a high voltage to the spark plug 203. Further, a cylinder discriminating sensor (not shown) for outputting a cylinder discrimination signal SGC is mounted on a camshaft which rotates at a rotation speed half the rotation speed of the crank shaft and determines one of the cylinders which corresponds to the crank angle signal SGT.

As shown in FIG. 24, an intake pipe 225 having an air cleaner 222, throttle body 223 and stepper motor type ISCV (idle speed control valve) 224 is connected to the intake ports 213 via intake manifolds 221 having a surge tank 220. Further, the intake pipe is provided with an air bypass pipe 226 of large diameter for introducing intake air into the intake manifolds 221 via a path bypassing the throttle body 223, and the pipe 226 is provided with a large-sized ABV (air bypass valve) 227 of stepper motor type. The air bypass pipe 226 has a flow passage area corresponding to the flow passage area of the intake pipe 225 and permits intake air of an amount required in the low/intermediate speed range of the engine 201 to pass through the ABV 227 in the fully opened state of the ABV 227.

The throttle body 223 is provided with a butterfly type throttle valve 228 for opening/closing the passage, a throttle sensor 229 for detecting the opening degree θTH of the throttle valve 228, and an idle switch 230 for detecting a fully closed state of the throttle valve 228. In FIG. 24, reference numeral 231 denotes a boost pressure (MAP: Manifold Absolute Pressure) sensor for detecting the intake pipe pressure Pb. This sensor 231 is connected to the surge tank 220.

An exhaust pipe 243 having a three way catalyst 242, muffler which is not shown in the drawing and the like is connected to the exhaust ports 214 via exhaust manifolds 241 on which an $O_2$ sensor 240 is mounted. Further, the EGR ports 215 are connected to the upstream side of the intake manifolds 221 via a large-diameter EGR pipe 244 which is provided with a stepper motor type EGR valve 245.

A fuel tank 250 is disposed in the rear of a vehicle body which is not shown. Fuel stored in the fuel tank 250 is pumped up by an electric low-pressure fuel pump 251 and supplied towards the engine 201 via a low-pressure feed pipe 252. The fuel pressure in the low-pressure feed pipe 252 is controlled to relatively low pressure (in this embodiment, 3.35 kg/mm$^2$) by a first fuel pressure regulator 254 inserted in a pipe passage of a return pipe 253 so as to attain low fuel pressure. The fuel supplied towards the engine 201 is supplied to each fuel injection valve 204 via a high-pressure feed pipe 256 and delivery pipe 257 by a high-pressure fuel pump 255 mounted on the cylinder head 202. In this embodiment, the high-pressure pump 255 is of a swash plate axial piston type and is driven by the exhaust-side camshaft 212 to generate delivery pressure of 50 kg/mm$^2$ or more even at the time of idling operation of the engine 201. The fuel pressure in the delivery pipe 257 is controlled to relatively high pressure (in this embodiment, 50 kg/mm$^2$) by a second fuel pressure regulator 259 inserted in a return pipe 258 so as to attain high fuel pressure.

In FIG. 24, reference numeral 260 denotes an electromagnetic fuel pressure switching valve mounted on the second fuel pressure regulator 259. The switching valve 260 relieves fuel in an ON state to lower the fuel pressure in the delivery pipe 257 to a preset value (for example, 3.35 kg/mm$^2$). Further, 261 denotes a return pipe for returning fuel which has lubricated and cooled the high-pressure fuel pump 255 to the fuel tank 250.

An ECU (engine control unit) 270 which is disposed in a vehicle interior has an input/output device, a storage device used for storing a control program, control map, and the like, a central processing device (CPU), a timer counter and the like which are not shown in the drawing. Overall control of the engine 201 is effected by the ECU 270. Detection information items from the above-described various sensors are input to the input side of the ECU 270. The ECU 270 determines the fuel injection mode (control mode) and fuel injection amount as well as the ignition timing and the introducing amount of EGR gas based on the detection information items, and controls the fuel injection valve 204, ignition coil 219, EGR valve 245 and the like. Further, a variety of switches and sensors which are not shown are connected to the input side of the ECU 270 and various alarm lamps and devices which are not shown are connected to the output side of the ECU.

In the following, the outline of the engine control by the ECU 270 is explained.

When the driver sets the ignition key in the ON position in a cold state of the engine 201, the ECU 270 actuates the low-pressure fuel pump 251 and fuel pressure switching valve 260, to thereby supply low-pressure fuel to the fuel injection valves 204. This is because the high-pressure fuel pump 255 cannot be operated at all or it can be operated only incompletely at the time of stoppage or cranking of the engine 201, and therefore, the fuel injection amount must be determined based on the delivery pressure of the low-pressure fuel pump 251 and the valve opening time period of the fuel injection valve 204 concerned.

Next, when the driver sets the ignition switch in the start position, the engine 201 is cranked by a cell motor which is not shown in the drawing, and at the same time, the fuel injection control by the ECU 270 is started. During the engine starting operation, the ECU 270 selects the former-stage injection mode and causes the fuel injection valve 204 to inject fuel of such an amount as to attain a relatively rich air-fuel ratio. This is effected to perform the fuel injection in the intake stroke since the evaporation rate of fuel is low when the engine is in a cold state. If the fuel injection is effected in the latter-stage injection mode (that is, compression mode) at the cold state, evaporation of the fuel cannot be sufficiently effected and occurrence of ignition failure and emission of unburnt fuel (HC) cannot be avoided.

Further, since the ABV 227 is closed by the ECU 270 during the engine start, supply of the intake air into the combustion chamber 205 is effected via the throttle valve 228 and ISCV 224. Further, the ISCV 224 and ABV 227 are managed by the ECU 270 in a unified way, and opening amounts of the ISCV 224 and ABV 227 are determined according to a required amount of intake air (bypass air) bypassing the throttle valve 228.

When the starting operation of the engine 201 is completed and the engine starts the idling driving, the high-pressure fuel pump 255 starts the rated delivery operation. Then, the ECU 270 sets the fuel pressure switching valve 260 in the OFF position to supply fuel of high fuel pressure to the fuel pressure valve 204. At this time, as a matter of course, the fuel injection amount is determined based on the high fuel pressure and the valve opening time period of the fuel injection valve 204. Then, the ECU 270 selects the former-stage injection mode and keeps the ABV 227 in the closed position in a period from the moment when the engine starting operation is finished to the moment when the cooling water temperature $T_W$ rises to a preset value, as in the case of engine start. Further, the idling rotation speed is controlled by the ISCV 224 to meet an increase or reduction in engine load caused by auxiliary devices such as an air-conditioner, as in the case of manifold-injection engines. When the $O_2$ sensor 240 reaches an activation temperature with elapse of time from the time of engine start, the ECU 270 starts air-fuel feedback control in accordance with an output voltage of the $O_2$ sensor 240, so that noxious exhaust gas components are purified by the three way catalyst 242.

As described above, when the engine is in the cold state, the fuel injection control which is almost the same as in the case of manifold-injection engines is effected. Nevertheless, the response and precision of the control operation are enhanced since fuel drops are not attached to the wall surface of the intake pipe 213.

Figure 26:
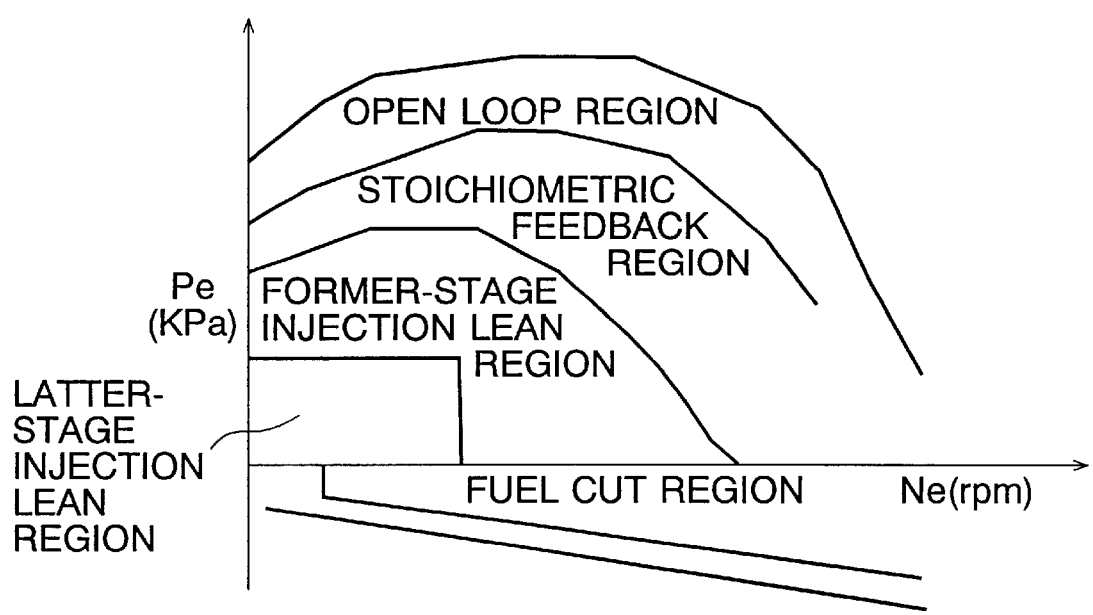
FIG. 26 is a diagram showing a fuel injection control map used by the fuel injection control apparatus shown in FIG. 24.

When the warming-up of the engine 201 is completed, the ECU 207 searches for the present fuel injection control area from the fuel injection control map of FIG. 26 based on the engine rotation speed Ne and target average effective pressure Pe derived from the intake pipe pressure Pb, throttle opening degree θTH and the like. Then, the ECU 270 determines the fuel injection mode and fuel injection amount based on the searched fuel injection control area to drive the fuel injection valve 204 and controls the opening/closing operation of the ABV 227 and EGR valve 245.

For example, when the engine operates at low-load/low-rotation speed as in an idling driving region, the ECU 270 determines that the engine 201 is driven in a latter-stage injection lean region in FIG. 26. In this case, the ECU 270 selects a latter-stage injection mode and opens the ABV 227 and controls the fuel injection amount to attain a lean air-fuel ratio (in this embodiment, approx. 20 to 40).

Figure 27:
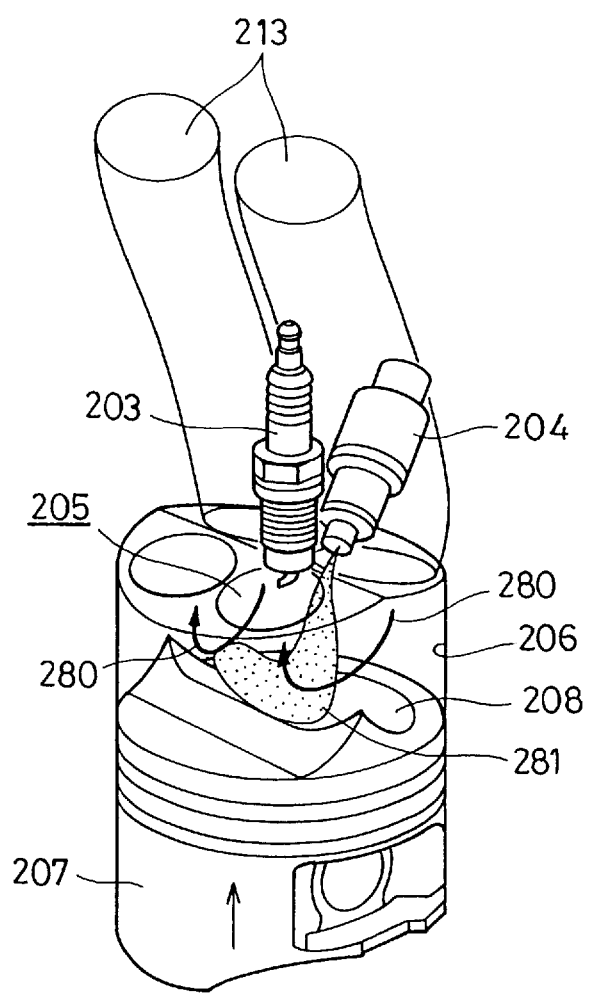
FIG. 27 is a schematic perspective view showing a fuel injection state in the latter-stage injection mode of the in-cylinder injection engine shown in FIG. 24.

After completion of the warming-up of the engine 201, the evaporation rate of fuel rises. Further, the flow of intake air introduced from the intake port 213 creates reverse tumble flow 280 as indicated by an arrow in FIG. 27, and therefore, atomized fuel 281 remains in a cavity 208 of the piston 7. As a result, a mixture with an air-fuel ratio close to the stoichiometric air-fuel ratio is created around the spark plug 203 at the ignition timing, so that ignition can be effected even with a lean air-fuel ratio as a whole. Therefore, an amount of emission of CO and HC becomes extremely small and a pumping loss is reduced, whereby the fuel consumption efficiency is significantly enhanced. Meanwhile, if an average air-fuel ratio becomes equal to or less than 20, an excessively enriched air-fuel mixture part is created, resulting in an ignition failure. On the other hand, if the average air-fuel ratio becomes equal to or larger than 40, the mixture exceeds its lean limit, so that an ignition failure is caused.

Idle speed control responsive to an increase or decrease in engine load is effected by increasing or reducing the fuel injection amount. Therefore, the control response becomes extremely high. In this control region (latter-stage injection lean region), the ECU 270 causes the EGR valve 245 to open so as to introduce a large amount (in this embodiment, more than 30% of the exhaust gas) of EGR gas into the combustion chamber 205, whereby Nox is significantly reduced.

Figure 28:
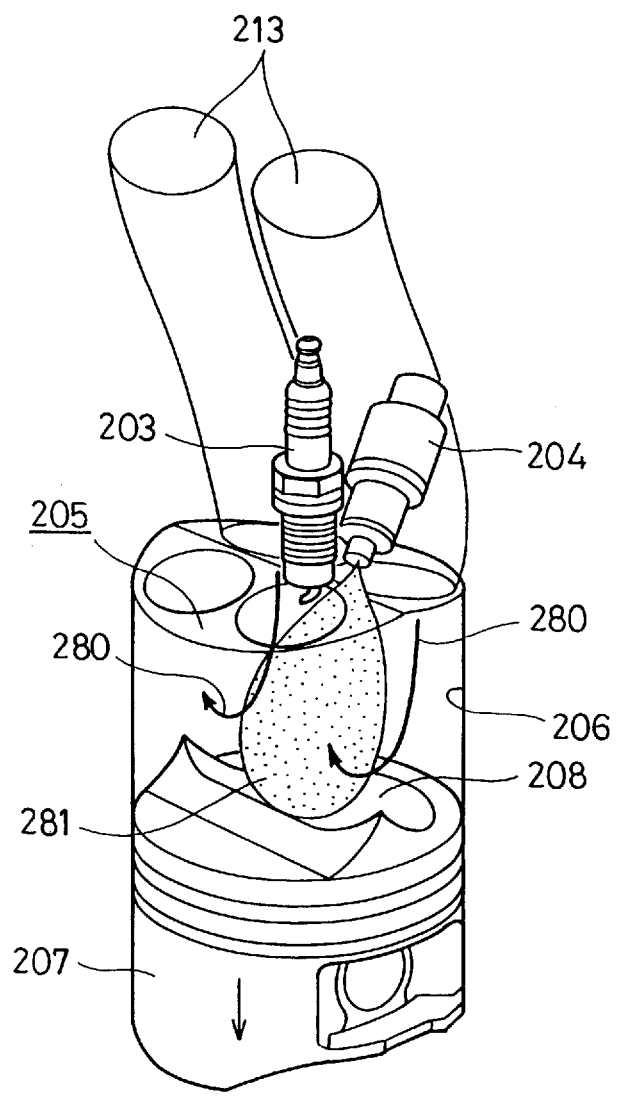
FIG. 28 is a schematic perspective view showing a fuel injection state in the former-stage injection mode of the in-cylinder injection engine.

When a vehicle runs at low or intermediate speed, the ECU 270 determines that the engine 201 is driven in a former-stage injection lean region or stoichiometric feedback region shown in FIG. 26. In this case, the ECU 270 selects a former-stage injection mode and controls the fuel injection amount and valve opening amount of the ABV 227 to attain a relatively lean air-fuel ratio (in this embodiment, approx. 20 to 23). In the stoichiometric feedback region, the ECU 270 controls the opening and closing of the ABV 227 and EGR valve 245, and effects air-fuel ratio feedback control according to the output voltage of the $O_2$ sensor 240. As shown in FIG. 28, since the flow of intake air introduced from the intake port 213 creates a reverse tumble flow 280, ignition can be effected even with a lean air-fuel ratio in the former-stage injection lean region by the effect of the reverse tumble flow 280. Further, the ECU 270 opens the EGR valve 245 in this control region (former-stage injection lean region or stoichiometric feedback region) and introduces an adequate amount of EGR gas into the combustion chamber 205 to thereby significantly reduce NOx generated in the lean airfuel ratio state. Further, in the stoichiometric feedback region, a high engine output can be attained by a relatively large compression ratio and noxious exhaust gas components can be cleaned by the three way catalyst 242.

When a vehicle is rapidly accelerated or runs at high speed, the ECU 270 determines that the engine 201 is driven in the open loop control region in FIG. 26. In this case, the ECU 270 selects the former-stage injection mode, closes the ABV 227, and effects fuel injection control according to the throttle opening degree θTH, engine rotation speed Ne and the like to attain a relatively rich air-fuel ratio. A high engine output can be attained since the compression ratio is high, the intake air flow creates the reverse tumble flow 280, and the intake port 213 is formed substantially perpendicularly to the combustion chamber 205 to produce a preferable effect of inertia.

When a vehicle is coasting during intermediate/high speed running, the ECU 270 determines that the engine 201 is driven in the fuel-cut region shown in FIG. 26 and completely interrupts fuel injection. As a result, fuel consumption efficiency is enhanced and an emission amount of noxious exhaust gas components is reduced. Further, if the engine rotation speed Ne is lowered and becomes lower than a recovery rotation speed, or if the driver depresses the acceleration pedal, the fuel-cut operation is instantly interrupted.

Next, procedures of a fuel injection control in this embodiment will be explained based on the flowcharts of FIGS. 29 to 36 and the timing charts of FIGS. 27 to 40.

When the ignition key is turned ON, the engine 201 starts to rotate. The ECU 270 repeatedly effects the injection timing setting subroutine shown in FIG. 29 for each preset crank angle (in this embodiment, 545° BTDC (corresponding to an initial stage of the exhaust stroke in a specified cylinder, for example, first cylinder)).

In the step S102 of this subroutine, the ECU 270 reads out various driving information items and resets various flags to "0". Next, in the step S104, the ECU 270 searches for the present fuel injection control region from the fuel injection control map of FIG. 26 based on target average effective pressure Pe and engine rotation speed Ne. In the step S106, the ECU determines the fuel injection amount $Q_f$, that is, the valve opening time period $T_{inj}$ of the fuel injection valve 204 based on intake pipe pressure Pb and charging efficiency Ev. Then, in the step S108, the ECU 270 determines whether the present fuel injection mode is the former-stage injection mode or not.

If the result of determination in the step S108 is "YES (affirmative)", the ECU 270 sets a termination timing of fuel injection in the step S110 to terminate the fuel injection before entering the compression stroke and determines a start timing Tst of fuel injection based on the thus set termination timing and opening valve time period $T_{inj}$. Next, the ECU 270 determines in the step S112 whether the fuel injection start timing Tst determined in the step S110 is larger than a preset upper limit value TΔ or not. In this embodiment, the capacity (maximum possible measurement time period) for the fuel injection start timing T1 is 262 mmsec and the upper limit value TΔ is set to a value equal to the timer capacity 262 mmsec.

If the result of determination in the step S112 is "NO (negative)", the ECU 270 triggers a fuel injection start timer T1 serving as time measuring means and built in the ECU 270 in the step S114, whereupon the execution of the subroutine in the present control cycle is completed. If the result of determination in the step S112 is "YES", that is, if the fuel injection start timing Tst has exceeded the upper limit TΔ as indicated by broken lines in FIG. 37, the ECU 270 replaces the fuel injection start timing Tst by the upper limit TΔ as indicated by the solid line in FIG. 37 in the step S116, then triggers the fuel injection start timer T1 in the step S114, and terminates the subroutine. In the meantime, the start timing Tst can exceed the upper limit TΔ only at the start of the engine at which the engine rotation speed Ne is low.

In the fuel injection starting control which will be described later, the ECU 270 determines whether or not a time period measured by the fuel injection start timer T1 reaches the fuel injection start timing Tst, and when it determines that the start timing Tst is reached, the ECU starts fuel injection. Therefore, if the start timing Tst exceeds the upper limit TΔ (the capacity of the timer T1), it becomes impossible to detect the start timing Tst by use of the start timer T1. Further, if the timer of large capacity is used, the cost becomes higher. Therefore, in this embodiment, the fuel injection start timing Tst is clipped by the upper limit TΔ as described before, and even when the start timing Tst exceeds the upper limit TΔ, the start timing Tst can be detected by use of the start timer T1.

If the result of determination in the step S108 is "NO", that is, when the latter-stage injection mode is selected, the ECU 270 determines in the step S118 whether or not the valve opening time $T_{inj}$ is larger than a preset value Tβdetermined based on the engine rotation speed Ne. If the result of this determination is "YES", the fuel injection start timing Tst is set in the step S120, and a compression former-stage injection starting flag FC1 is set in the next step S122 to a value "1" indicating that fuel injection should be started in a former stage of the compression stroke, whereupon the subroutine is finished.

If the result of determination in the step S118 is "NO", the fuel injection start timing Tst is set in the step S124, then a compression latter-stage injection starting flag FC2 is set to a value "1" indicating that fuel injection should be started in a latter stage of the compression stroke, whereupon the subroutine is finished.

Figure 29:
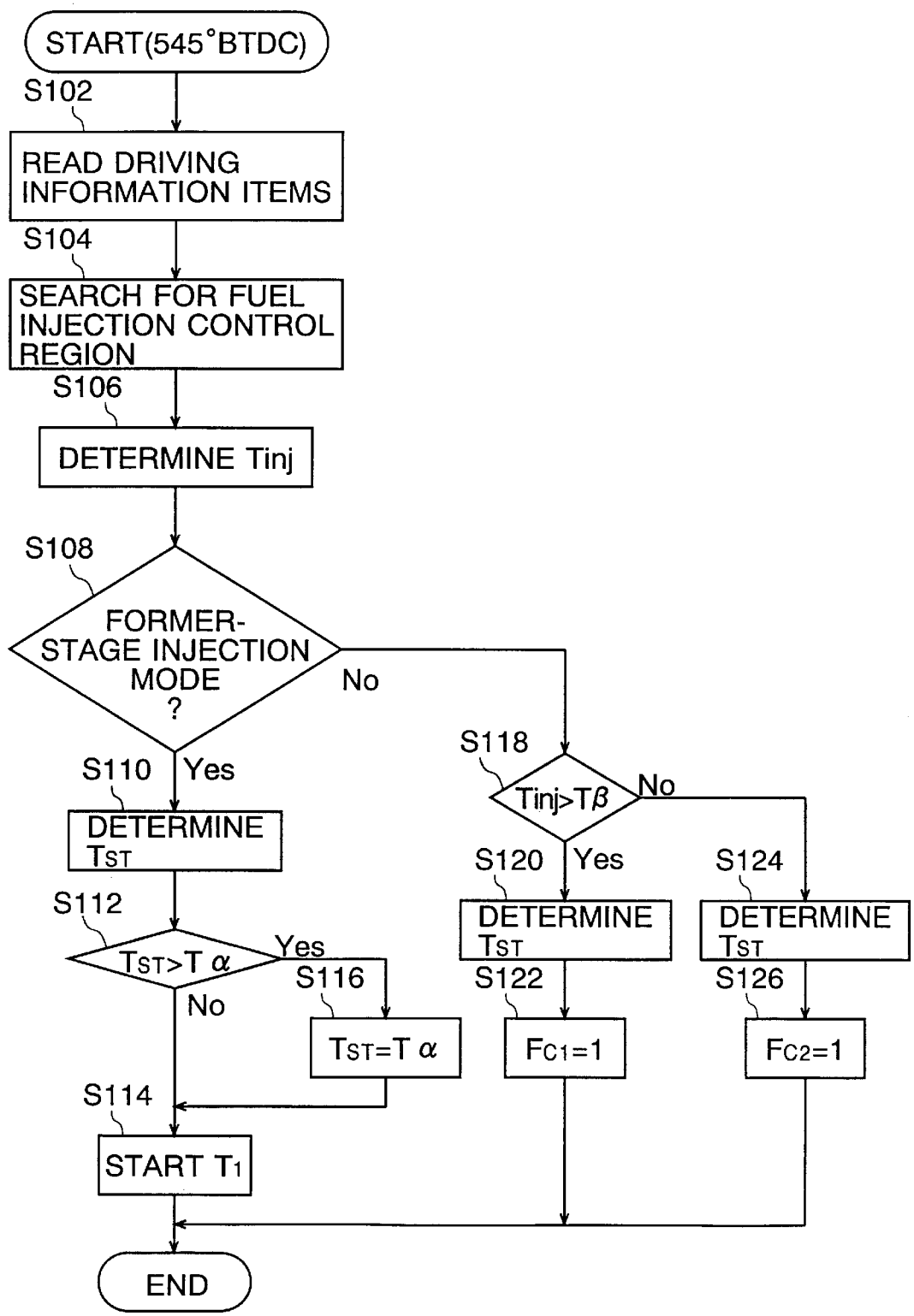
FIG. 29 is a flowchart of an injection timing setting subroutine executed by the fuel injection control apparatus shown in FIG. 24.
Figure 30:
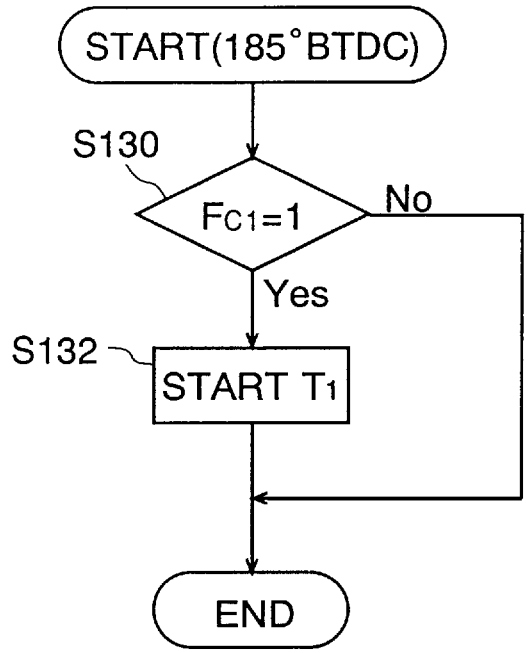
FIG. 30 is a flowchart of a first timer control subroutine executed by the fuel injection control apparatus.
Figure 31:
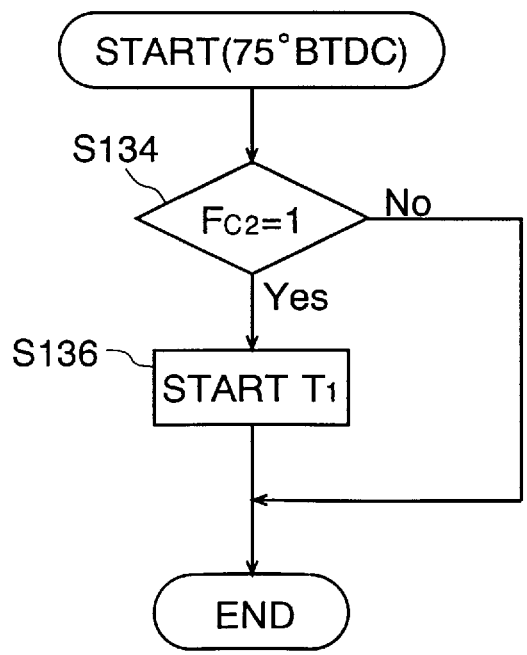
FIG. 31 is a flowchart of a second timer control subroutine executed by the same control apparatus.

As described before, when the latter-stage injection mode is selected, the fuel injection start timer T1 is not started in the injection timing setting subroutine shown in FIG. 29. Starting of the start timer T1 in the latter-stage injection mode is effected in a first timer control subroutine shown in FIG. 30 or in a second timer control subroutine shown in FIG. 31.

The first timer control subroutine is started for each crank angle of 185° BTDC. If it is determined in the step S130 of the subroutine that the value of the compression former-stage injection starting flag FC1 is "1", the ECU 270 triggers the start timer T1 in the step S132. That is, if the latter-stage injection mode is selected and the value of the flag FC1 is "1", the time measurement by the timer for detecting the start timing Tst is started at the time of 185° BTDC. As a result, the start timing Tst can be detected by the timer even when the fuel injection should be started in the former stage of the compression stroke, without the need of using a timer of large capacity.

The second timer control subroutine is started for each crank angle of 75° BTDC. If it is determined in the step S134 of the subroutine that the value of the compression latter-stage injection starting flag FC2 is "1", the ECU 270 triggers the start timer T1 in the step S136. That is, if the latter-stage injection mode is selected and the value of the flag FC2 is "1", the time measurement by the timer for detecting the start timing Tst is started at the time of 75° BTDC. As a result, the start timing Tst can be detected by the timer even when the fuel injection should be started in the latter stage of the compression stroke, without using a timer of large capacity.

Figure 32:
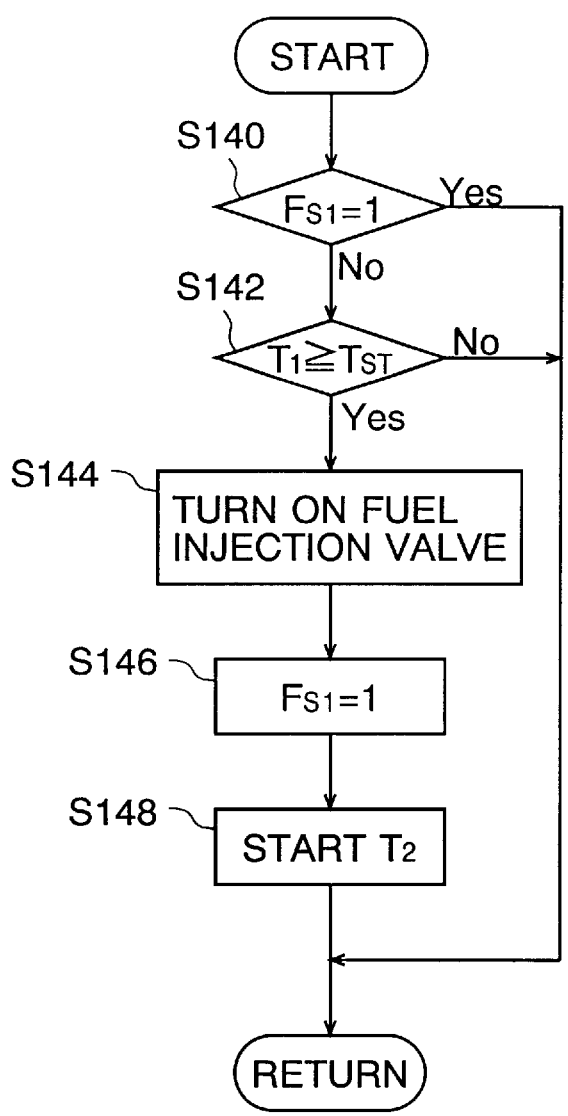
FIG. 32 is a flowchart of an injection start control subroutine.

The ECU 270 repeatedly executes an injection starting control subroutine shown in FIG. 32 at a preset control interval, while determining the valve opening time $T_{inj}$ and the start timing Tst and causing the start timer T1 to effect a counting operation.

The ECU 270 determines in the step 140 of this subroutine whether or not the starting set flag FS1 is set to a value "1" indicating that fuel injection should be carried out. Since the starting set flag FS1 is set, in the step S102 of FIG. 29, to a value "0" indicating that fuel injection should not be effected, the result of determination in the step S140 immediately after the start of this subroutine is "NO". In this case, the control flow proceeds to the step S142 to determine whether the start timing Tst is reached or not based on the measured time by the start timer T1. If the result of determination is "NO", execution of this subroutine in the present control cycle is terminated.

If the result of determination in the step S142 in the next or subsequent control cycle is "YES", that is, if it is determined that the start timing Tst is reached, the ECU 270 turns on the fuel injection valve 204 in the step S144, whereby fuel injection is started. Next, the ECU 270 sets the value of the starting set flag FS1 to "1" in the step S146 and starts a termination timer T2 in the step S148. The result of determination in the step S140 becomes "YES" until the value of the starting set flag FS1 is reset to "0". In this case, the ECU 270 does not effect substantial processing in this subroutine.

Figure 33:
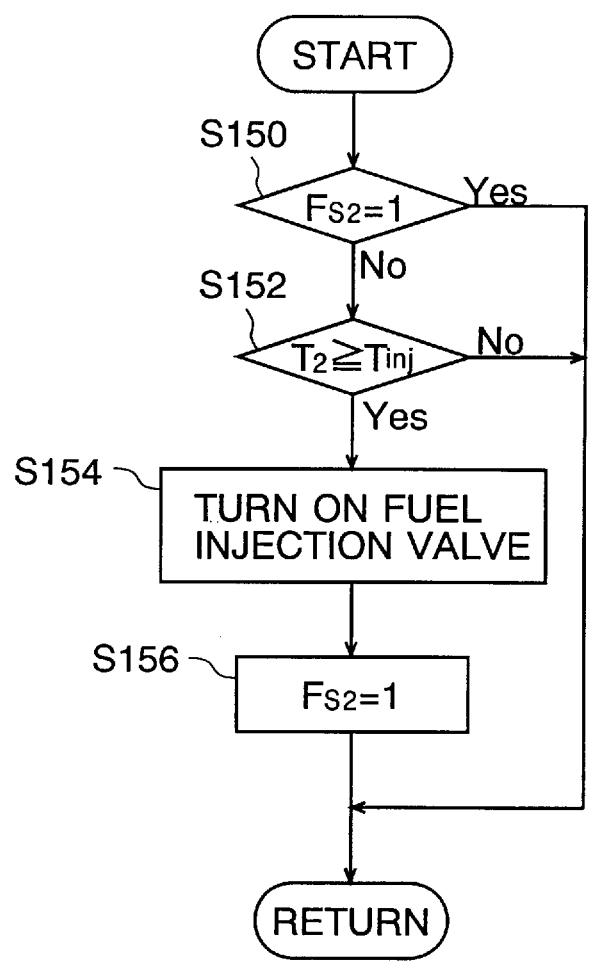
FIG. 33 is a flowchart of an injection termination control subroutine.
Figure 34:
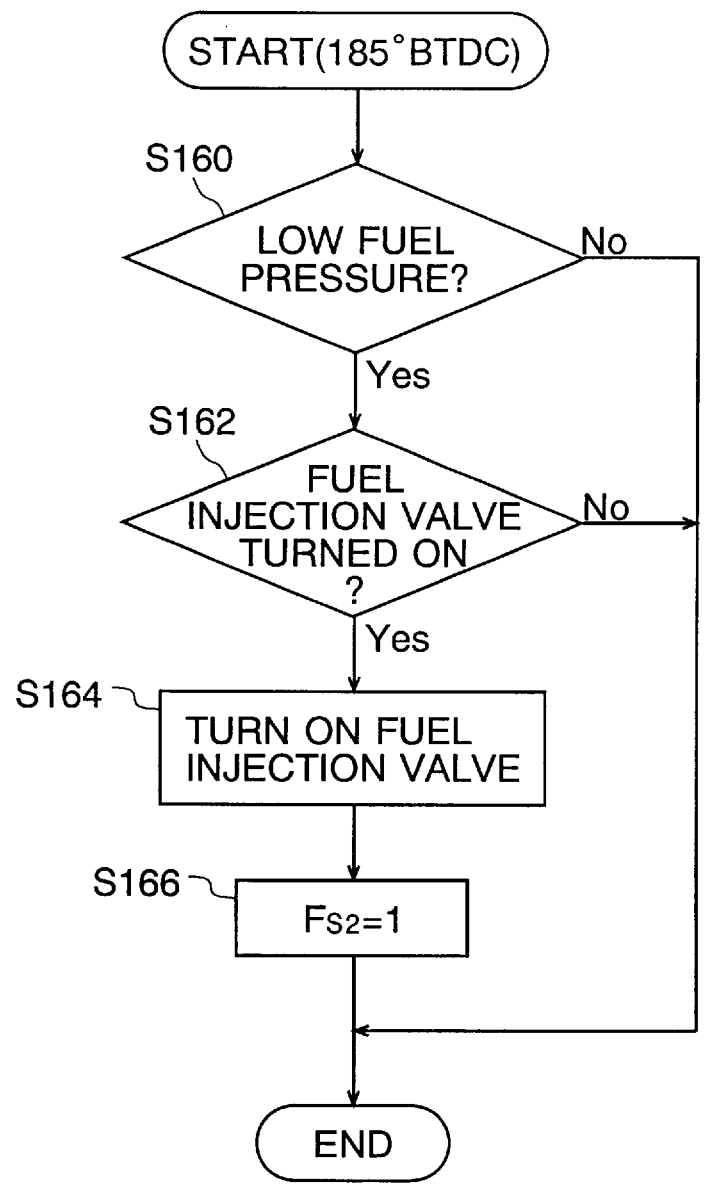
FIG. 34 is a flowchart of a former-stage injection interruption control subroutine.
Figure 35:
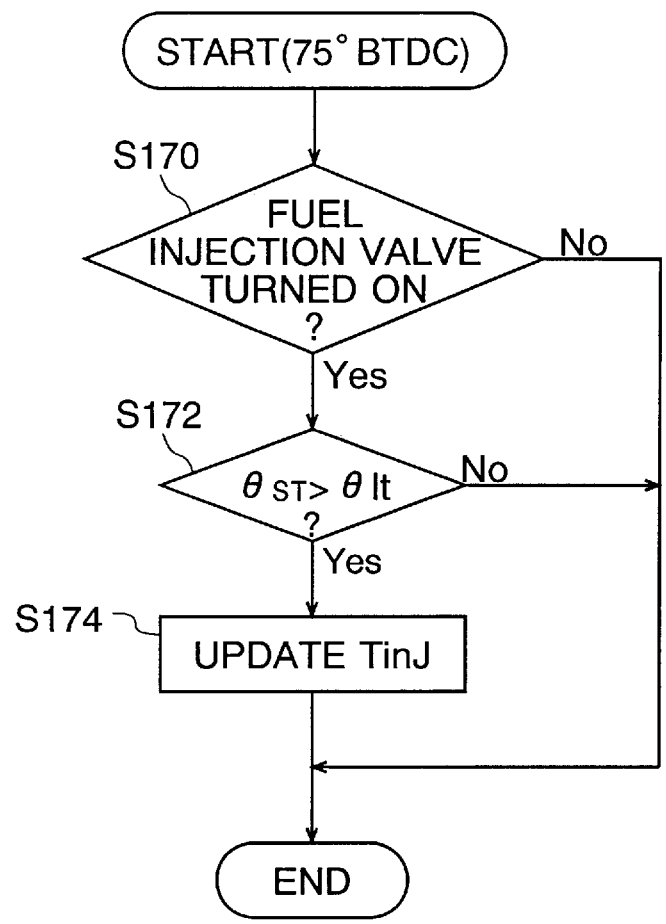
FIG. 35 is a flowchart of a first latter-stage injection interruption control subroutine.
Figure 36:
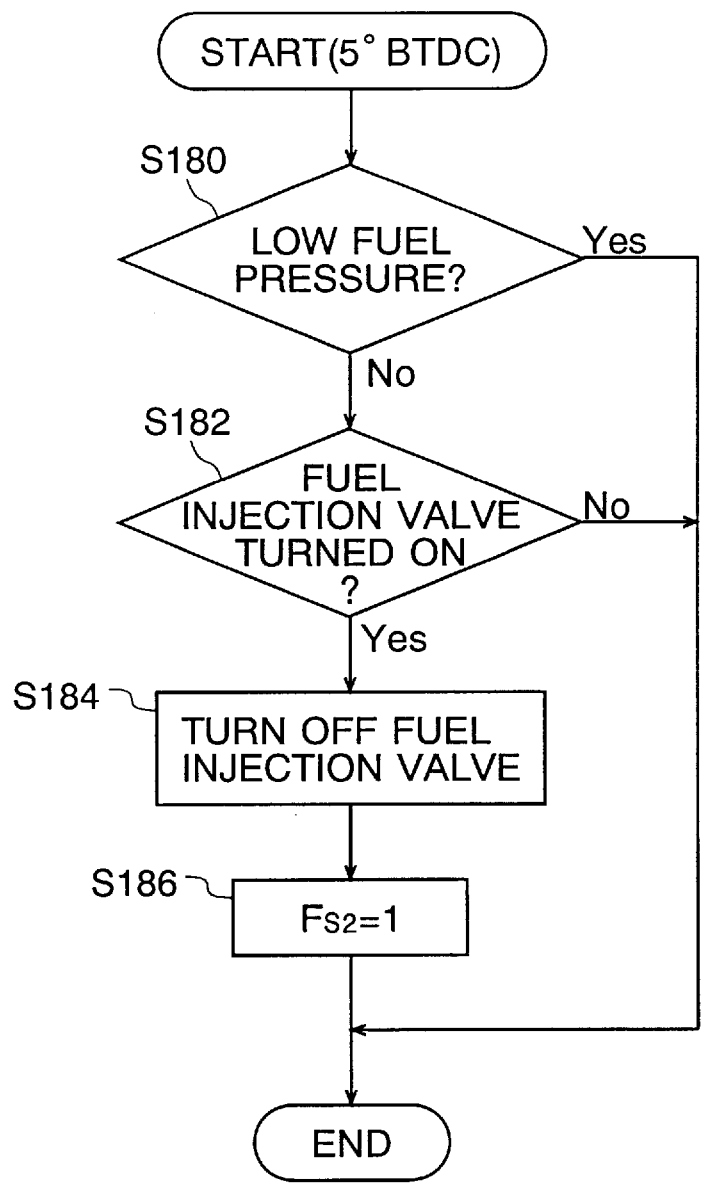
FIG. 36 is a flowchart of a second latter-stage injection interruption control subroutine.
Figure 37:
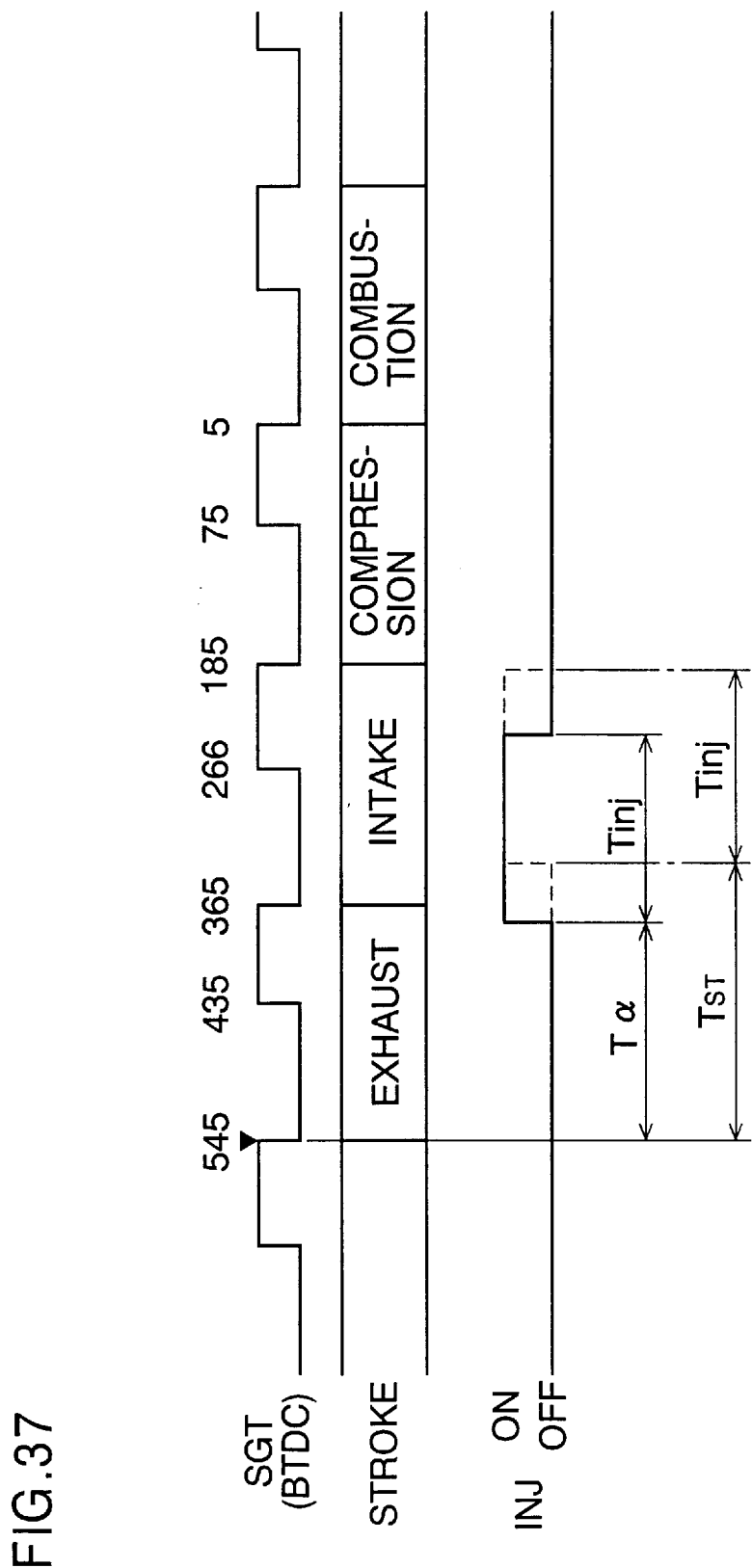
FIG. 37 is a timing chart for illustrating the operation of the fuel injection control apparatus shown in FIG. 24 at the time of change of the fuel injection start timing.

The ECU 270 repeatedly executes the injection termination control subroutine shown in FIG. 33 at a preset control interval in parallel with the injection starting control subroutine.

The ECU 270 determines in the step S150 of this subroutine whether or not the termination set flag FS2 is set to a value "1" indicating that fuel injection should be terminated. Since the termination set flag FS2 is set to a value "0" indicating that fuel injection should not be terminated in the step S102 of FIG. 29, the result of determination immediately after the start of this subroutine is "NO". In this case, the ECU 270 determines in the step S152 whether or not a time period measured by the termination timer T2 becomes equal to or exceeds the valve opening time $T_{inj}$. If the result of determination is "NO", execution of this subroutine in the present control cycle is terminated.

If the result of determination in the step S152 in the next or succeeding control cycle is "YES", that is, if it is determined that the valve opening time $T_{inj}$ has elapsed, the ECU 270 turns off the fuel injection valve 204 in the step S154 to thereby terminate the fuel injection, and sets the termination set flag FS2 to "1" in the step S156. After this, the result of determination in the step S150 becomes "YES" until the value of the termination set flag FS2 is reset to "0" again in the injection time setting subroutine, so that the ECU 270 will not effect substantial processing in this subroutine.

The above-described fuel injection control is applied in an ordinary driving state of the engine. On the other hand, if the fuel injection termination timing is shifted, e.g., at the start or rapid acceleration driving of the engine, a fuel injection interruption control explained below is effected.

As described before, at the start of the engine, low-pressure fuel is supplied to the fuel injection valve 204 and the ECU 270 selects the former-stage injection mode to inject the fuel. At this time, the ECU 270 sets the termination timing of fuel injection so that the fuel injection will terminate in the intake stroke. However, if the engine rotation speed Ne rapidly increases after the first explosion, the termination timing is shifted into the compression stroke even if the fuel injection is started at a preset start timing. Thus, the ECU 270 executes the former-stage injection interruption control subroutine shown in FIG. 34 at a final stage (185° BTDC) of the intake stroke.

The ECU 270 determines in the step S160 of this subroutine whether or not the present fuel supply is effected at a low fuel pressure, that is, whether or not the fuel pressure switching valve 260 is turned on. If the result of determination is "NO", execution of the subroutine in the present control cycle is terminated. This is because the pressure in the cylinder does not become higher than the fuel pressure if the fuel pressure is high so that gas cannot reversely flow into the fuel injection valve.

If the result of determination in the step S160 is "YES", the ECU 270 determines in the step S162 whether or not the fuel injection valve 204 is now set in an ON state, and if the result of this determination is "NO", that is, if the fuel injection is already terminated, execution of the subroutine in the present control cycle is finished.

Figure 38:
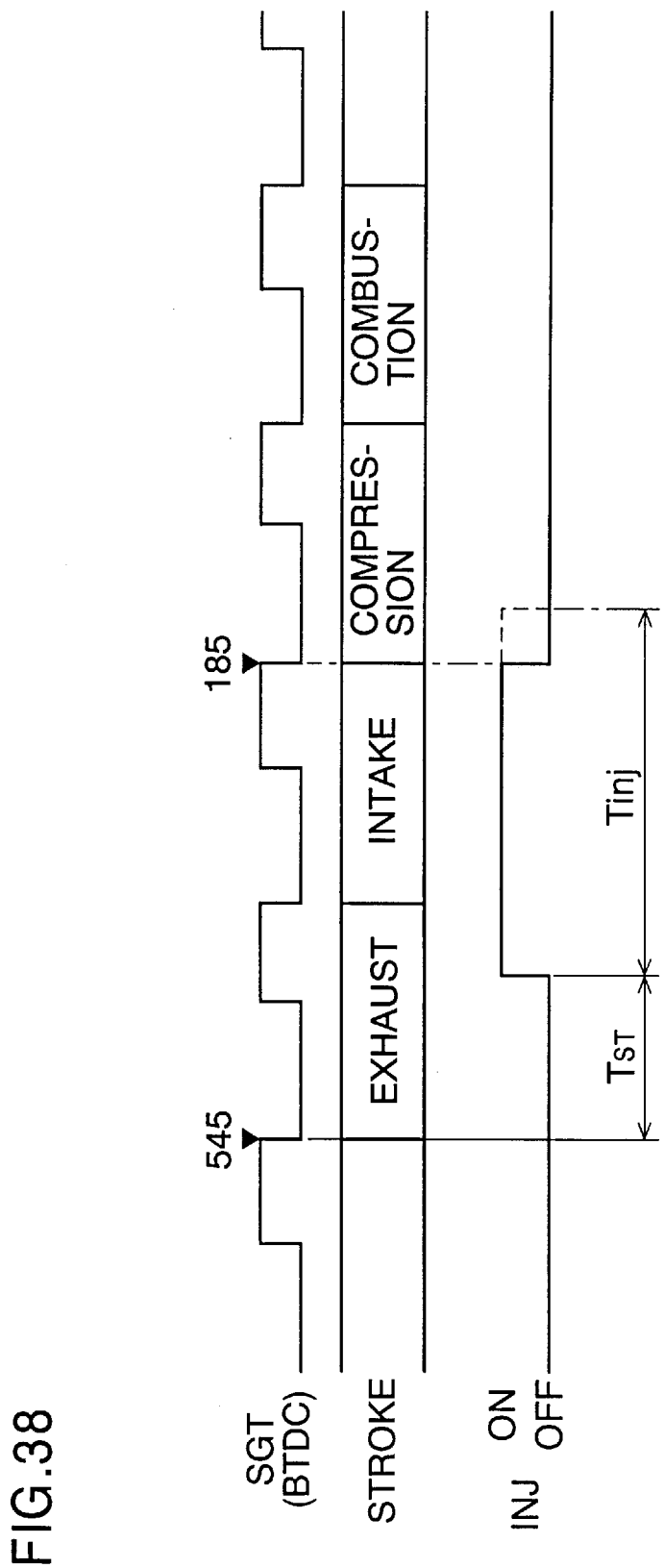
FIG. 38 is a timing chart for illustrating the operation of the control apparatus in the former-stage injection interruption control.
Figure 39:
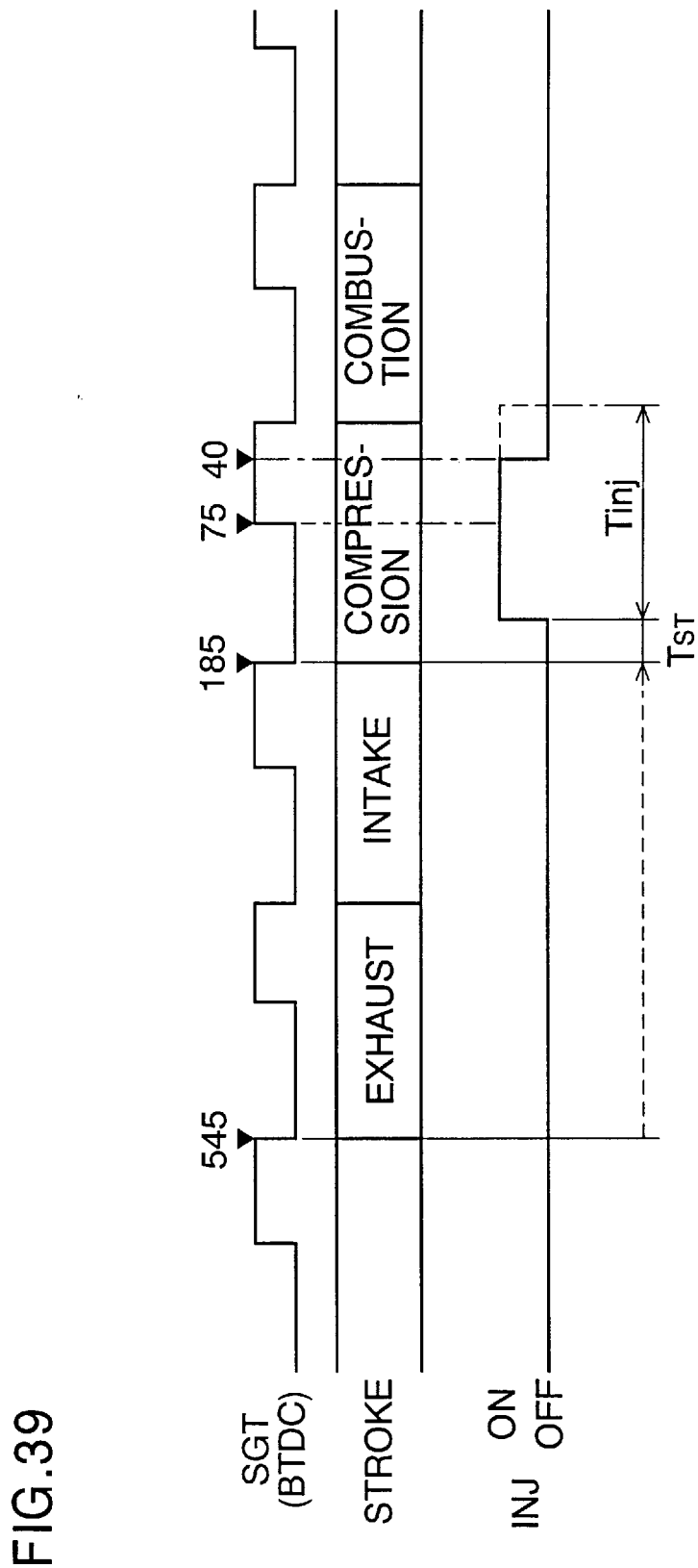
FIG. 39 is a timing chart for illustrating the operation of the control apparatus in the first latter-stage injection interruption control.
Figure 40:
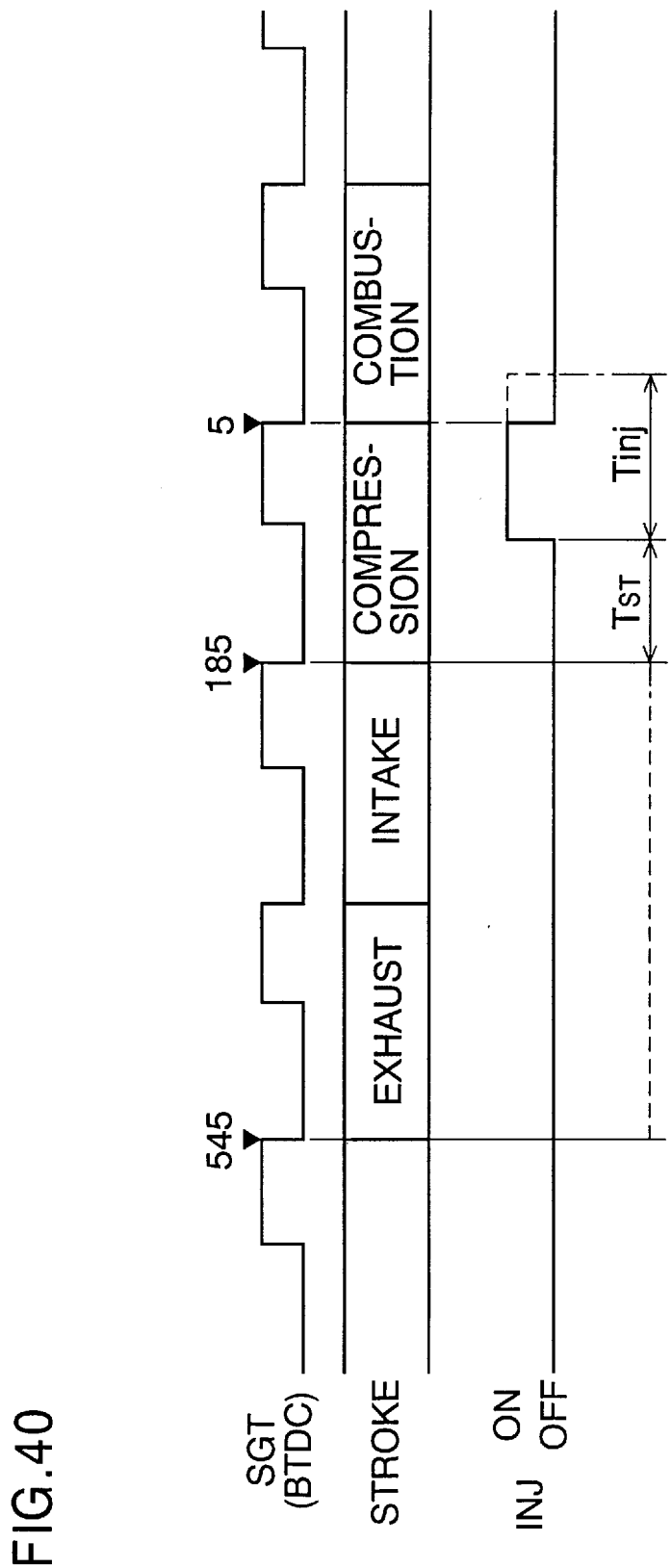
FIG. 40 is a timing chart for illustrating the operation of the control apparatus in the second latter-stage injection interruption control.

In the case that the result of determination in the step S162 is "YES", the ECU 270 further determines that the fuel injection termination timing is shifted into the compression stroke even at the low fuel pressure, and sets the fuel injection valve 204 into an OFF state in the step S164 to thereby forcedly terminate the fuel injection (refer to FIG. 38). After this, the ECU 270 sets the value of the termination set flag FS2 to "1" and prevents the fuel injection from being effected in the injection termination control subroutine (FIG. 33) described before.

On the other hand, at the time of idle driving, fuel of high fuel pressure is supplied to the fuel injection valve 204 and the ECU 270 selects the latter-stage injection mode for fuel injection. At this time, the ECU 270 sets the termination timing of fuel injection in the compression stroke. However, if the engine rotation speed Ne rapidly increases because of the start, acceleration of a vehicle or other reasons, the termination timing of the fuel injection is shifted into the combustion stroke even if the fuel injection is started at a preset start timing. Thus, the ECU 270 executes a first latter-stage injection interruption control subroutine shown in FIG. 35 at an intermediate stage (75° BTDC) of the compression stroke.

The ECU 270 determines in the step S170 of this subroutine whether or not the fuel injection valve 204 is now set in an ON state, and if the result of determination is "NO", that is, if the fuel injection is already terminated, execution of the subroutine in the present control cycle is terminated. If the result of determination in the step S170 is "YES", the ECU 270 estimates in the step S172 whether or not the crank angle OST at which the fuel injection is terminated will be shifted into a range which comes after a preset injection termination crank angle θ1t (in this embodiment, 40° BTDC) based on the present engine rotation speed Ne and the remaining valve opening time $T_{inj}$. If the result of determination in the step S172 is "NO", the ECU 270 determines that the fuel injection will be terminated in the compression stroke, and finishes execution of the subroutine in the present control cycle. On the other hand, if the result of determination in the step S172 is "YES", the ECU 270 updates the valve opening time $T_{inj}$ in the step S174 so that the fuel injection will be terminated at the injection termination crank angle θ1t (refer to FIG. 39). As a result, that time point at which the fuel injection valve is set into an OFF state in the above-described injection termination control subroutine is put forward so as to prevent the termination timing from being shifted into the combustion stroke.

In the first latter-stage injection termination control subroutine, the ECU 270 estimates the injection termination crank angle θ1t based on the engine rotation speed Ne and the remaining valve opening time $T_{inj}$, at the intermediate stage (75° BTDC) of the compression stroke. However, if the engine rotation speed Ne is further increased thereafter, there occurs a possibility that the fuel injection will not be terminated at the estimated injection termination crank angle θ1t and the termination timing is shifted into the combustion stroke. Thus, the ECU 270 executes a second latter-stage injection termination control subroutine shown in FIG. 36 at the final stage (5° BTDC) of the compression stroke.

In the step S180 of this subroutine, the ECU 270 determines whether or not the present fuel supply is effected at a low fuel pressure, that is, whether or not the fuel pressure switching valve 260 is set in an ON state. If the result of determination is "YES", execution of the present subroutine in the present control cycle is completed. This intends to avoid an increase in the load applied to the CPU or the like due to execution of extra control in view of the fact that the fuel injection in the latter-stage injection mode is effected only at a high fuel pressure. In case that the result of determination in the step S180 is "NO", the ECU 270 determines in the step S182 whether or not the fuel injection valve 204 is now set in the ON state, and if the result of determination is "NO", that is, if the fuel injection is already terminated, execution of the subroutine in the present control cycle is finished. In case that the result of determination in the step S182 is "YES", the ECU 270 determines that the termination timing is shifted into the combustion stroke even at the low fuel pressure, and sets the fuel injection valve 204 into the OFF state in the step S184 to thereby forcedly terminate the fuel injection (refer to FIG. 40). After this, the ECU 270 sets the termination set flag FS2 to "1" in the step S186 so as to prevent the injection termination control subroutine described before from being executed.

In this embodiment, since the above-mentioned control is carried out, the fuel injection termination timing at the start or acceleration of the engine can be prevented from being shifted into the compression stroke or combustion stroke and staining of the fuel injection valve and generation of smoke can be completely prevented. Meanwhile, as a result of the former-stage injection termination control or the latter-stage injection termination control, the valve opening time is substantially shortened so that the fuel injection amount is reduced. In this case, however, no serious problem occurs although the air-fuel ratio is slightly changed on the lean side.

This invention is not limited to the above first and second embodiments, and may be variously modified.

For example, the present invention can be applied to various types of engines although a case where this invention is applied to a cylinder-injection gasoline engine of straight four-cylinder type has been explained in the first and second embodiments. Specifically, this invention is applicable to engines such as a single-cylinder engine, V-type six-cylinder engine having a different number of cylinders and a different array of cylinders, and is also applicable to an engine using fuel such as methanol different from gasoline. In the above embodiments, a vane type crank angle sensor for outputting a crank angle signal at a preset crank angle position is used, but a crank angle sensor adapted to output a crank angle signal e.g., for every 1° may be used. Further, in the above embodiment, fuel injection control is effected based on the start timing of fuel injection and the valve opening time period, but it may be effected based on the start timing and the termination timing by use of a timer with a large capacity. Further, it is desirable to adequately set the fuel injection time period and the start timing of the subroutine for injection termination control, by taking into account of the type and specification of the engine in addition to the specification of the crank angle sensor. Furthermore, the concrete construction of the control system and the control procedure can be modified without departing from the spirit of this invention.

I claim:

1. A fuel injection control apparatus for an internal combustion engine including fuel injection information calculating means for periodically calculating fuel injection information in accordance with an operation state of the internal combustion engine, the fuel injection information being used to operate fuel injection valves provided for cylinders of the internal combustion engine; and fuel injection valve driving means for driving the fuel injection valves based on fuel injection information derived by the fuel injection information calculating means in association with operation cycles of the internal combustion engine, comprising:

setting means for setting fuel injection information derived by said fuel injection information calculating means at a specific timing before actuation of the associated fuel injection valve in a desired operation cycle, as fuel injection information in the desired operation cycle;

driving information outputting means for outputting driving information based on which the internal combustion engine is driven; and correction means for correcting at least part of the fuel injection information set by said setting means, the correction being made at a correction timing later than the specific timing in accordance with driving information which is output from said driving information outputting means.

2. A fuel injection control apparatus for an internal combustion engine according to claim 1, wherein said driving information outputting means outputs fuel injection information derived at the correction timing by said fuel injection information calculating means, as the driving information.

3. A fuel injection control apparatus for an internal combustion engine according to claim 2, wherein the fuel injection information calculated by said fuel injection information calculating means contains fuel injection amount information and fuel injection timing information.

4. A fuel injection control apparatus for an internal combustion engine according to claim 3, wherein said correction means corrects the fuel injection amount information, set by said setting means, based on the fuel injection amount information derived at the correction timing by said fuel injection information calculating means, and corrects the fuel injection timing information, set by said setting means, based on a relation between the correction timing and the fuel injection timing information derived at the correction timing by said fuel injection information calculating means.

5. A fuel injection control apparatus for an internal combustion engine according to claim 4, wherein said correction means corrects the fuel injection timing information so that a later one of the correction timing and a fuel injection start timing which is determined based on the fuel injection timing information derived at the correction timing by said fuel injection information calculating means is set as the fuel injection start timing if the correction timing precedes the fuel injection start timing which is determined based on the fuel injection timing information set by said setting means.

6. A fuel injection control apparatus for an internal combustion engine according to claim 4, wherein said correction means leaves a fuel injection start timing, determined based on the fuel injection timing information set by said setting means, as it is set as the fuel injection start timing if the fuel injection start timing determined based on the fuel injection timing information set by said setting means precedes the correction timing.

7. A fuel injection control apparatus for an internal combustion engine according to claim 4, wherein said correction means leaves a fuel injection start timing, determined based on the fuel injection timing information set by said setting means, as it is set as the fuel injection start timing if the fuel injection start timing determined based on the fuel injection timing information set by said setting means precedes the correction timing, and corrects the fuel injection timing information set by said setting means such that the correction timing is set as a fuel injection termination timing if a fuel injection time period from the fuel injection start timing to the correction timing is longer than a fuel injection time period determined based on the fuel injection information which is derived at the correction timing by said fuel injection information calculating means.

8. A fuel injection control apparatus for an internal combustion engine according to claim 3, wherein:

said fuel injection valve driving means further includes re-correction means for driving the fuel injection valves based on a result of correction by said correction means and for setting additional fuel injection amount information based on a difference between the fuel injection amount information derived at the correction timing and the fuel injection amount information derived by said fuel injection information calculating means at a re-correction timing which lags behind the correction timing in a specified cycle; and said fuel injection valve driving means drives the associated fuel injection valve twice in the same operation cycle so as to effect additional fuel injection based on the additional fuel injection amount information set by said re-correction means.

9. A fuel injection control apparatus for an internal combustion engine according to claim 8, wherein:

the internal combustion engine is constructed as an in-cylinder injection type internal combustion engine having the fuel injection valves disposed to directly inject fuel into combustion chambers and is operable in a former-stage injection mode in which fuel injection is effected mainly in an intake stroke and in a latter-stage injection mode in which fuel injection is effected mainly in a compression stroke; and said fuel injection valve driving means drives the fuel injection valves based on resultant fuel injection information set by said setting means and then corrected by said correction means if the internal combustion engine is operated in the former-stage injection mode, and drives each fuel injection valve based on the additional fuel injection amount information while that stroke is being carried out which corresponds to the latter-stage injection mode and which is one of strokes belonging to the same cycle as a cycle in which fuel injection valve is driven.

10. A fuel injection control apparatus for an internal combustion engine according to claim 3, wherein said fuel injection information calculating means sets a fuel injection termination timing which meets the operation state of the internal combustion engine and a fuel injection start timing which is based on the fuel injection termination timing and fuel injection amount information, as the fuel injection timing information.

11. A fuel injection control apparatus for an internal combustion engine according to claim 2, wherein:

the internal combustion engine is a multi-cylinder internal combustion engine and effects a sequential injection process for sequentially injecting fuel from the fuel injection valves provided for the respective cylinders according to the stoke states of the respective cylinders; and the correction timing of a desired cylinder is set to coincide with the specific timing for another cylinder.

12. A fuel injection control apparatus for an internal combustion engine according to claim 2, wherein the internal combustion engine is constructed as an in-cylinder injection type internal combustion engine which has the fuel injection valves disposed to directly inject fuel into the cylinders.

13. A fuel injection control apparatus for an internal combustion engine according to claim 12, wherein:

the internal combustion engine is a four-cylinder internal combustion engine which is operable in a former-stage injection mode in which fuel injection is effected mainly in the intake stroke of the internal combustion engine and in a latter-stage injection mode in which fuel injection is effected mainly in the compression stroke of the internal combustion engine;

the specific timing for each cylinder of the internal combustion engine is set near a bottom dead center in an exhaust stroke in the cylinder; and said fuel injection valve driving means drives the fuel injection valves of the respective cylinders based on resultant fuel injection information set by said setting means and then corrected by said correction means, if the internal combustion engine is operated in the former-stage injection mode.

14. A fuel injection control apparatus for an internal combustion engine according to claim 13, wherein said fuel injection valve driving means drives the fuel injection valve of each cylinder based on the fuel injection information derived at the correction timing for the cylinder by said fuel injection information calculating means, if the internal combustion engine is operated in the latter-stage injection mode.

15. A fuel injection control apparatus for an internal combustion engine according to claim 1, wherein:

said driving information outputting means determines whether or not fuel injection based on the fuel injection information derived by said fuel injection information calculating means at the specific timing is effected at the correction timing; and said correction means sets the fuel injection termination timing as the correction timing by correcting the fuel injection information set by said setting means if said driving information outputting means determines that the fuel injection is effected at the correction timing.

16. A fuel injection control apparatus for an internal combustion engine according to claim 15, wherein:

the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into combustion chambers; and said fuel injection control apparatus further includes fuel pressure switching means for switching a pressure of fuel injected from the fuel injection valves between at least two stages of high pressure side and low pressure side.

17. A fuel injection control apparatus for an internal combustion engine according to claim 16, wherein said driving information outputting means determines whether or not fuel injection is effected in the former-stage injection mode, determines whether or not the fuel pressure is switched to the low-pressure side by said fuel pressure switching means, and sets the correction timing to a timing at which the intake stroke is almost terminated if it is determined that the fuel injection is effected in the former-stage injection mode and the fuel pressure is switched to the low-pressure side.

18. A fuel injection control apparatus for an internal combustion engine according to claim 16, wherein said driving information outputting means determines whether or not fuel injection is effected in the latter-stage injection mode, determines whether or not the fuel pressure is switched to the high-pressure side by said fuel pressure switching means, and sets the correction timing to a timing at which the compression stroke is almost terminated if it is determined that the fuel injection is effected in the latter-stage injection mode and the fuel pressure is switched to the high-pressure side.

19. A fuel injection control apparatus for an internal combustion engine according to claim 15, wherein:

the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into combustion chambers; and said correction means outputs an earlier one of predetermined timing which lags behind the correction timing and the fuel injection termination timing which is based on the fuel injection information set by said setting means, as fuel injection termination timing, to said fuel injection valve driving means, if said driving information outputting means determines that the fuel injection is effected at the correction timing.

20. A fuel injection control apparatus for an internal combustion engine according to claim 1, wherein:

said driving information outputting means determines whether or not fuel injection based on fuel injection information derived by said fuel injection information calculating means at the specific timing is effected at the correction timing; and said correction means sets the correction timing as a fuel injection start timing by correcting the fuel injection information set by said setting means if said driving information outputting means determines that the fuel injection is not yet effected at the correction timing.

21. A fuel injection control apparatus for an internal combustion engine according to claim 20, wherein the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke, and which directly injects fuel into combustion chambers.

22. A fuel injection control apparatus for an internal combustion engine according to claim 21, wherein:

said driving information outputting means further determines whether or not the fuel injection is effected in the former-stage injection mode; and said correction means effects the correction of the fuel injection information if said driving information outputting means determines that the fuel injection is effected in the former-stage injection mode.

23. A fuel injection control apparatus for an internal combustion engine according to claim 20, wherein the correction timing is a timing at which a maximum countable time of a timer elapses from the specific timing, the timer being adapted to count an elapsed time period from the specific timing, the elapsed time period being used to detect the fuel injection start timing which is derived from fuel injection information derived by said fuel injection information calculating means at the specific timing.

24. A fuel injection control method for an internal combustion engine for periodically calculating fuel injection information in accordance with an operation state of the internal combustion engine, and for driving fuel injection valves provided for respective cylinders of the internal combustion engine based on the fuel injection information in association with operation cycles of the internal combustion engine, comprising:

a first step of setting fuel injection information derived at a specific timing in a desired operation cycle of the internal combustion engine as fuel injection information in the desired operation cycle;

a second step of correcting at least part of the fuel injection information set in said first step, at a correction timing which lags behind the specific timing in the desired operation cycle in accordance with driving information of the internal combustion engine; and a third step of driving the fuel injection valves in the desired operation cycle based on the fuel injection information corrected in said second step.

25. A fuel injection control method for an internal combustion engine according to claim 24, wherein the driving information is the fuel injection information calculated at the correction timing.

26. A fuel injection control method for an internal combustion engine according to claim 25, wherein the fuel injection information contains fuel injection amount information and fuel injection timing information.

27. A fuel injection control method for an internal combustion engine according to claim 26, wherein said second step includes a step of correcting the fuel injection amount information set in said first step, based on the fuel injection amount information derived at the correction timing, and a step of correcting the fuel injection timing information set in said first step, based on a relation between the correction timing and the fuel injection timing information which is derived at the correction timing.

28. A fuel injection control method for an internal combustion engine according to claim 27, wherein the fuel injection timing information is corrected in said second step so that a later one of the correction timing and a fuel injection start timing which is determined based on the fuel injection timing information derived at the correction timing is set as the fuel injection start timing if the correction timing precedes the fuel injection start timing which is determined based on the fuel injection timing information set in said first step.

29. A fuel injection control method for an internal combustion engine according to claim 27, wherein a fuel injection start timing determined based on the fuel injection timing information set in said first step is left as it is set as the fuel injection start timing if the fuel injection start timing determined based on the fuel injection timing information set in said first step precedes the correction timing.

30. A fuel injection control method for an internal combustion engine according to claim 27, wherein a fuel injection start timing determined based on the fuel injection timing information set in said first step is left as it is set as the fuel injection start timing if the fuel injection start timing determined based on the fuel injection timing information set in said first step precedes the correction timing, and the fuel injection timing information set in said first step is corrected such that the correction timing is set as a fuel injection termination timing if a fuel injection time period from the fuel injection start timing to the correction timing is longer than a fuel injection time period determined based on the fuel injection information which is derived at the correction timing.

31. A fuel injection control method for an internal combustion engine according to claim 26, wherein said third step includes a step of driving the fuel injection valves based on a result of correction in said second step and of setting additional fuel injection amount information based on a difference between the fuel injection amount information derived at the correction timing and the fuel injection amount information derived at a re-correction timing which lags behind the correction timing in a specific cycle, and the associated fuel injection valve is driven twice in the same operation cycle to effect additional fuel injection based on the additional fuel injection amount information set in said driving and setting step.

32. A fuel injection control method for an internal combustion engine according to claim 31, wherein:

the internal combustion engine is constructed as an in-cylinder injection type internal combustion engine having the fuel injection valves disposed to directly inject fuel into combustion chambers and is operable in a former-stage injection mode in which fuel injection is effected mainly in the intake stroke and in a latter-stage injection mode in which fuel injection is effected mainly in the compression stroke; and the injection valves are driven in said third step based on a result of the operation in said second step of correcting the fuel injection information set in said first step if the internal combustion engine is operated in the former-stage injection mode, and the fuel injection valves are also driven in said third step based on the additional fuel injection amount information while that stroke is being effected which corresponds to the latter-stage injection mode and which is one of strokes belonging to the same cycle as a cycle in which the fuel injection valve is driven.

33. A fuel injection control method for an internal combustion engine according to claim 26, wherein the fuel injection information includes fuel injection termination timing corresponding to the operation state of the internal combustion engine and fuel injection start timing based on the fuel injection termination timing and fuel injection amount information.

34. A fuel injection control method for an internal combustion engine according to claim 25, wherein:

the internal combustion engine is a multi-cylinder internal combustion engine and effects a sequential injection process for sequentially injecting fuel from the fuel injection valves provided for the respective cylinders according to stoke states of the respective cylinders; and the correction timing for a desired cylinder is set to coincide with the specific timing for another cylinder.

35. A fuel injection control method for an internal combustion engine according to claim 25, wherein:

the internal combustion engine is constructed as a four-cylinder internal combustion engine having fuel injection valves to directly inject fuel into the cylinders and being operable in a former-stage injection mode in which fuel injection is effected mainly in the intake stroke of the internal combustion engine and in a latter-stage injection mode in which fuel injection is effected mainly in the compression stroke of the internal combustion engine;

the specific timing for each cylinder of the internal combustion engine is set near a bottom dead center in the exhaust stroke in the cylinder; and the fuel injection valves of the respective cylinders are driven in said third step based on a result of the operation in said second step of correcting the fuel injection information set in said first step if the internal combustion engine is operated in the former-stage injection mode.

36. A fuel injection control method for an internal combustion engine according to claim 33, wherein the fuel injection valve of each cylinder is driven based on the fuel injection information derived at the correction timing for the cylinder in said third step when the internal combustion engine is operated in the latter-stage injection mode.

37. A fuel injection control method for an internal combustion engine according to claim 24, wherein:

the driving information indicates whether or not fuel injection based on the fuel injection information derived at the specific timing is effected at the correction timing; and the fuel injection information set in said first step is so corrected in said second step as to set the fuel injection termination timing as the correction timing, if the driving information indicates that the fuel injection is effected at the correction timing.

38. A fuel injection control method for an internal combustion engine according to claim 37, wherein:

the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into the combustion chambers; and said fuel injection control method further comprises a fourth step of switching a pressure of fuel injected from the fuel injection valves between at least two stages of high pressure side and low pressure side.

39. A fuel injection control method for an internal combustion engine according to claim 38, wherein:

the driving information indicates whether or not fuel injection is effected in the former-stage injection mode, and indicates whether or not the fuel pressure is switched to the low-pressure side in said fourth step; and said fuel injection control method further comprises a fifth step of setting the correction timing to a timing at which the intake stroke is almost terminated if the driving information indicates that the fuel injection is effected in the former-stage injection mode and the fuel pressure is switched to the low-pressure side.

40. A fuel injection control method for an internal combustion engine according to claim 38, wherein:

the driving information indicates whether or not fuel injection is effected in the latter-stage injection mode and indicates whether or not the fuel pressure is switched to the high-pressure side in said fourth step; and said fuel injection control method further comprises a fifth step of setting the correction timing to a timing at which the compression stroke is almost terminated if the driving information indicates that the fuel injection is effected in the latter-stage injection mode and the fuel pressure is switched to the high-pressure side.

41. A fuel injection control method for an internal combustion engine according to claim 37, wherein:

the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into the combustion chambers; and an earlier one of a predetermined timing which lags behind the correction timing and the fuel injection termination timing which is determined based on the fuel injection information set in said first step, is set in said second step as fuel injection termination timing, if the driving information indicates that the fuel injection is effected at the correction timing.

42. A fuel injection control method for an internal combustion engine according to claim 24, wherein:

the internal combustion engine is an in-cylinder injection type internal combustion engine which is operable in a former-stage injection mode in which fuel injection is effected mainly in the intake stroke and in a latter-stage injection mode in which fuel injection is effected mainly in the compression stroke and which directly injects fuel into the combustion chambers;

the driving information indicates whether or not fuel injection based on fuel injection information which is derived at the specific timing is effected at the correction timing; and the fuel injection information set in said first step is so corrected in said second step as to set the correction timing as a fuel injection start timing, if the driving information indicates that the fuel injection is not yet effected at the correction timing.

43. A fuel injection control method for an internal combustion engine according to claim 42, wherein the correction timing is a timing at which a maximum countable time of a timer elapses from the specific timing, the timer being adapted to count an elapsed time from the specific timing and the elapsed time being used to detect the fuel injection start timing derived from the fuel injection information derived at the specific timing.

* * * * *

UNITED STATES PATENT AND TRADEMARK OFFICE
CERTIFICATE OF CORRECTION

PATENT NO. : 5,832,901
DATED : November 10, 1998
INVENTOR(S) : Masato Yoshida, et al It is certified that error appears in the above-identified patent and that said Letters Patent is hereby corrected as shown below:

Column 1, line 13, change "Art" to --of the Invention--.

Column 4, line 63, change "Disclosure" to --Summary--.

Column 39, line 31, change "the" to --a--.

Signed and Sealed this

Twenty-third Day of February, 1999

*Attest:*

Q. TODD DICKINSON

*Attesting Officer*    Acting Commissioner of Patents and Trademarks